United States Patent
Chung et al.

(10) Patent No.: US 9,588,840 B2
(45) Date of Patent: Mar. 7, 2017

(54) MEMORY DEVICES THAT PERFORM MASKED WRITE OPERATIONS AND METHODS OF OPERATING THE SAME

(71) Applicants: Hoi-ju Chung, Yongin-si (KR); Chul-sung Park, Seoul (KR); Tae-young Oh, Seoul (KR); Jang-woo Ryu, Seoul (KR); Chan-yong Lee, Suwon-si (KR); Tae-seong Jang, Yongin-si (KR); Gong-heum Han, Hwaseong-si (KR)

(72) Inventors: Hoi-ju Chung, Yongin-si (KR); Chul-sung Park, Seoul (KR); Tae-young Oh, Seoul (KR); Jang-woo Ryu, Seoul (KR); Chan-yong Lee, Suwon-si (KR); Tae-seong Jang, Yongin-si (KR); Gong-heum Han, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 330 days.

(21) Appl. No.: 14/225,686

(22) Filed: Mar. 26, 2014

(65) Prior Publication Data

US 2014/0317470 A1   Oct. 23, 2014

Related U.S. Application Data

(60) Provisional application No. 61/813,246, filed on Apr. 18, 2013.

(30) Foreign Application Priority Data

Aug. 26, 2013 (KR) .................... 10-2013-0101275

(51) Int. Cl.
*G06F 11/10* (2006.01)
*G06F 11/32* (2006.01)

(52) U.S. Cl.
CPC ...... *G06F 11/1048* (2013.01); *G06F 11/1076* (2013.01); *G06F 11/1008* (2013.01); *G06F 11/1068* (2013.01); *G06F 11/1072* (2013.01)

(58) Field of Classification Search
CPC ............. G06F 11/1048; G06F 11/1076; G06F 11/1008; G06F 11/1068; G06F 11/1072
See application file for complete search history.

(56) References Cited

U.S. PATENT DOCUMENTS

| 5,917,839 A | 6/1999 | Hashimoto et al. |
| 5,996,052 A | 11/1999 | Taniguchi et al. |

(Continued)

FOREIGN PATENT DOCUMENTS

| KR | 10-0295086 B1 | 4/2001 |
| KR | 20130116171 A | 10/2013 |

*Primary Examiner* — April Y Blair
*Assistant Examiner* — Dipakkumar Gandhi
(74) *Attorney, Agent, or Firm* — Harness, Dickey & Pierce, P.L.C.

(57) ABSTRACT

A method of operating a memory device includes: generating an internal read command in response to a received masked write command, the internal read command being generated one of (i) during a write latency associated with the received masked write command, (ii) after receipt of a first bit of masked write data among a plurality of bits of masked write data, and (iii) in synchronization with a rising or falling edge of a clock signal received with an address signal corresponding to the masked write command; reading, in response to the internal read command, a plurality of bits of data stored in a plurality of memory cells, the plurality of memory cells corresponding to the address signal; and storing, in response to an internal write command, the plurality of bits of masked write data in the plurality of memory cells.

30 Claims, 25 Drawing Sheets

(56) References Cited

U.S. PATENT DOCUMENTS

| | | | |
|---|---|---|---|
| 6,073,219 A | 6/2000 | Ohno | |
| 6,560,668 B2 | 5/2003 | Ryan et al. | |
| 7,299,323 B2 | 11/2007 | Cho | |
| 7,328,365 B2 | 2/2008 | Karpuszka et al. | |
| 7,426,675 B2 | 9/2008 | Harrand | |
| 8,074,153 B2 | 12/2011 | Hsueh et al. | |
| 8,397,129 B2 | 3/2013 | Schreck et al. | |
| 2001/0000693 A1* | 5/2001 | Hamamoto | G11C 7/1072 365/230.08 |
| 2007/0245093 A1* | 10/2007 | Do | G11C 7/1012 711/149 |
| 2008/0025117 A1* | 1/2008 | Yu | G11C 7/1045 365/194 |
| 2008/0043547 A1* | 2/2008 | Jeong | G11C 7/1066 365/194 |
| 2008/0080267 A1* | 4/2008 | Lee | G11C 7/1051 365/191 |
| 2008/0183984 A1 | 7/2008 | Beucler et al. | |
| 2009/0235113 A1* | 9/2009 | Shaeffer | G06F 11/1004 714/5.11 |
| 2011/0242911 A1* | 10/2011 | Ko | G11C 7/1078 365/194 |
| 2012/0221916 A1* | 8/2012 | Schreck | G06F 11/1056 714/752 |
| 2013/0275830 A1 | 10/2013 | Park | |

\* cited by examiner

FIG. 6

Burst Length BL=16

| | | | | | | | |
|---|---|---|---|---|---|---|---|
| DQ0 | 0 | 1 | 2 | 3 | • • • • • • | e | f |
| DQ1 | 0 | 1 | 2 | 3 | • • • • • • | e | f |
| DQ2 | 0 | 1 | 2 | 3 | • • • • • • | e | f |
| ⋮ | | | | | ⋮ | | |
| DQ6 | 0 | 1 | 2 | 3 | • • • • • • | e | f |
| DQ7 | 0 | 1 | 2 | 3 | • • • • • • | e | f |

×8

| DM | 0 | 1 | 0 | 0 | • • • • • • | 0 | 0 |
|---|---|---|---|---|---|---|---|

MEMORY DEVICES THAT PERFORM MASKED WRITE OPERATIONS AND METHODS OF OPERATING THE SAME

CROSS-REFERENCE TO RELATED APPLICATIONS

This application claims priority under 35 U.S.C. §119 to provisional U.S. patent application No. 61/813,246, filed on Apr. 18, 2013, and to Korean Patent Application No. 10-2013-0101275, filed on Aug. 26, 2013, in the Korean Intellectual Property Office, the disclosure of which is incorporated herein in its entirety by reference.

BACKGROUND

Field

At least some example embodiments of inventive concepts relate to semiconductor memory devices and/or methods of improving functions of memory devices by performing masked write operations in the memory devices.

Description of Conventional Art

A memory device having an error correction code (ECC) circuit may save error bits. The memory device may perform a masked write operation of masking data so as to suppress and/or prevent the data in a write operation from being written to some of memory cell blocks that constitute a memory cell array. By performing the masked write operation, some of the memory cell blocks, to which data is not written, retain previous data, and new data is written to the remaining memory cell blocks. During the masked write operation, an operation of reading the previous data, an operation of modifying parity bits with respect to the previous data and the new data via the ECC circuit, and an operation of writing the new data and the modified parity bits may be performed. In this regard, there is a demand for a memory device capable of more securely performing the masked write operation.

SUMMARY

At least some example embodiments of inventive concepts provide memory devices that perform masked write operations. At least some other example embodiments provide methods of operating memory devices.

According to at least one example embodiment, a method of operating a memory device includes: receiving a masked write command and an address signal; generating, in response to the masked write command, an internal read command during a write latency associated with the masked write command; receiving a plurality of pieces of masked write data after expiration of the write latency; reading, in response to the internal read command, a plurality of pieces of data stored in a plurality of memory cells, the plurality of memory cells corresponding to the address signal and the plurality of memory cells being configured to store the plurality of pieces of masked write data; performing error detection and correction on the plurality of pieces of data; generating an internal write command after input of a last piece of masked write data among the plurality of pieces of masked write data; and storing, in response to the internal write command, the plurality of pieces of masked write data in the plurality of memory cells.

The generating the internal read command may include: generating the internal read command during the write latency and in synchronization with a rising or falling edge of a clock; generating the internal read command during the write latency and after a CAS-to-CAS command delay; or generating the internal read command according to operation frequency information with respect to a data rate of the memory device.

The reading the plurality of pieces of data stored in the plurality of memory cells may include: activating, in response to the internal read command, a column selection signal and an error correction code (ECC) decoding signal, the column selection signal corresponding to the plurality of memory cells; and reading, in response to the column selection signal, the plurality of pieces of data and parity bits from the plurality of memory cells.

The performing error detection and correction may include: performing, in response to the ECC decoding signal, error detection and correction on the plurality of pieces of data using the plurality of pieces of data and the parity bits.

The storing the plurality of pieces of masked write data may include: activating, in response to the internal write command, a column selection signal and an error correction code (ECC) encoding signal, the column selection signal corresponding to the plurality of memory cells; generating, in response to the ECC encoding signal, parity bits with respect to the plurality of pieces of masked write data and error-corrected data among the plurality of pieces of data, the error-corrected data corresponding to masked data among the plurality of pieces of masked write data; selecting memory cells among the plurality of memory cells based on the column selection signal; and storing the plurality of pieces of masked write data and the parity bits in the selected memory cells.

According to at least some example embodiments, the method may further include: generating the plurality of pieces of masked write data in response to a data mask signal associated with a plurality of pieces of write data input via a data input/output (I/O) pad.

At least one other example embodiment provides a method of operating a memory device including: receiving a masked write command and an address signal; receiving a plurality of pieces of masked write data after expiration of a write latency associated with the masked write command; generating, in response to the masked write command, an internal read command after receipt of a first piece of masked write data among the plurality of pieces of masked write data; reading, in response to the internal read command, a plurality of pieces of data stored in a plurality of memory cells, the plurality of memory cells corresponding to the address signal and the plurality of memory cells being configured to store the plurality of pieces of masked write data; performing error detection and correction on the plurality of pieces of data; generating an internal write command after receipt of a last piece of masked write data among the plurality of pieces of masked write data; and storing, in response to the internal write command, the plurality of pieces of masked write data in the plurality of memory cells.

The reading the plurality of pieces of data stored in the plurality of memory cells may include: activating, in response to the internal read command, a column selection signal and an error correction code (ECC) decoding signal, the column selection signal corresponding to the plurality of memory cells; and reading, in response to the column selection signal, the plurality of pieces of data and parity bits from the plurality of memory cells.

The performing error detection and correction on the plurality of pieces of data may include: performing, in response to the ECC decoding signal, error detection and correction on the plurality of pieces of data using the plurality of pieces of data and the parity bits.

The storing the plurality of pieces of masked write data may include: activating, in response to the internal write command, a column selection signal and an error correction code (ECC) encoding signal, the column selection signal corresponding to the plurality of memory cells; generating, in response to the ECC encoding signal, parity bits with respect to the plurality of pieces of masked write data and error-corrected data among the plurality of pieces of data, the error-corrected data corresponding to masked data among the plurality of pieces of masked write data; selecting memory cells among the plurality of memory cells based on the column selection signal; and storing the plurality of pieces of masked write data and the parity bits in the selected memory cells.

At least one other example embodiment provides a method of operating a memory device including: receiving a masked write command and an address signal; generating, in response to the masked write command, an internal read command in synchronization with a clock signal received with the address signal; receiving a plurality of pieces of masked write data after expiration of a write latency associated with the masked write command; reading, in response to the internal read command, a plurality of pieces of data stored in a plurality of memory cells, the plurality of memory cells corresponding to the address signal and the plurality of memory cells being configured to store the plurality of pieces of masked write data; performing error detection and correction on the plurality of pieces of data; generating an internal write command after receipt of a last piece of masked write data among the plurality of pieces of masked write data; and storing, in response to the internal write command, the plurality of pieces of masked write data in the plurality of memory cells.

The reading the plurality of pieces of data stored in the plurality of memory cells may include: activating, in response to the internal read command, a column selection signal and an error correction code (ECC) decoding signal, the column selection signal corresponding to the plurality of memory cells; and reading, in response to the column selection signal, the plurality of pieces of data and parity bits stored in the plurality of memory cells.

The performing error detection and correction on the plurality of pieces of data may include: performing, in response to the ECC decoding signal, error detection and correction on the plurality of pieces of data using the plurality of pieces of data and the parity bits.

The storing the plurality of pieces of masked write data may include: activating, in response to the internal write command, a column selection signal and an error correction code (ECC) encoding signal, the column selection signal corresponding to the plurality of memory cells; generating, in response to the ECC encoding signal, parity bits with respect to the plurality of pieces of masked write data and error-corrected data among the plurality of pieces of data, the error-corrected data corresponding to masked data among the plurality of pieces of masked write data; selecting memory cells among the plurality of memory cells based on the column selection signal; and storing the plurality of pieces of masked write data and the parity bits in the selected memory cells.

At least one other example embodiment provides a method of operating a memory device, the method including: receiving a masked write command and an address signal; generating, in response to the masked write command, first and second internal read commands during a write latency corresponding to the masked write command; receiving a plurality of pieces of masked write data corresponding to a burst length after expiration of the write latency, the burst length having an upper burst length portion and a lower burst length portion; reading, in response to the first internal read command, a plurality of pieces of first data stored in a first plurality of memory cells, the first plurality of memory cells corresponding to the address signal, and the first plurality of memory cells being configured to store pieces of masked write data corresponding to the upper burst length portion; performing error detection and correction on the plurality of pieces of first data; reading, in response to the second internal read command, a plurality of pieces of second data stored in a second plurality of memory cells, the second plurality of memory cells corresponding to the address signal, and the second plurality of memory cells being configured to store pieces of masked write data corresponding to the lower burst length portion; performing error detection and correction on the plurality of pieces of second data; generating first and second internal write commands according to the plurality of pieces of masked write data; storing, in the first plurality of memory cells and in response to the first internal write command, the pieces of masked write data corresponding to the upper burst length portion; and storing, in the second plurality of memory cells and in response to the second internal write command, the pieces of masked write data corresponding to the lower burst length portion.

According to at least some example embodiments, the generating the first and second internal read commands may include: generating the first internal read command during the write latency and in synchronization with a rising or falling edge of a first clock; and generating the second internal read command during the write latency and in synchronization with a rising or falling edge of a second clock.

According to at least some example embodiments, the generating the first and second internal read commands may include: generating the first internal read command during the write latency and after a first CAS-to-CAS command delay; and generating the second internal read command during the write latency and after a second CAS-to-CAS command delay.

According to at least some example embodiments, the generating the first and second internal read commands may include: generating the first internal read command after receipt of a first piece of masked write data among pieces of masked write data corresponding to the upper burst length portion; and generating the second internal read command after receipt of a first piece of masked write data among the pieces of masked write data corresponding to the lower burst length portion.

According to at least some example embodiments, the generating the first and second internal read commands may include: generating the first internal read command in synchronization with a clock signal received with the address signal; and generating the second internal read command after the first internal read command and after a CAS-to-CAS command delay.

According to at least some example embodiments, the generating the first and second internal read commands may include: generating the first internal read command during the write latency and after a first CAS-to-CAS command delay; and generating the second internal read command after the first internal read command and a second CAS-to-CAS command delay.

According to at least some example embodiments, the generating the first and second internal write commands may include: generating the first internal write command after receipt of a last piece of masked write data among the pieces of masked write data corresponding to the upper burst length portion; and generating the second internal write command after receipt of a last piece of masked write data among the pieces of masked write data corresponding to the lower burst length portion.

According to at least some example embodiments, the generating the first and second internal write commands may include: generating the first internal write command after receipt of a last piece of masked write data among the pieces of masked write data corresponding to the upper burst length portion and after expiration of a first delay period; and generating the second internal write command after receipt of a last piece of masked write data among the pieces of masked write data corresponding to the lower burst length portion and after expiration of a second delay period.

The reading the plurality of pieces of first data may include: activating, in response to the first internal read command, a first column selection signal and a first error correction code (ECC) decoding signal, the first column selection signal corresponding to the first plurality of memory cells; and reading, in response to the first column selection signal, the plurality of pieces of first data and first parity bits stored in the first plurality of memory cells.

The performing error detection and correction on the plurality of pieces of first data may include: performing, in response to the first ECC decoding signal, error detection and correction on the plurality of pieces of first data using the plurality of pieces of first data and the first parity bits.

The reading the plurality of pieces of second data may include: activating, in response to the second internal read command, a second column selection signal and a second error correction code (ECC) decoding signal, the second column selection signal corresponding to the second plurality of memory cells; and reading, in response to the second column selection signal, the plurality of pieces of second data and second parity bits stored in the second plurality of memory cells.

The performing error detection and correction on the plurality of pieces of second data may include: performing, in response to the second ECC decoding signal, error detection and correction on the plurality of pieces of second data using the plurality of pieces of second data and the second parity bits.

The storing the pieces of masked write data corresponding to the upper burst length portion may include: activating, in response to the first internal write command, a column selection signal and an error correction code (ECC) encoding signal, the column selection signal corresponding to the first plurality of memory cells; generating, in response to the ECC encoding signal, parity bits with respect to the pieces of masked write data corresponding to the upper burst length portion and error-corrected data among the plurality of pieces of first data, the error-corrected data corresponding to masked data among the pieces of masked write data corresponding to the upper burst length portion; selecting first memory cells among the first plurality of memory cells based on the column selection signal; and storing the pieces of masked write data corresponding to the upper burst length portion and the parity bits in the selected first memory cells.

The storing the pieces of masked write data corresponding to the lower burst length portion may include: activating, in response to the second internal write command, a column selection signal and an error correction code (ECC) encoding signal, the column selection signal corresponding to the second plurality of memory cells; generating, in response to the ECC encoding signal, parity bits with respect to the pieces of masked write data corresponding to the lower burst length portion and error-corrected data among the plurality of pieces of second data, the error-corrected data corresponding to masked data among the pieces of masked write data corresponding to the lower burst length portion; selecting second memory cells among the plurality of second memory cells based on the column selection signal; and storing the pieces of masked write data corresponding to the lower burst length portion and the parity bits in the selected second memory cells.

At least one other example embodiment provides a method of operating a memory device. According to at least this example embodiment, the method includes: receiving a masked write command, an address signal and a plurality of bits of masked write data, the address signal corresponding to the masked write command; generating an internal read command in response to the received masked write command, the internal read command being generated one of (i) during a write latency associated with the received masked write command, (ii) after receipt of a first bit of masked write data among the plurality of bits of masked write data, and (iii) in synchronization with a rising or falling edge of a clock signal received with the address signal; reading, in response to the internal read command, a plurality of bits of data stored in a plurality of memory cells, the plurality of memory cells corresponding to the address signal; and storing, in response to an internal write command, the plurality of bits of masked write data in the plurality of memory cells.

According to at least some example embodiments, the method may further include: generating the internal write command after receipt of a last bit of masked write data among the plurality of bits of masked write data.

The method may further include: performing error detection and correction on the plurality of bits of data. The storing the plurality of bits of masked write data may include: activating, in response to the internal write command, a column selection signal and an error correction code (ECC) encoding signal, the column selection signal corresponding to the plurality of memory cells; generating, in response to the ECC encoding signal, parity bits based on the plurality of bits of masked write data and error-corrected data bits among the plurality of bits of data, the error-corrected data bits corresponding to masked data bits among the plurality of bits of masked write data; selecting memory cells among the plurality of memory cells based on the column selection signal; and storing the parity bits and the plurality of bits of masked write data in the selected memory cells.

The method may further include: reading, from the plurality of memory cells, parity bits associated with the plurality of bits of data; and the error detection and correction may be based on the plurality of bits of data and the parity bits.

The internal read command may be generated after a CAS-to-CAS command delay.

BRIEF DESCRIPTION OF THE DRAWINGS

Example embodiments of inventive concepts will be more clearly understood from the following detailed description taken in conjunction with the accompanying drawings in which:

FIG. 6 illustrates a data masking scheme of the memory device according to an example embodiment of inventive concepts;

DETAILED DESCRIPTION

Figure 1:
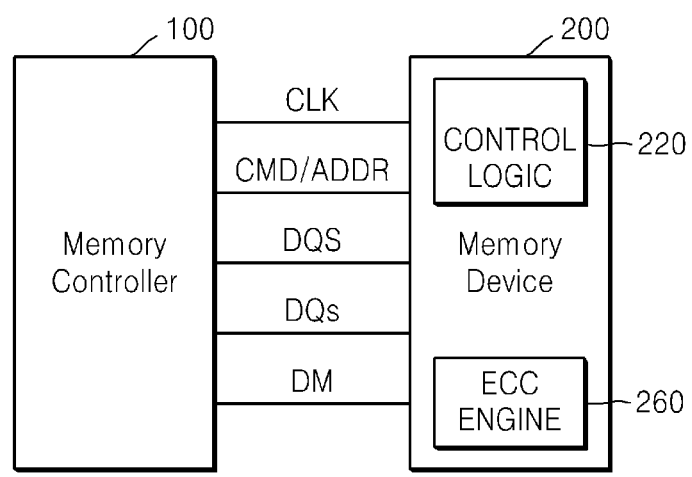
FIG. 1 is a diagram of a memory system including a memory device that performs a masked write operation according to an example embodiment of inventive concepts.

Example embodiments will now be described more fully hereinafter with reference to the accompanying drawings, in which some example embodiments of inventive concepts are shown. However, example embodiments may be embodied in many different forms and should not be construed as limited to the embodiments set forth herein. Rather, these example embodiments are provided so that this disclosure will be thorough and complete, and will fully convey the scope of inventive concepts to those skilled in the art.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of inventive concepts. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, a block diagram, or a timing diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "buffer," "memory" or the like, may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices, other tangible and/or non-transitory computer-readable storage mediums for storing information. The term "computer-readable medium" or "computer-readable storage medium" may include, but is not limited to, portable or fixed storage devices, optical storage devices, and various other tangible and/or non-transitory mediums capable of storing or containing instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

Memory capacity of semiconductor memory devices such as dynamic random access memories (DRAMs) has been increasing due to the development in the manufacturing technology. However, the number of defective memory cells has also been increasing due to the micronization process during device manufacturing. Also, DRAMs have a finite data retention characteristic, and thus, as process scaling with respect to DRAMs continues, a capacitance value of each memory cell decreases such that a bit error rate (BER) may be increased. A DRAM may be repaired by replacing defective memory cells with redundant memory cells. However, a redundant repair scheme may not ensure a sufficient manufacturing yield. Accordingly, a method of saving error bits by applying an error correction code (ECC) algorithm to the DRAM has been suggested.

The ECC algorithm provides an ECC function capable of detecting errors that may occur during data read and write operations, and capable of self-correcting the errors. In order to provide data integrity, a DRAM may employ an ECC engine. The ECC engine may perform an ECC operation using parity bits while the errors are detected and corrected. According to at least some example embodiments of inventive concepts, memory devices save error bits by employing the ECC engine, so that data integrity of semiconductor memory devices may be improved and/or guaranteed.

FIG. 1 is a diagram of a memory system including a memory device 200 that performs a masked write operation according to an example embodiment of inventive concepts.

The memory system includes a memory controller 100 and the memory device 200. The memory controller 100 controls the memory device 200. The memory controller 100 transmits control signals such as a clock CLK, a command CMD, an address ADDR, a data strobe signal DQS, a data mask signal DM, etc. and data DQs to the memory device 200, and receives a data strobe signal DQS and data DQs from the memory device 200. The memory controller 100 may issue and transmit a read command READ, a write command WRITE, and a masked write command MWR to the memory device 200.

The memory device 200 includes a command control logic unit 220 and an ECC engine unit 260. The command control logic unit 220 may receive the command signal CMD issued by the memory controller 100, and may generate an internal command INT_CMD for controlling an operation of the memory device 200 according to the command CMD.

The memory device 200 may perform a read operation in response to the read command READ, may perform a write operation in response to the write command WRITE, and may perform a masked write operation in response to the masked write command MWR. The masked write operation may include an operation of masking data so as to suppress and/or prevent the data in a write operation from being written to some of memory cell blocks that constitute a memory cell array.

The command control logic unit 220 may generate an internal read command INT_RD and an internal write command INT_WR according to the read command READ, the write command WRITE, or the masked write command MWR from the memory controller 100. According to the internal read command INT_RD and the internal write command INT_WR, the read operation, the write operation, and the masked write operation may be performed by the memory device 200.

The ECC engine unit 260, during the read operation, may detect and correct error bits that occur in a plurality of pieces of read data, by using the plurality of pieces of read data and parity bits which are read from memory cells in response to the internal read command INT_RD.

The ECC engine unit 260, during the write operation, may perform an ECC encoding operation on a plurality of pieces of write data to be stored in the memory cells in response to the internal write command INT_WR and may generate parity bits.

The ECC engine unit 260, during the masked write operation, may read the plurality of pieces of read data and first parity bits that are stored in the memory cells configured to store a plurality of pieces of masked write data in response to the internal read command INT_R, and may detect and correct an error of the plurality of pieces of read data by using the plurality of pieces of read data and the first parity bits. Also, the ECC engine unit 260 may generate second parity bits with respect to the plurality of pieces of masked write data and read data of the plurality of pieces of data that have been error-corrected, wherein the read data corresponds to masked data of the plurality of pieces of masked write data, in response to the internal write command INT_WR, and may store the plurality of pieces of masked write data and the second parity bits in the memory cells.

Figure 2:
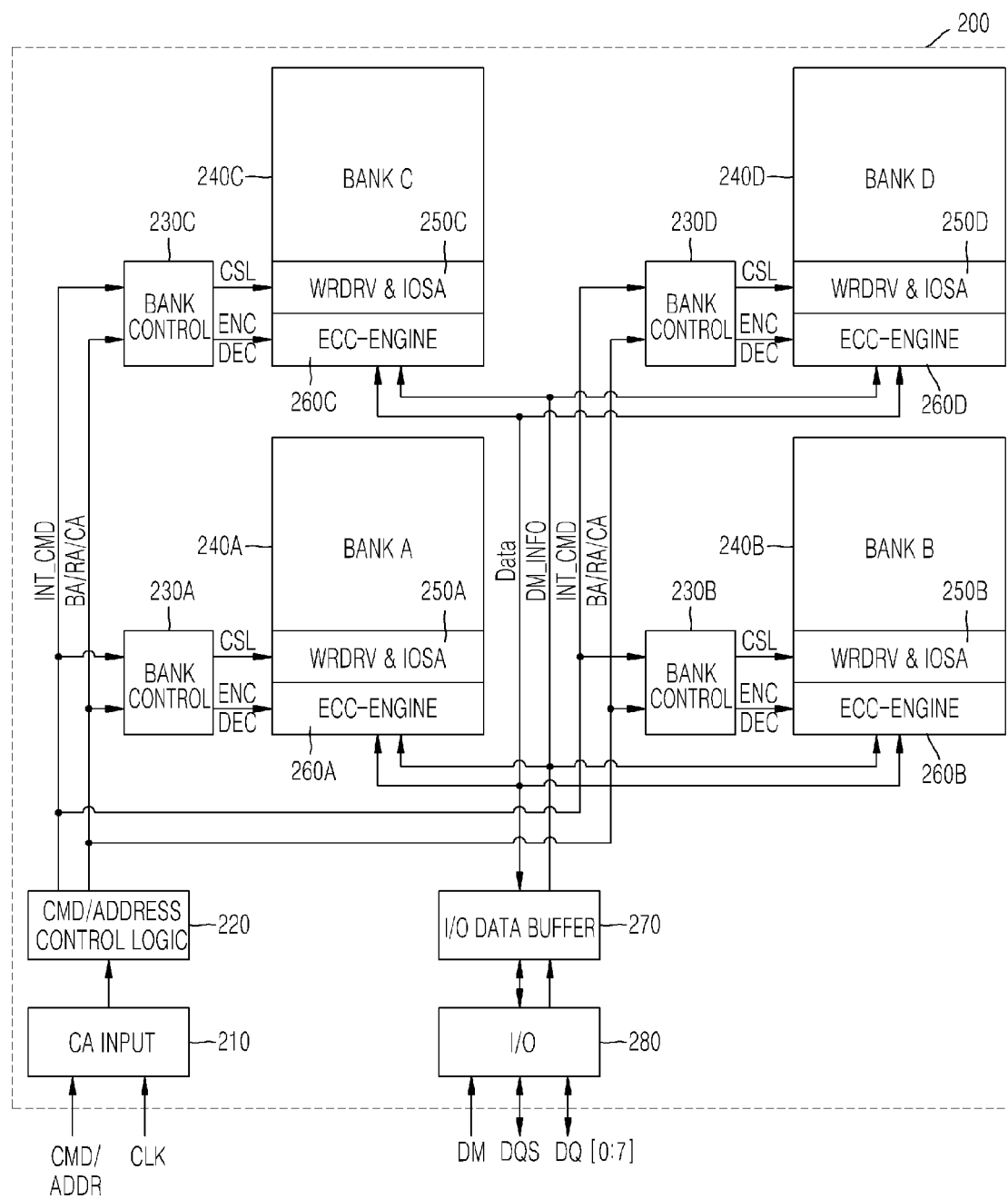
FIG. 2 is a block diagram of a memory device according to an example embodiment of inventive concepts.

FIG. 2 is a block diagram of the memory device 200 according to an example embodiment of inventive concepts.

Referring to FIG. 2, the memory device 200 includes a command/address input buffer 210, a command/address control logic unit 220, bank control units 230A through 230D, memory cell arrays 240A through 240D, write driver and data input/output (I/O) sense amplifiers 250A through 250D, ECC engine units 260A through 260D, an I/O data buffer 270, and an I/O circuit unit 280.

The memory cell arrays 240A through 240D may include banks A through D, respectively, in which a plurality of memory cells are arrayed in rows and columns. A row decoder and a column decoder for selecting wordlines and bitlines that are connected to the memory cells may be connected to each of the banks A through D 240A through 240D. In the present embodiment, the memory device 200 includes the four banks, but in other embodiments, the memory device 200 may include an arbitrary number of banks.

According to at least some example embodiments, the memory device 200 may be a DRAM such as a double data rate synchronous dynamic random access memory (DDR SDRAM), a low power double data rate SDRAM (LPDDR SDRAM), a graphics double data rate SDRAM (GDDR SDRAM), a Rambus DRAM (RDRAM), etc. or may be a memory device that performs a masked write operation.

The command/address input buffer 210 may receive a clock CLK, a command CMD, and an address ADDR from the memory controller 100. The command CMD and the address ADDR may be input via the same terminals, i.e., CA pads. The command CMD and the address ADDR may be sequentially input via the CA pads. The command CMD issued by the memory controller 100 may include a read command READ, a write command WRITE, and a masked write command MWR. The read command READ indicates a read operation of the memory device 200, and the write command WRITE indicates a write operation of the memory device 200. The masked write command MWR indicates a masked write operation of masking data so as to suppress and/or prevent the data in the write operation from being written to some of memory cell blocks that configure a memory cell array.

The masked write operation may involve reading a plurality of pieces of previous data from memory cells configured to store a plurality of pieces of masked write data, modifying parity bits with respect to the plurality of pieces of previous data and the plurality of pieces of masked write data via the ECC engine units 260A through 260D, and writing the plurality of pieces of masked write data and the modified parity bits. During the masked write operation, the memory device 200 internally performs read-modify-write operations, and thus the masked write operation may be referred as a read-modify-write operation.

The command/address control logic unit 220 may receive the command CMD and the address ADDR via the command/address input buffer 210, and may generate an internal command INT_CMD and an address signal. The internal command INT_CMD may include an internal read command INT_RD and an internal write command INT_WR. The address signal may include a bank address BA, a row address RA, and a column address CA. The internal command INT_CMD and the address signal BA/RA/CA may be provided to each of the bank control units 230A through 230D.

Each of the bank control units 230A through 230D may be activated while corresponding to the bank address BA. The activated bank control units 230A through 230D may generate bank control signals in response to the internal command INT_CMD, the row address RA, and the column address CA. In response to the bank control signal, the row decoder and the column decoder of each of the banks A through D 240A through 240D that are connected to the activated bank control units 230A through 230D may be activated.

The row decoder of each of the banks A through D 240A through 240D may decode the row address RA and therefore may enable a wordline that corresponds to the row address RA. The column address CA of each of the banks A through D 240A through 240D may be temporarily stored in a column address latch. The column address latch may stepwise increase the column address CA in a burst mode. The temporarily stored or stepwise increased column address CA may be provided to the column decoder. The column decoder may decode the column address CA and therefore may activate a column selection signal CSL that corresponds to the column address CA.

In response to the bank control signal, each of the bank control units 230A through 230D may generate an ECC encoding signal ENC and an ECC decoding signal DEC for controlling operations of the ECC engine units 260A through 260D that are connected to the banks A through D 240A through 240D, respectively.

The write driver and data I/O sense amplifiers 250A through 250D may sense and amplify a plurality of pieces of read data output from the banks A through D 240A through 240D, respectively, and may transmit a plurality of pieces of write data to be stored in the banks A through D 240A through 240D, respectively.

During the write operation, each of the ECC engine units 260A through 260D may generate parity bits by performing an ECC encoding operation on the plurality of pieces of write data to be stored in each of the banks A through D 240A through 240D, in response to the ECC encoding signal ENC output from each of the bank control units 230A through 230D.

During the read operation, each of the ECC engine units 260A through 260D may perform an ECC decoding operation by using the plurality of pieces of data and parity bits that are read from each of the banks A through D 240A through 240D, in response to the ECC decoding signal DEC output from each of the banks A through D 240A through 240D, and therefore may detect and correct an error bit occurred in the plurality of pieces of read data.

During the masked write operation, each of the ECC engine units 260A through 260D may read the plurality of pieces of data and first parity bits that are stored in memory cells configured to store the plurality of pieces of masked write data, in response to the ECC decoding signal DEC output from each of the bank control units 230A through 230D, and may detect and correct an error of the plurality of pieces of read data by using the plurality of pieces of read data and the first parity bits. Also, each of the ECC engine units 260A through 260D may generate second parity bits with respect to the plurality of pieces of masked write data and read data of the plurality of pieces of data that have been error-corrected, wherein the read data corresponds to masked data of the plurality of pieces of masked write data, in response to the ECC encoding signal ENC output from each of the bank control units 230A through 230D, and may store the plurality of pieces of masked write data and the second parity bits in the memory cells.

The I/O data buffer 270 may include circuits for gating a plurality of pieces of data that are input to or output from the banks A through D 240A through 240D; a data masking control unit (refer to FIG. 3); read data latches for storing the plurality of pieces of data output from the banks A through D 240A through 240D; and write data latches for writing the plurality of pieces of data to the banks A through D 240A through 240D.

The I/O data buffer 270 may convert parallel data bits that are output from the banks A through D 240A through 240D into serial data bits via the read data latches. The I/O data buffer 270 may convert a plurality of pieces of write data that are serially received into parallel data bits by using the write data latches. The data masking control unit may perform a masking operation on corresponding data from among the plurality of pieces of write data that are received from data I/O pads DQ[0:7], in response to data masking information DM_INFO, and therefore may provide the plurality of pieces of masked write data to the ECC engine units 260A through 260D.

The I/O circuit unit 280 may receive the serial data bits output from the I/O data buffer 270, may sequentially array the serial data bits as data bits that correspond to a burst length BL, and then may output together the data bits and a data strobe signal DQS to the data I/O pads DQ[0:7]. The I/O circuit unit 280 may receive the data strobe signal DQS and the plurality of pieces of write data that correspond to the burst length BL and that are serially input via the data I/O pads DQ[0:7] from the memory controller 100. The I/O circuit unit 280 may provide, to the I/O data buffer 270, the plurality of pieces of serially input write data that correspond to the burst length BL.

The I/O circuit unit 280 may provide a data mask signal DM and the data masking information DM_INFO about the plurality of pieces of write data to the data masking control unit via the I/O data buffer 270.

Figure 3:
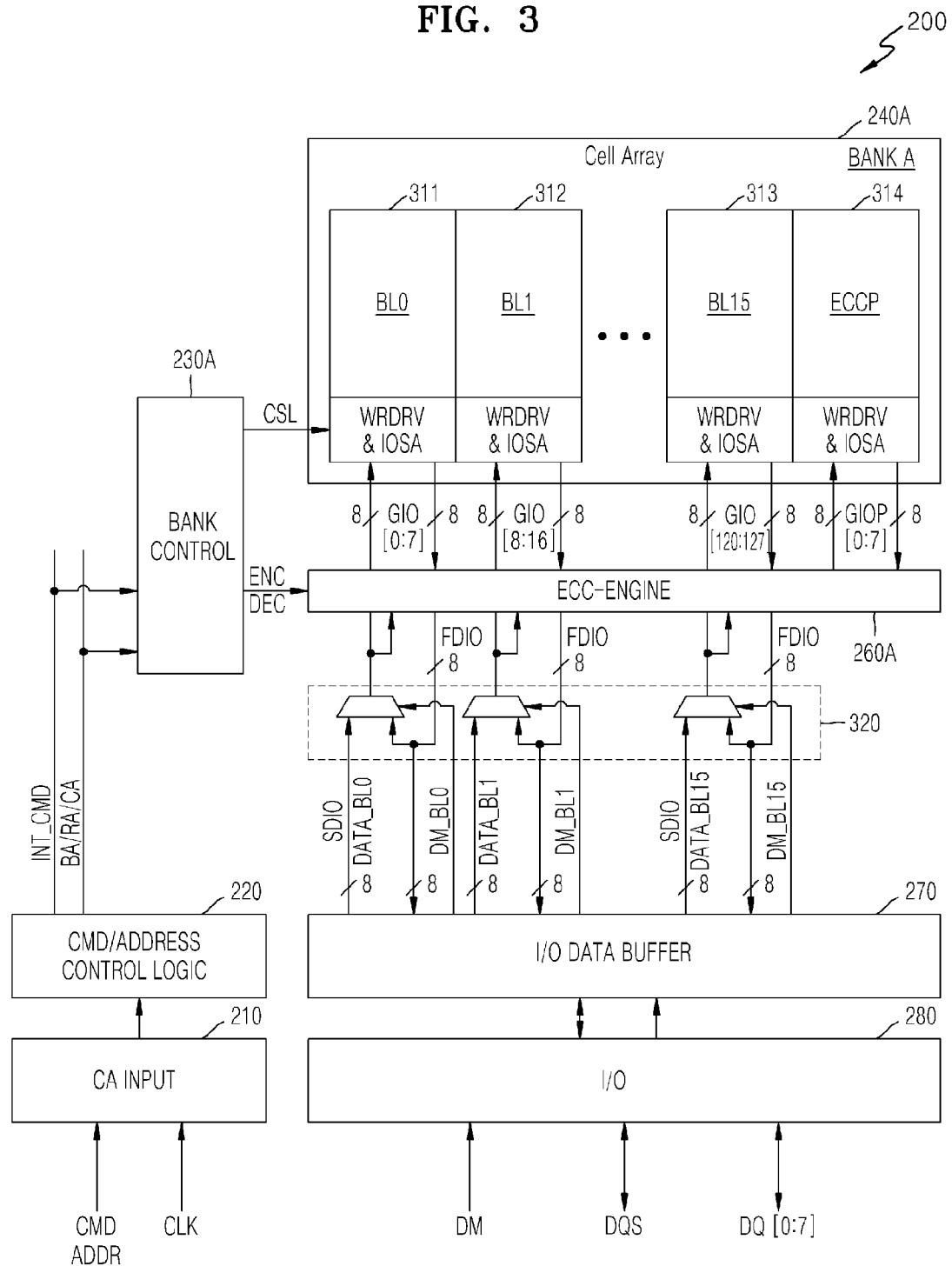
FIG. 3 illustrates in detail a bank A in the memory device of FIG. 2.

FIG. 3 illustrates in more detail, an example embodiment of the bank A 240A in the memory device 200 of FIG. 2.

With reference to FIG. 3, the bank A 240A, the bank control unit 230A connected to the bank A 240A, the write driver and data I/O sense amplifier 250A, and the ECC engine unit 260A of FIG. 2 are described below. Also, with reference to FIG. 3, the command/address input buffer 210, the command/address control logic unit 220, the I/O data buffer 270, the I/O circuit unit 280, and the data masking control unit 320 which are related to controlling an operation of the bank A 240A are described below. Descriptions with respect to the bank A 240A may be applied to the rest of the banks 240B through 240D.

Referring to FIG. 3, the bank A 240A includes a plurality of cell block areas 311 through 314 in which a plurality of memory cells are arrayed in rows and columns. The cell block areas 311 through 314 may be defined in various ways. For example, the cell block areas 311 through 314 may be defined as areas in which a plurality of pieces of data stored in the memory cells corresponding to the cell block areas 311 through 314 are input and output in correspondence to a corresponding data I/O pad DQ, or in correspondence to a burst length BL with respect to each of read and write operations by the memory device 200.

In the present embodiment, the cell block areas 311 through 314 are defined as the areas in which the plurality of pieces of data are input and output in correspondence to the burst length BL. The burst length BL indicates the maximum number of memory cells that may be accessed in response to a corresponding read or write command. The burst length BL may be variously set as BL=4, BL=8, BL=16, BL=32, etc. In a case of BL=16, for convenience of description, it is assumed that a cell block of the cell block areas 311 through 314 in which data corresponding to a first burst length BL0 is written or read is referred as the BL0 cell block 311, a cell block of the cell block areas 311 through 314 in which data corresponding to a second burst length BL1 is written or read is referred as the BL1 cell block 312, and a cell block of the cell block areas 311 through 314 in which data corresponding to a sixteenth burst length BL15 is written or read is referred as the BL15 cell block 313.

Also, the cell block areas 311 through 314 may include a cell block for storing a parity bit that is used in an error detection and correction process during an ECC operation. For convenience of description, the cell block for storing the parity bit is referred as the ECCP cell block 314.

The cell block areas 311 through 314 may include the BL0 through BL15 cell blocks 311 through 313 and the ECCP cell block 314. Each of the BL0 through BL15 cell blocks 311 through 313 and the ECCP cell block 314 may be connected to the write driver and data I/O sense amplifier 250A (refer to FIG. 2) and first data lines GIO and GIOP.

Each of the first data lines GIO and GIOP includes a pair of data lines that are complementary with respect to each other. When the memory device 200 includes eight data I/O pads, i.e., eight DQ pads DQ[0:7], the BL0 through BL15 cell blocks 311 through 313 and the ECCP cell block 314 may be connected to eight first data lines GIO and GIOP. In the present embodiment, in order to describe a read data transmission from the BL0 through BL15 cell blocks 311 through 313 and the ECCP cell block 314 and a read data transmission to the BL0 through BL15 cell blocks 311 through 313 and the ECCP cell block 314 via the eight first data lines GIO and GIOP, the eight first data lines GIO and GIOP are separately illustrated.

The total number of the first data lines GIO that are connected to the BL0 through BL15 cell blocks 311 through 313 is 16*8=128, and the first data lines GIO may be finally connected to the eight DQ pads DQ[0:7]. That is, a plurality of pieces of 128-bit data on the first data lines GIO that are connected to the BL0 through BL15 cell blocks 311 through 313 may be input to or output from the memory device 200 via the eight DQ pads DQ[0:7]. Here, each of the eight DQ pads DQ[0:7] may input and output 16-bit data corresponding to the burst length BL=16.

The total number of the first data lines GIOP that are connected to the ECCP cell block 314 is 8. This conforms well to a Hamming-based ECC algorithm using an 8-bit parity bit, so as to perform an operation of detecting and correcting an error bit with respect to 128-bit data of each of the BL0 through BL15 cell blocks 311 through 313.

According to ECC algorithms used in error detection and correction, a value of a data bit and a value of parity bit for each error correction unit may vary. For example, a 6-bit parity bit may be used with respect to 32-bit data, and a 7-bit parity bit may be used with respect to 64-bit data. Thus, the total number of the first data lines GIO that are connected to the BL0 through BL15 cell blocks 311 through 313 and the total number of the first data lines GIOP that are connected to the ECCP cell block 314 may vary according to the ECC algorithms.

The command/address input buffer 210 may receive the read command READ, the write command WRITE, the masked write command MWR, or the address ADDR, which are issued by the memory controller 100.

The command/address control logic unit 220 may receive the read command READ, the write command WRITE, the masked write command MWR, or the address ADDR via the command/address input buffer 210, and therefore may generate an internal command INT_CMD and an address signal BA/RA/CA.

The bank control unit 230A may be activated in correspondence to the bank address BA, and may generate bank control signals, in response to the internal command INT_CMD, the row address RA, and the column address CA. The bank control unit 230A may activate the row decoder and the column decoder of the bank A 240A, in response to the bank control signal. The row decoder may decode the row address RA and therefore may enable a wordline that corresponds to the row address RA. The column decoder may decode the column address CA and therefore may activate a column selection signal CSL that corresponds to the column address CA. In response to the bank control signal, the bank A 240A may generate an ECC encoding signal ENC and an ECC decoding signal DEC for controlling an operation of the ECC engine unit 260A.

The write driver and data I/O sense amplifier 250A may sense and amplify data bits that are read from each of the BL0 through BL15 cell blocks 311 through 313 and the ECCP cell block 314 corresponding to the row address RA and the column address CA, and may transmit write data bits and parity bits to be stored in each of the BL0 through BL15 cell blocks 311 through 313 and the ECCP cell block 314. 128-bit parallel data bits read from each of the BL0 through BL15 cell blocks 311 through 313 may be transmitted to the first data lines GIO via data I/O sense amplifiers, respectively. 8-bit parity bits that are read from the ECCP cell block 314 may be sensed and amplified by corresponding data I/O sense amplifiers and then may be transmitted to the first data lines GIOP. The plurality of pieces of sensed and amplified data that are transmitted to each of the first data lines GIO and GIOP are provided to the ECC engine unit 260A.

During a read operation, the ECC engine unit 260A may perform error detection and correction by using the 128-bit parallel data bits read from each of the BL0 through BL15 cell blocks 311 through 313 and the 8-bit parity bits that are read from the ECCP cell block 314 corresponding to the row address RA and the column address CA, in response to the ECC decoding signal DEC. The ECC engine unit 260A may generate syndrome data by calculating the 128-bit parallel data bits and the 8-bit parity bits, may detect a position of an error bit with respect to the 128-bit parallel data bits on the first data lines GIO[0:127] by using the syndrome data, may correct data of the error bit, and may output error-corrected parallel data bits. The error-corrected parallel data bits may be transmitted to the I/O data buffer 270 and the data masking control unit 320 via second data lines FDIO.

During a write operation, the ECC engine unit 260A may generate parity bits with respect to the plurality of pieces of write data to be stored in the BL0 through BL15 cell blocks 311 through 313 corresponding to the row address RA and the column address CA, in response to the ECC encoding signal ENC. The ECC engine unit 260A may transmit the parity bits to the ECCP cell block 314 via the first data line GIOP and a write driver.

During a masked write operation, the ECC engine unit 260A may receive 128-bit parallel data bits read from each of the BL0 through BL15 cell blocks 311 through 313 and 8-bit first parity bits that are read from the ECCP cell block 314 corresponding to the row address RA and the column address CA, in response to the ECC decoding signal DEC. The ECC engine unit 260A may perform error detection and correction on the read 128-bit parallel data bits by using the read 128-bit parallel data bits and the read 8-bit first parity bits. The ECC engine unit 260A may generate second parity bits with respect to the plurality of pieces of masked write data and read data of the plurality of pieces of data that have been error-corrected, wherein the read data corresponds to masked data of the plurality of pieces of masked write data provided from the I/O data buffer 270, in response to the ECC encoding signal ENC. The ECC engine unit 260A may store the plurality of pieces of masked data and the second parity bits in memory cells of the BL0 through BL15 cell blocks 311 through 313 and 8-bit first parity bits that are read from the ECCP cell block 314 corresponding to the row address RA and the column address CA.

The error-corrected parallel data bits output from the ECC engine unit 260A may be provided to the I/O data buffer 270 via the second data lines FDIO. The I/O data buffer 270 may receive the 128-bit error-corrected parallel data bits, in response to a clock signal and an address signal, and may convert the 128-bit error-corrected parallel data bits into 64-bit serial data bits and then may output the 64-bit serial data bits. Alternatively, the I/O data buffer 270 may receive and convert the 128-bit error-corrected parallel data bits into 32-bit serial data bits or 16-bit serial data bits and then may output the 32-bit or 16-bit serial data bits.

The I/O data buffer 270 may convert a plurality of pieces of write data that are serially received via the I/O circuit unit 280 into parallel data bits. For example, the I/O data buffer 270 may convert data bits that correspond to a burst length BL=16 and that are serially received via the eight data I/O pads DQ[0:7] into the 128-bit parallel data bits. The I/O data buffer 270 may convert the plurality of pieces of write data into a plurality of pieces of data that correspond to a burst length, in response to the clock signal and the address signal. That is, the I/O data buffer 270 may convert the plurality of pieces of write data into the 128-bit parallel data bits composed of data DATA_BL0 corresponding to a first burst length, data DATA_BL1 corresponding to a second burst length, . . . , and data DATA_BL15 corresponding to a sixteenth burst length. Each of sixteen pieces of data DATA_BL0 through DATA_BL15 corresponding to the first through sixteenth burst lengths, respectively, may be provided to the data masking control unit 320 via third data lines SDIO.

The I/O circuit unit 280 may receive serial data bits output from the I/O data buffer 270, may sequentially array the serial data bits as data bits corresponding to a burst length BL=16, and then may output together the data bits and a data strobe signal DQS to the data I/O pads DQ[0:7].

The I/O circuit unit 280 may receive the data strobe signal DQS and the plurality of pieces of write data that correspond to the burst length BL=16 and that are serially input via the data I/O pads DQ[0:7] from the memory controller 100. The I/O circuit unit 280 may provide the plurality of pieces of serially input write data that correspond to the burst length BL=16 to the I/O data buffer 270.

The I/O circuit unit 280 may provide a data mask signal DM and data masking information about the plurality of pieces of written data to the data masking control unit 320 via the I/O data buffer 270. The data mask signal DM involves selectively masking the data bits that correspond to the burst length BL=16 and that are serially input via the data I/O pads DQ[0:7]. Accordingly, the data masking information includes a plurality of pieces of information about selectively masked burst lengths, and is provided as a first burst length masking signal DM_BL0, a second burst length masking signal DM_BL1, . . . , and a sixteenth burst length masking signal DM_BL15.

The data masking control unit 320 may perform a masking operation on a corresponding burst length of the sixteen pieces of data DATA_BL0 through DATA_BL15 corresponding to the first through sixteenth burst lengths, respectively, that are received via the third data lines SDIO, in response to the first through sixteenth burst length masking signals DM_BL0 through DM_BL15. The masked write data may be provided to the ECC engine unit 260A so that the ECC engine unit 260A may perform an ECC operation according to the masked write operation.

The read operation, the write operation, and the masked write operation that are performed by the memory device 200 in response to the read command READ, the write command WRITE, and the masked write command MWR from the memory controller 100 will now be described in detail with reference to FIGS. 4 through 18.

In the description with reference to FIGS. 4 through 18, in order to distinguish between the masked write operation and the read and write operations, for convenience of description, the read operation is referred to as a normal read operation, and the write operation is referred to as a normal write operation. In the description with reference to FIGS. 4 through 18, the normal read operation, the normal write operation, or the masked write operation is described in relation to the bank A 240A of FIG. 3.

The memory device 200 may receive and a plurality of pieces of output data corresponding to a burst length BL via the eight data I/O pads DQ[0:7]. For convenience of description, FIGS. 4 through 18 illustrate timings at which the plurality of pieces of data correspond to the burst length BL are input and output via one DQ pad.

The memory device 200 may receive an address signal including a back address, a row address, and a column address. In the description with reference to FIGS. 4 through 18, an address signal CAS2 is described as the column address, and a column selection signal CSL corresponding to the column address is activated.

An operation by the memory device 200 may include a high-frequency operation and a low-frequency operation. In the description with reference to FIGS. 4 through 18, it is assumed that the high-frequency operation indicates when the memory device 200 operates with a data rate of about 3200 Mpbs, and the low-frequency operation indicates when the memory device 200 operates with a data rate of about 533 Mpbs. According to embodiments, the high-frequency operation and the low-frequency operation may be variously set as data rates of 2400, 2133, 1867, 1600, 800 Mbps, or the like.

A read latency RL of the memory device 200 means a clock cycle delay between the read command READ and a first bit of the plurality of pieces of valid output data, and a write latency WL means a clock cycle delay between the write command WRITE or the masked write command MWR and a first bit of the plurality of pieces of valid write data. In the description with reference to FIGS. 4 through 18, the read latency RL is described as the clock cycle delay between a last rising edge of a clock CLK and the first bit of the plurality of pieces of valid output data, wherein the clock CLK is input with the address signal CAS2 after the read command READ and the address signal CAS2 are sequentially input. Also, the write latency WL is described as the clock cycle delay between the last rising edge of the clock CLK and the first bit of the plurality of pieces of valid output data, wherein the clock CLK is input with the address signal CAS2 after the write command WRITE or the masked write command MWR and the address signal CAS2 are sequentially input.

In FIGS. 4 through 18, the fact that the read latency RL or the write latency WL corresponds to the clock cycle delay between the first bit of the plurality of pieces of valid read or write data and the last rising edge of the clock CLK that is input with the address signal CAS2 means that a command CMD and an address ADDR are input via CA pads of the memory device 200.

Figure 4:
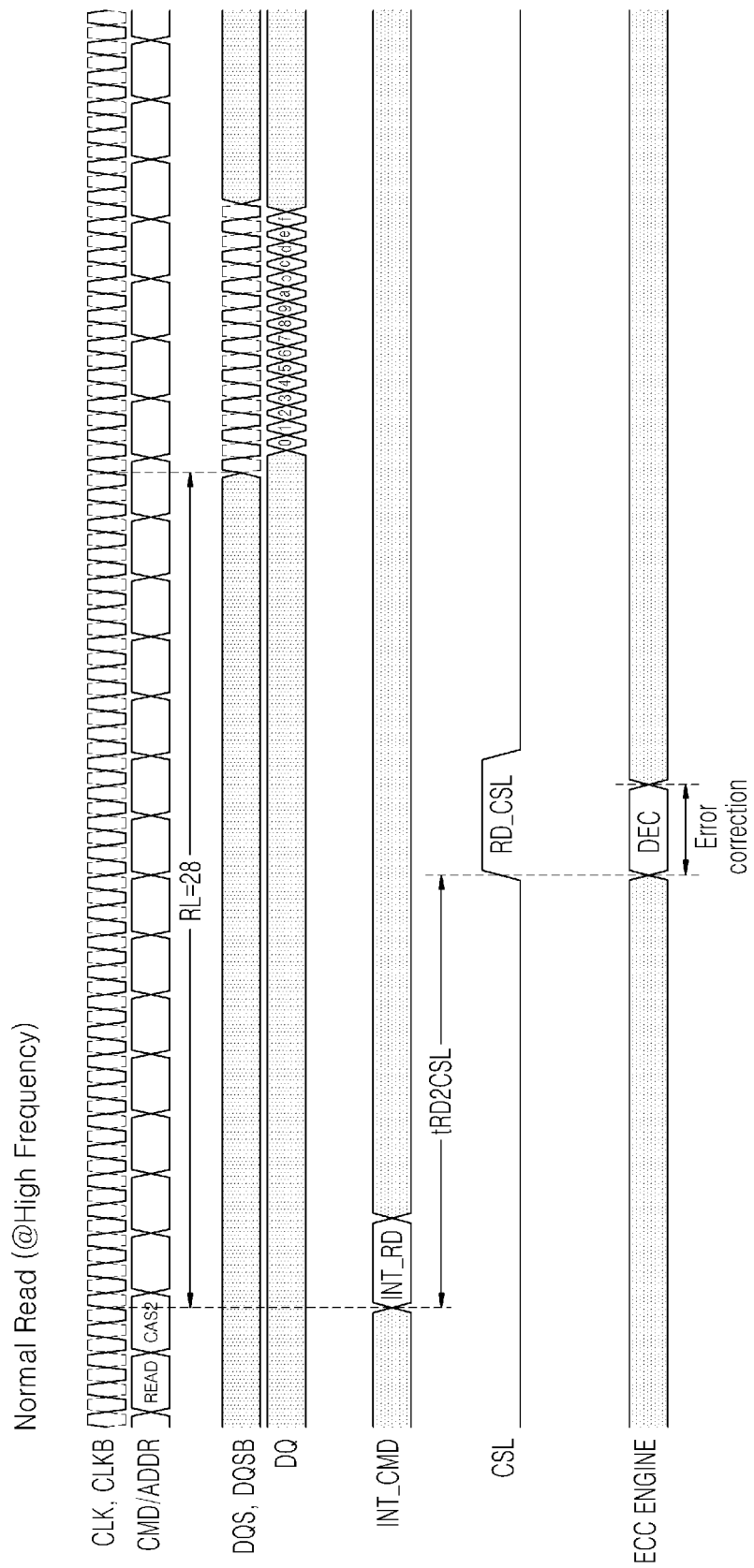
FIG. 4 is a timing diagram of a normal read operation performed by the memory device according to an example embodiment of inventive concepts.

FIG. 4 is a timing diagram of a normal read operation performed by the memory device 200 according to an example embodiment of inventive concepts.

Referring to FIG. 4, the normal read operation is performed at a high frequency by the memory device 200. The normal read operation may start by receiving a read command READ that is issued by the memory controller 100. The memory device 200 may sequentially receive the read command READ and then an address signal CAS2, in synchronization with a rising or falling edge of a clock CLK.

After an elapse of a read latency RL from a last rising edge of the clock CLK that is input with the address signal CAS2, a plurality of pieces of read data 0-1-2-3-4-5-6-7-8-9-a-b-c-d-e-f that correspond to a burst length BL may be output via a DQ pad. The plurality of pieces of read data 0-1-2-3-4-5-6-7-8-9-a-b-c-d-e-f that correspond to the burst length BL and that are output via the DQ pad may be output in synchronization with rising and falling edges of a data strobe signal DQS. In the present embodiment, the read latency RL is set as 28, and the burst length BL is set as 16.

Before the plurality of pieces of read data are output to an outer source of the memory device 200 via the DQ pad, an internal read command INT_RD may be generated in the memory device 200 in synchronization with the last rising edge of the clock CLK that is input with the address signal CAS2. In response to the internal read command INT_RD, a column selection signal RD_CSL that corresponds to the address signal CAS2 and that is connected to memory cells may be activated. Also, in response to the internal read command INT_RD, an ECC decoding signal DEC may be generated.

After an elapse of a time period tRD2CSL from the last rising edge of the clock CLK that is input with the address signal CAS2 and until activation of the column selection signal RD_CSL, the column selection signal RD_CSL may be activated. In response to the activation of the column selection signal RD_CSL, a plurality of pieces of data that are stored in BL0 through BL15 cell blocks and parity bits that are stored in an ECCP cell block may be read.

In response to the ECC decoding signal DEC, the ECC engine unit 260A may generate syndrome data by using the plurality of pieces of read data output from the BL0 through BL15 cell blocks and the parity bits output from the ECCP cell block, may calculate an error bit position, may correct data corresponding to the error bit position, and may output a plurality of pieces of error-corrected data.

The plurality of pieces of error-corrected data may be sequentially arrayed as data bits 0-1-2-3-4-5-6-7-8-9-a-b-c-d-e-f that correspond to the burst length BL=16 and may be output with the data strobe signal DQS to the data I/O pads DQ[0:7].

Figure 5:
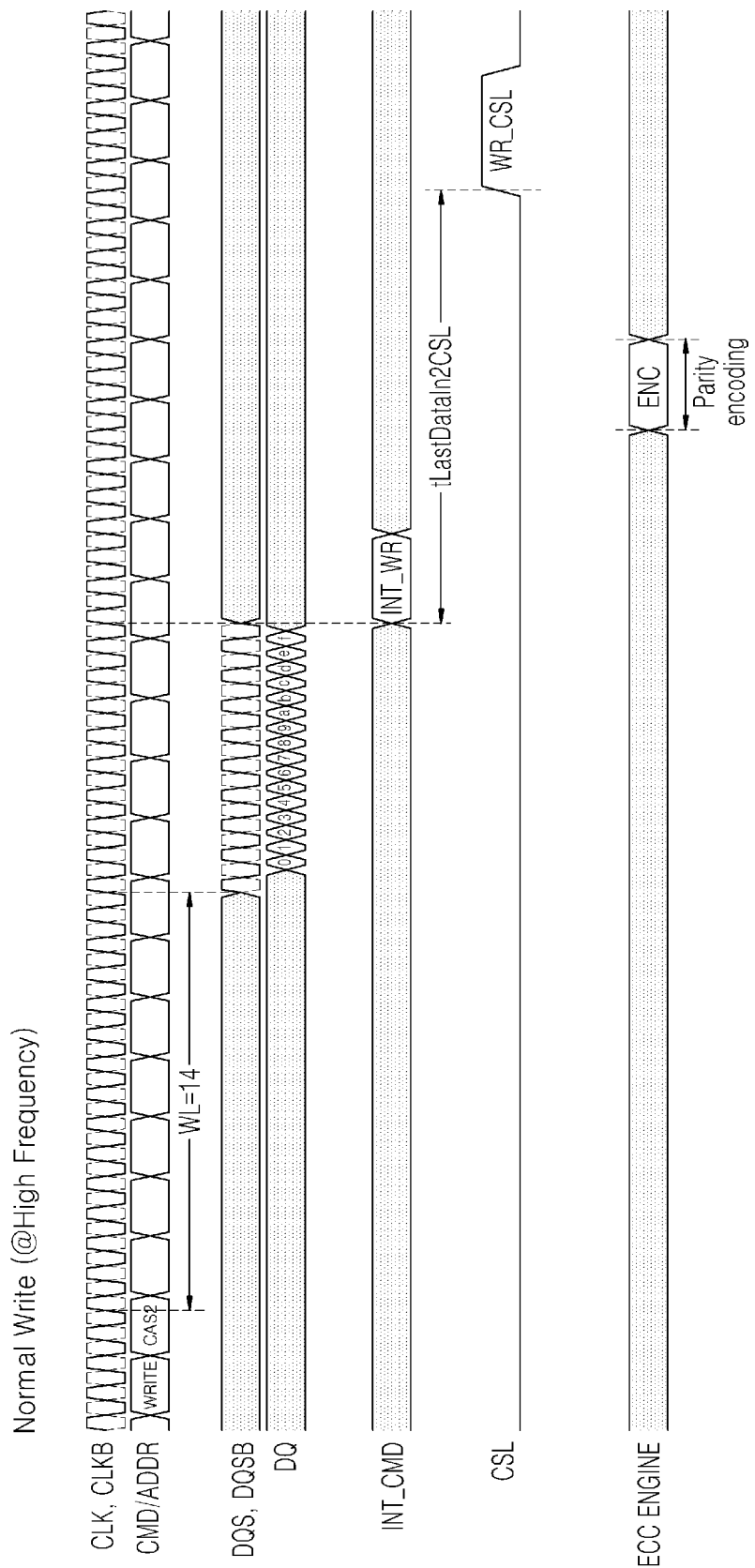
FIG. 5 is a timing diagram of a normal write operation performed by the memory device according to an example embodiment of inventive concepts.

FIG. 5 is a timing diagram of a normal write operation performed by the memory device 200 according to an example embodiment of inventive concepts.

Referring to FIG. 5, the normal write operation is performed at a high frequency by the memory device 200. The normal write operation may start by receiving a write command WRITE that is issued by the memory controller 100. The memory device 200 may sequentially receive the write command WRITE and then an address signal CAS2, in synchronization with a rising or falling edge of a clock CLK.

After an elapse of a write latency WL from a last rising edge of the clock CLK that is input with the address signal CAS2, a plurality of pieces of write data corresponding to a burst length BL may be input via a DQ pad. The plurality of pieces of write data 0-1-2-3-4-5-6-7-8-9-a-b-c-d-e-f that correspond to the burst length BL and that are input via the DQ pad may be input in synchronization with rising and falling edges of a data strobe signal DQS. In the present embodiment, the write latency WL is set as 28, and the burst length BL is set as 16.

When the plurality of pieces of write data corresponding to the burst length BL=16 are input via the DQ pad, after last write data is input, the memory device 200 may internally generate an internal write command INT_WR, in synchronization with the rising edge of the clock CLK. Also, in response to the internal write command INT_WR, an ECC encoding signal ENC may be generated, and a column selection signal WR_CSL that corresponds to the address signal CAS2 and that is connected to memory cells may be activated. After an elapse of a time period tLastDataIn2CSL from the rising edge of the clock CLK after the input of the last write data and until activation of the column selection signal WR_CSL, the column selection signal WR_CSL may be activated.

In response to the ECC encoding signal ENC, the ECC engine unit 260A may generate parity bits with respect to the plurality of pieces of write data 0-1-2-3-4-5-6-7-8-9-a-b-c-d-e-f that are input via the DQ pad. The plurality of pieces of write data 0-1-2-3-4-5-6-7-8-9-a-b-c-d-e-f and the parity bits may be stored in the BL0 through BL15 cell blocks and the ECCP cell block which are selected in response to the column selection signal WR_CSL.

FIG. 6 illustrates a data masking scheme of the memory device 200 according to an example embodiment of inventive concepts.

Referring to FIG. 6, in response to a masked write command MWR by the memory controller 100, a masked write operation may be performed so that some of a plurality of pieces of write data of the memory device 200 are not written. For example, the plurality of pieces of write data 0-1-2-3-4-5-6-7-8-9-a-b-c-d-e-f that correspond to a burst length BL=16 may be serially input via the eight data I/O pad DQ[0:7] of the memory device 200. A data mask signal DM and the plurality of pieces of write data may be input together via the eight data I/O pad DQ[0:7]. For example, the data mask signal DM may be input with a logic high level (i.e., '1') so as to mask data that corresponds to a second burst length BL=1 from among the plurality of pieces of write data.

The memory device 200 may control the data not to be written to a BL1 cell block, wherein the data corresponds to the second burst length BL=1 from among the plurality of pieces of write data, and may control the rest of the plurality of pieces of write data, other than the data that corresponds to the second burst length BL=1, to be written to a BL0 cell block and BL2 through BL15 cell blocks. The memory device 200 may write the plurality of pieces of write data in which the data corresponding to the second burst length BL=1 is masked to the BL0 cell block and the BL2 through BL15 cell blocks.

Figure 7:
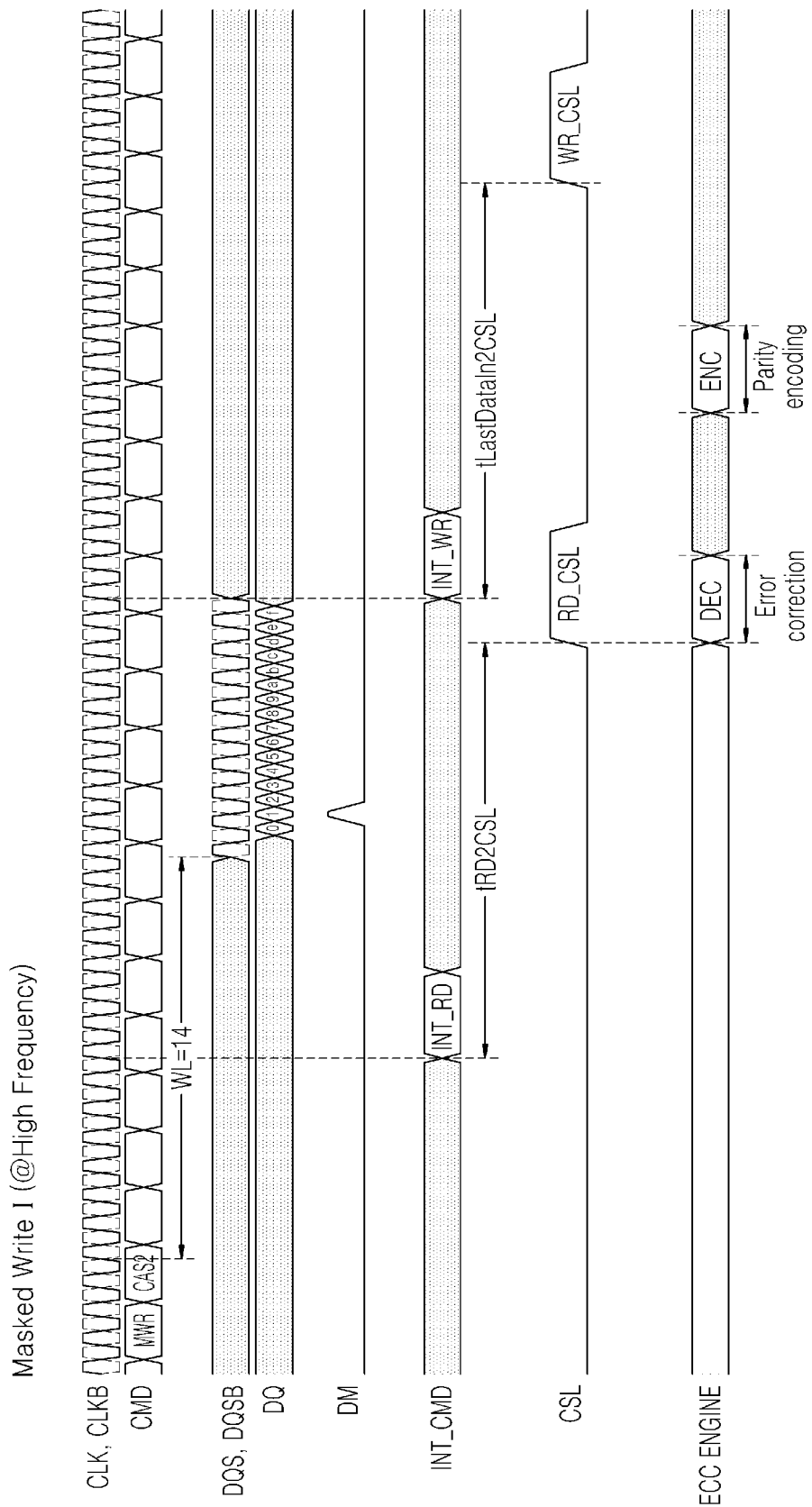
FIG. 7 is a timing diagram of a masked write operation performed by the memory device according to an example embodiment of inventive concepts.

FIG. 7 is a timing diagram of a masked write operation performed by the memory device 200, according to an embodiment of the inventive concept.

Referring to FIG. 7, the masked write operation is performed at a high frequency by the memory device 200.

The masked write operation may start by receiving a masked write command MWR that is issued by the memory controller 100.

The memory controller 100 issued the write command WRITE so as to command the normal write operation by the memory device 200 with reference to the embodiment of FIG. 5. During the normal write operation of FIG. 5, after the last write data is input and then the elapse of the time period tLastDataIn2CSL, the plurality of pieces of write data may be finally stored in BL0 through BL15 cell blocks selected in response to the column selection signal WR_CSL. During the masked write operation according to the present embodiment, after the last write data is input and then the elapse of the time period tLastDataIn2CSL, masked written data may be stored in the BL0 through BL15 cell blocks selected in response to the column selection signal WR_CSL. By doing so, it is possible to expect that an end of the normal write operation and an end of the masked write operation, performed by the memory device 200, may be simultaneously performed after the plurality of pieces of write data are input. Accordingly, the memory controller 100 may not have to distinguish between the normal write operation and the masked write operation and therefore may issue a command for a next operation of the memory device 200. That is, it is possible to achieve a smooth interface between the memory controller 100 and the memory device 200.

The memory device 200 may receive the masked write command MWR and then an address signal CAS2, in synchronization with a rising or falling edge of a clock CLK.

After a write latency WL from a last rising edge of the clock CLK that is input with the address signal CAS2, the plurality of pieces of write data may be input via a DQ pad. After the write latency WL, e.g., after WL=14, a plurality of pieces of write data 0-1-2-3-4-5-6-7-8-9-a-b-c-d-e-f that correspond to a burst length BL=16 may be input via the DQ pad in synchronization with rising and falling edges of a data strobe signal DQS.

A data mask signal DM having a logic high level (i.e., '1') may be input so as to mask data that corresponds to a second burst length BL=1 from among the plurality of pieces of write data. Accordingly, the plurality of pieces of write data in which the data corresponding to the second burst length BL=1 is masked may be input.

The memory device 200 may control read-modification-write operations to be internally performed, in response to the masked write command MWR from the memory controller 100. The memory device 200 may generate an internal read command INT_RD and an internal write command INT_WR, in response to the masked write command MWR.

The internal read command INT_RD may be generated before the elapse of a write latency WL=14, by a given (or alternatively desired or predetermined) rising or falling edge of the clock CLK. For example, the internal read command INT_RD may be generated before the elapse of the write latency WL=14, by a tCCD timing. The tCCD timing may be defined as a CAS-to-CAS command delay time.

In response to the internal read command INT_RD, a column selection signal RD_CSL that corresponds to the address signal CAS2 and that is connected to memory cells configured to store the plurality of pieces of write data may be activated and an ECC decoding signal DEC may be generated. After an elapse of a time period tRD2CSL from the last rising edge of the clock CLK that is input with the address signal CAS2 and until activation of the column selection signal RD_CSL, the column selection signal RD_CSL may be activated. In response to the activation of the column selection signal RD_CSL, a plurality of pieces of data that are stored in the BL0 through BL15 cell blocks and parity bits that are stored in an ECCP cell block may be read.

In response to the ECC decoding signal DEC, the ECC engine unit 260A may perform error bit detection and correction by using the plurality of pieces of read data output from the BL0 through BL15 cell blocks and the parity bits output from the ECCP cell block. Accordingly, the ECC engine unit 260A may have a plurality of pieces of error-corrected data read from the BL0 through BL15 cell blocks.

The internal write command INT_WR may be generated in synchronization with a rising edge of the clock CLK, after last data of the plurality of pieces of write data corresponding to the burst length BL=16 is input via the DQ pad.

In response to the internal write command INT_WR, an ECC encoding signal ENC may be generated. Also, in response to the internal write command INT_WR, the column selection signal WR_CSL that corresponds to the address signal CAS2 and that is connected to memory cells may be activated.

The column selection signal WR_CSL that is activated in response to the internal write command INT_WR is the same as the column selection signal RD_CSL that is activated in response to the internal read command INT_RD. It is because the column selection signal WR_CSL and the column selection signal RD_CSL are activated in response to the same address signal CAS2. For convenience of description, it is assumed that the column selection signal RD_CSL is related to a read operation, and the column selection signal WR_CSL is related to a write operation.

In response to the ECC encoding signal ENC, the ECC engine unit 260A may generate parity bits with respect to the plurality of pieces of write data in which the data corresponding to the second burst length BL=1 is masked, and read data of the BL1 cell block from among the plurality of pieces of read data of the BL0 through BL15 cell blocks which are error-corrected in response to the ECC decoding signal DEC.

After an elapse of a time period tLastDataIn2CSL from the rising edge of the clock CLK after the input of the last write data and until activation of the column selection signal WR_CSL, the column selection signal WR_CSL may be activated.

In response to the column selection signal WR_CSL, the plurality of pieces of write data in which the data corresponding to the second burst length BL=1 is masked, and the parity bits may be stored the BL0 cell block, the BL2 through BL15 cell blocks, and the ECCP cell block which are selected in response to the column selection signal WR_CSL.

In at least this example embodiment, the masked write operation performed by the memory device 200 may have timing constraints as shown in Tables 1 and 2, during an interface with the memory controller 100. Table 1 shows timing constraints during a period from after the memory controller 100 applies a current normal write command WRITE or a current masked write command MWR to one bank of the memory device 200 until the memory controller 100 applies a next write command WRITE or a next masked write command MWR to the same bank.

TABLE 1

| | Next Command | |
| --- | --- | --- |
| Current Command | write command (WRITE) | masked write command (MWR) |
| write command (WRITE) | tCCD | tCCDMW |
| masked write command (MWR) | tCCD | tCCDMW |

Referring to Table 1, a tCCD timing constraint occurs during a period from after the current normal write command WRITE or the current masked write command MWR is applied until the next write command WRITE 15 applied. Also, a tCCDMW timing constraint occurs during a period from after the current normal write command WRITE or the current masked write command MWR is applied until the next masked write command MWR is applied. A tCCD timing may be defined as a CAS-to-CAS delay time. A tCCDMW timing indicates a time taken to complete a write operation with respect to the plurality of pieces of write data, and may be defined as a 4*tCCD timing.

Table 2 shows timing constraints during a period from after the memory controller 100 applies a current normal write command WRITE or a current masked write command MWR to one bank of the memory device 200 until the memory controller 100 applies a next write command WRITE or a next masked write command MWR to another bank.

TABLE 2

| | Next Command | |
| --- | --- | --- |
| Current Command | write command (WRITE) | masked write command (MWR) |
| write command (WRITE) | tCCD | tCCD |
| masked write command (MWR) | tCCD | tCCD |

Referring to Table 2, a tCCD timing constraint occurs during a period from after the current normal write command WRITE or the current masked write command MWR is applied until the next write command WRITE 15 applied. Also, the tCCD timing constraint also occurs during a period from after the current normal write command WRITE or the current masked write command MWR is applied until the next masked write command MWR is applied. Accordingly, the memory controller 100 may issue a command for a next operation of the memory device 200, without timing constraints due to the normal write command WRITE and the masked write command MWR, so that it is possible to achieve a smooth interface between the memory controller 100 and the memory device 200.

Figure 8:
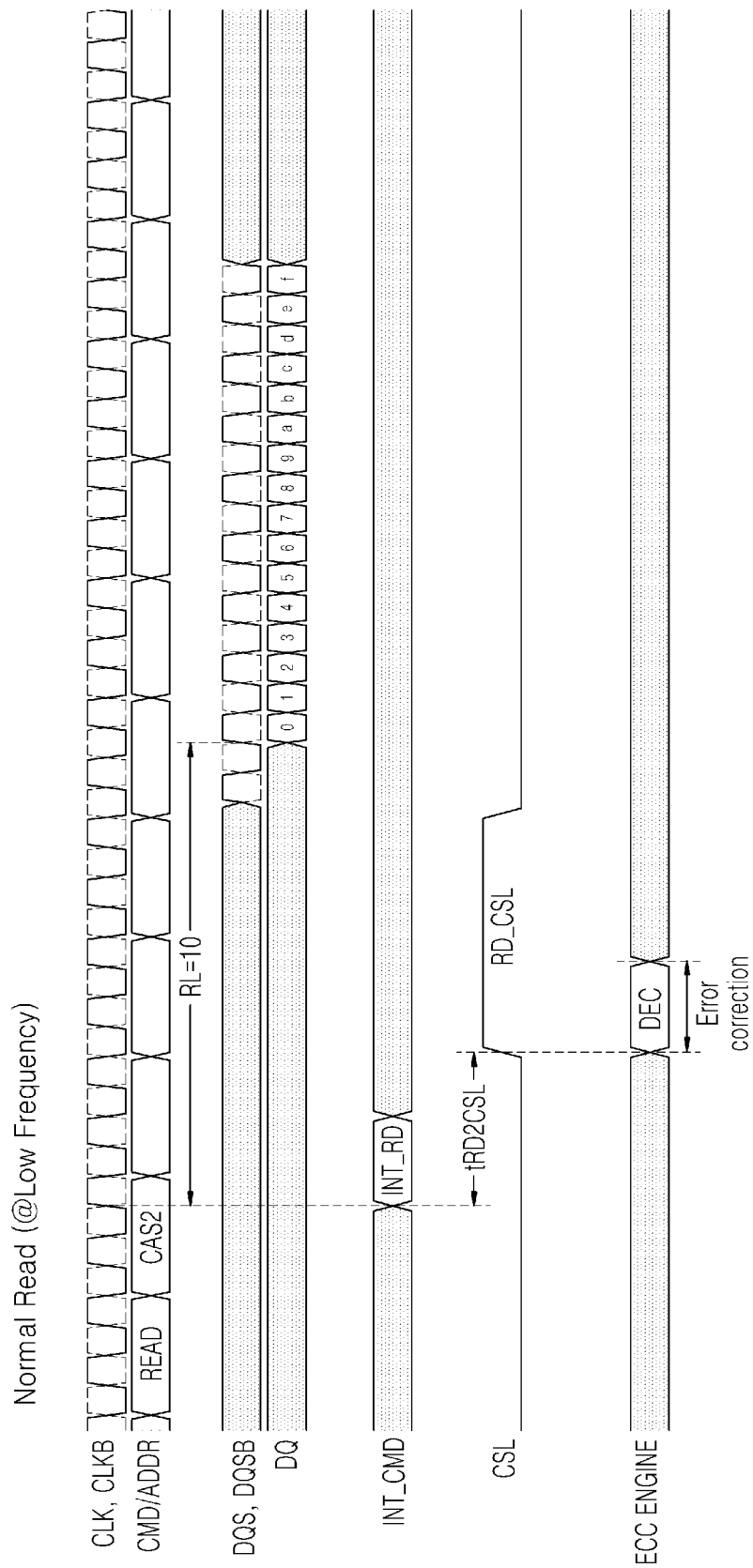
FIG. 8 is a timing diagram of a normal read operation performed by the memory device according to another example embodiment of inventive concepts.

FIG. 8 is a timing diagram of a normal read operation performed by the memory device 200 according to another example embodiment of inventive concepts.

Referring to FIG. 8, the normal read operation is performed at a low frequency by the memory device 200. The normal read operation may start by receiving a read command READ that is issued by the memory controller 100. The memory device 200 may sequentially receive the read command READ and then an address signal CAS2, in synchronization with a rising or falling edge of a clock CLK. In the present embodiment, a read latency is set as RL=10, and a burst length is set as BL=16.

After an elapse of the read latency RL=10 from a last rising edge of the clock CLK that is input with the address signal CAS2, a plurality of pieces of read data 0-1-2-3-4-5-6-7-8-9-a-b-c-d-e-f corresponding to the burst length BL=16 may be output via a DQ pad. The plurality of pieces of read data 0-1-2-3-4-5-6-7-8-9-a-b-c-d-e-f that correspond to the burst length BL=16 and that are output via the DQ pad may be output in synchronization with rising and falling edges of a data strobe signal DQS.

Before the plurality of pieces of read data are output to an outer source of the memory device 200 via the DQ pad, an internal read command INT_RD may be generated in the memory device 200 in synchronization with the last rising edge of the clock CLK that is input with the address signal CAS2. The internal read command INT_RD may be generated in the memory device 200 in synchronization with the last rising edge of the clock CLK that is input with the address signal CAS2 according to information indicating the read latency RL=10.

In response to the internal read command INT_RD, a column selection signal RD_CSL that corresponds to the address signal CAS2 and that is connected to memory cells may be activated. Also, in response to the internal read command INT_RD, an ECC decoding signal DEC may be generated.

After an elapse of a time period tRD2CSL from the last rising edge of the clock CLK that is input with the address signal CAS2 and until activation of the column selection signal RD_CSL, the column selection signal RD_CSL may be activated. In response to the activation of the column selection signal RD_CSL, a plurality of pieces of data that are stored in BL0 through BL15 cell blocks and parity bits that are stored in an ECCP cell block may be read.

In response to the ECC decoding signal DEC, the ECC engine unit 260A may generate syndrome data by using the plurality of pieces of read data output from the BL0 through BL15 cell blocks and the parity bits output from the ECCP cell block, may calculate an error bit position, may correct data corresponding to the error bit position, and may output a plurality of pieces of error-corrected data.

The plurality of pieces of error-corrected data may be sequentially arrayed as data bits 0-1-2-3-4-5-6-7-8-9-a-b-c-d-e-f that correspond to the burst length BL=16 and may be output with the data strobe signal DQS to the data I/O pads DQ[0:7].

Figure 9:
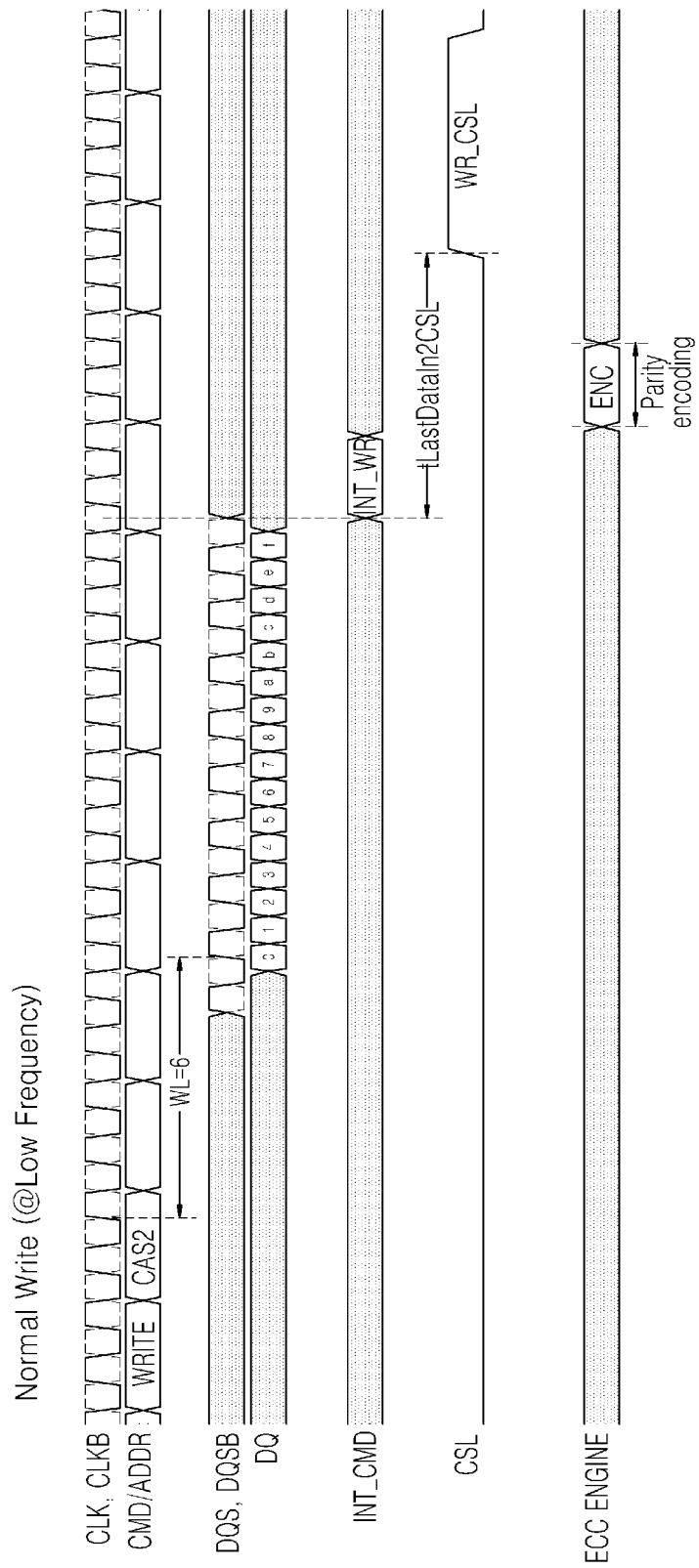
FIG. 9 is a timing diagram of a normal write operation performed by the memory device according to another example embodiment of inventive concepts.

FIG. 9 is a timing diagram of a normal write operation performed by the memory device 200 according to another example embodiment of inventive concepts.

Referring to FIG. 9, the normal write operation is performed at a low frequency by the memory device 200. The normal write operation may start by receiving a write command WRITE that is issued by the memory controller 100. The memory device 200 may sequentially receive the write command WRITE and then an address signal CAS2, in synchronization with a rising or falling edge of a clock CLK. In the present embodiment, a write latency WL is set as 6, and a burst length BL is set as 16.

After an elapse of a write latency WL=6 from a last rising edge of the clock CLK that is input with the address signal CAS2, a plurality of pieces of write data corresponding to the burst length BL=16 may be input via a DQ pad. The plurality of pieces of write data 0-1-2-3-4-5-6-7-8-9-a-b-c-d-e-f that correspond to the burst length BL and that are input via the DQ pad may be input in synchronization with rising and falling edges of a data strobe signal DQS.

When the plurality of pieces of write data 0-1-2-3-4-5-6-7-8-9-a-b-c-d-e-f corresponding to the burst length BL=16 are input via the DQ pad, after last write data is input, the memory device 200 may internally generate an internal write command INT_WR, in synchronization with the rising edge of the clock CLK. The internal write command INT_WR may be generated in synchronization with the rising edge of the clock CLK that is input with the address signal CAS2 based on information indicating the write latency WL=6.

In response to the internal write command INT_WR, an ECC encoding signal ENC may be generated. Also, in response to the internal write command INT_WR, a column selection signal WR_CSL that corresponds to the address signal CAS2 and that is connected to memory cells may be activated. After an elapse of a time period tLastDataIn2CSL from the rising edge of the clock CLK after the input of the last write data and until activation of the column selection signal WR_CSL, the column selection signal WR_CSL may be activated.

In response to the ECC encoding signal ENC, the ECC engine unit 260A may generate parity bits with respect to the plurality of pieces of write data 0-1-2-3-4-5-6-7-8-9-a-b-c-d-e-f that are input via the DQ pad. The plurality of pieces of write data 0-1-2-3-4-5-6-7-8-9-a-b-c-d-e-f and the parity bits may be stored in BL0 through BL15 cell blocks and an ECCP cell block which are selected in response to the column selection signal WR_CSL.

Figure 10:
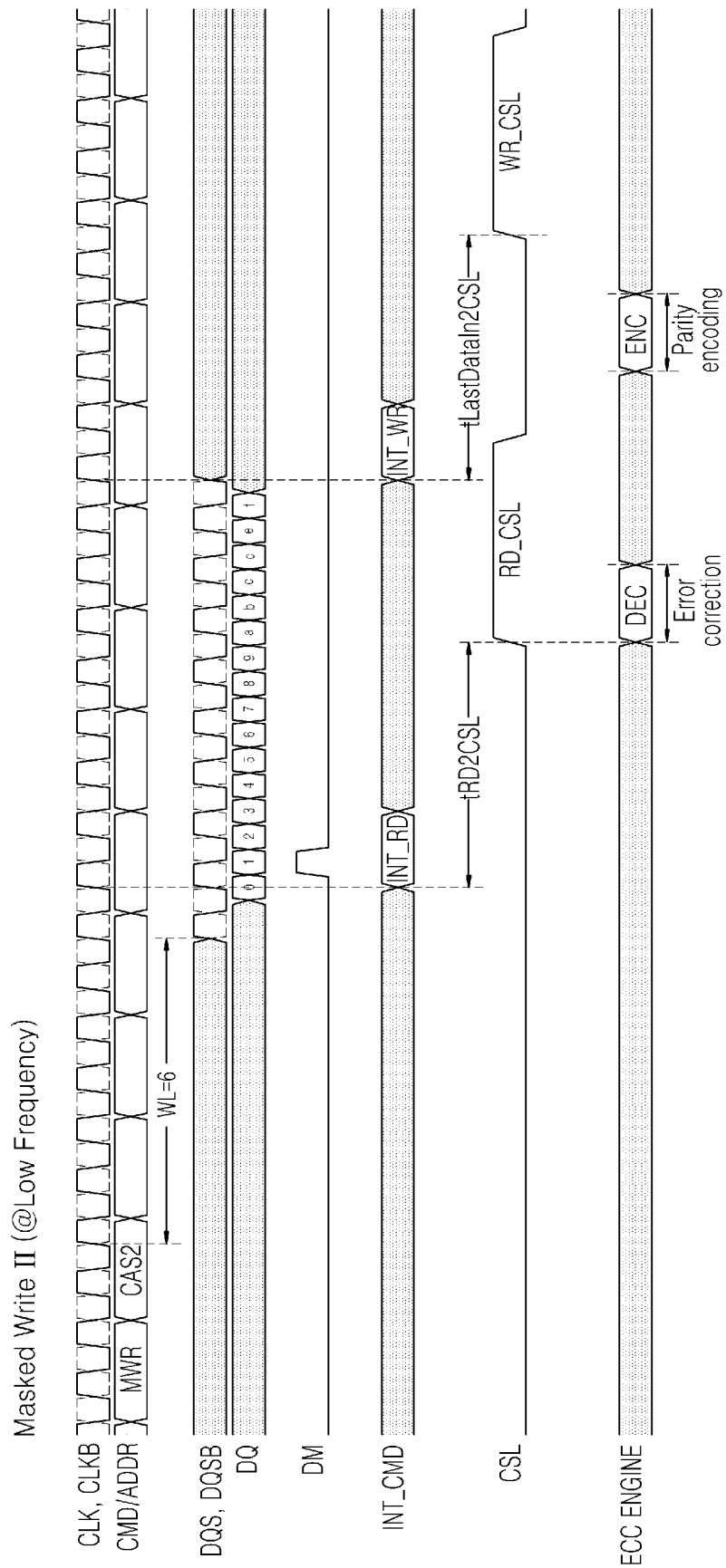
FIG. 10 is a timing diagram of a masked write operation performed by the memory device according to an example embodiment of inventive concepts.

FIG. 10 is a timing diagram of a masked write operation performed by the memory device 200 according to an example embodiment of inventive concepts.

Referring to FIG. 10, the masked write operation is performed at a low frequency by the memory device 200. The masked write operation may start by receiving a masked write command MWR that is issued by the memory controller 100. The memory device 200 may receive the masked write command MWR and then an address signal CAS2, in synchronization with a rising or falling edge of a clock CLK. In the present embodiment, a write latency WL is set as 6, and a burst length BL is set as 16.

After the write latency WL=6 from a last rising edge of the clock CLK that is input with the address signal CAS2, a plurality of pieces of write data 0-1-2-3-4-5-6-7-8-9-a-b-c-d-e-f that correspond to the burst length BL=16 may be input via a DQ pad. After the write latency WL=6, a plurality of pieces of write data 0-1-2-3-4-5-6-7-8-9-a-b-c-d-e-f that correspond to the burst length BL=16 may be input via the DQ pad in synchronization with rising and falling edges of a data strobe signal DQS.

A data mask signal DM having a logic high level (i.e., '1') may be input so as to mask data that corresponds to a second burst length BL=1 from among the plurality of pieces of write data. Accordingly, the plurality of pieces of write data in which the data corresponding to the second burst length BL=1 is masked may be input.

In response to the masked write command MWR, the memory device 200 may generate an internal read command INT_RD and an internal write command INT_WR.

The internal read command INT_RD may be generated in synchronization with the rising edge of the clock CLK, after first data of the plurality of pieces of write data 0-1-2-3-4-5-6-7-8-9-a-b-c-d-e-f that correspond to the burst length BL=16 is input via the DQ. The internal read command INT_RD may be generated in synchronization with the rising edge of the clock CLK, after the first data of the plurality of pieces of write data is input based on information indicating the write latency WL=6.

In response to the internal read command INT_RD, a column selection signal RD_CSL that corresponds to the address signal CAS2 and that is connected to memory cells may be activated and an ECC decoding signal DEC may be generated. After an elapse of a time period tRD2CSL from the last rising edge of the clock CLK that is input with the address signal CAS2 and until activation of the column selection signal RD_CSL, the column selection signal RD_CSL may be activated. In response to the activation of the column selection signal RD_CSL, a plurality of pieces of data that are stored in BL0 through BL15 cell blocks and parity bits that are stored in an ECCP cell block may be read.

In response to the ECC decoding signal DEC, the ECC engine unit 260A may perform error bit detection and correction by using the plurality of pieces of read data output from the BL0 through BL15 cell blocks and the parity bits output from the ECCP cell block. Accordingly, the ECC engine unit 260A may have a plurality of pieces of error-corrected data read from the BL0 through BL15 cell blocks.

The internal write command INT_WR may be generated in synchronization with a rising edge of the clock CLK, after last data of the plurality of pieces of write data corresponding to the burst length BL=16 is input via the DQ pad. The internal write command INT_WR may be generated in synchronization with the rising edge of the clock CLK, after the last data of the plurality of pieces of write data is input via the DQ pad based on the information indicating the write latency WL=6.

In response to the internal write command INT_WR, an ECC encoding signal ENC may be generated. Also, in response to the internal write command INT_WR, the column selection signal WR_CSL that corresponds to the address signal CAS2 and that is connected to memory cells may be activated.

In response to the ECC encoding signal ENC, the ECC engine unit 260A may generate parity bits with respect to the plurality of pieces of write data in which the data corresponding to the second burst length BL=1 is masked, and read data of the BL1 cell block from among the plurality of pieces of read data of the BL0 through BL15 cell blocks which are error-corrected in response to the ECC decoding signal DEC.

After an elapse of a time period tLastDataIn2CSL from the rising edge of the clock CLK after the input of the last write data and until activation of the column selection signal WR_CSL, the column selection signal WR_CSL may be activated.

In response to the column selection signal WR_CSL, the plurality of pieces of write data in which the data corresponding to the second burst length BL=1 is masked, and the parity bits may be stored in the BL0 cell block, the BL2 through BL15 cell blocks, and the ECCP cell block which are selected in response to the column selection signal WR_CSL.

Figure 11:
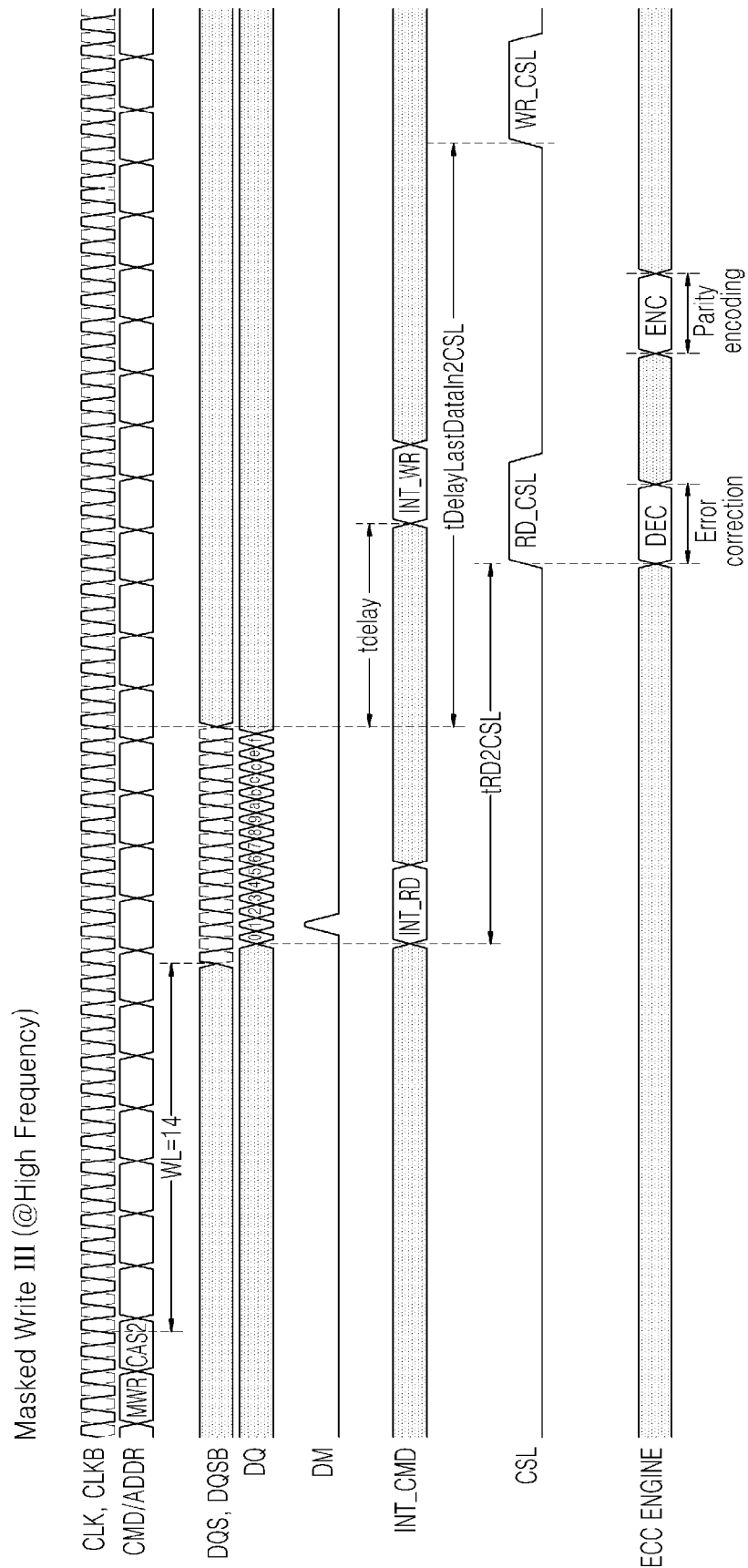
FIG. 11 is a timing diagram of a masked write operation performed by the memory device according to another example embodiment of inventive concepts.

FIG. 11 is a timing diagram of a masked write operation performed by the memory device 200 according to another example embodiment of inventive concepts.

Referring to FIG. 11, the masked write operation is performed at a high frequency by the memory device 200. The masked write operation may start by receiving a masked write command MWR that is issued by the memory controller 100. The memory device 200 may receive the masked write command MWR and then an address signal CAS2, in synchronization with a rising or falling edge of a clock CLK. In the present embodiment, a write latency WL is set as 14, and a burst length BL is set as 16.

After the write latency WL=14 from a last rising edge of the clock CLK that is input with the address signal CAS2, a plurality of pieces of write data 0-1-2-3-4-5-6-7-8-9-a-b-c-d-e-f that correspond to the burst length BL=16 may be input via a DQ pad. After the write latency WL=14, the plurality of pieces of write data 0-1-2-3-4-5-6-7-8-9-a-b-c-d-e-f that correspond to the burst length BL=16 may be input via the DQ pad in synchronization with rising and falling edges of a data strobe signal DQS.

A data mask signal DM having a logic high level (i.e., '1') may be input so as to mask data that corresponds to a second burst length BL=1 from among the plurality of pieces of write data. Accordingly, the plurality of pieces of write data in which the data corresponding to the second burst length BL=1 is masked may be input.

In response to the masked write command MWR, the memory device 200 may generate an internal read command INT_RD and an internal write command INT_WR.

The internal read command INT_RD may be generated in synchronization with the rising edge of the clock CLK, after first data of the plurality of pieces of write data 0-1-2-3-4-5-6-7-8-9-a-b-c-d-e-f that correspond to the burst length BL=16 is input via the DQ.

In response to the internal read command INT_RD, a column selection signal RD_CSL that corresponds to the address signal CAS2 and that is connected to memory cells may be activated and an ECC decoding signal DEC may be generated. After an elapse of a time period tRD2CSL from the last rising edge of the clock CLK that is input with the address signal CAS2 and until activation of the column selection signal RD_CSL, the column selection signal RD_CSL may be activated. In response to the activation of the column selection signal RD_CSL, a plurality of pieces of data that are stored in BL0 through BL15 cell blocks and parity bits that are stored in an ECCP cell block may be read.

In response to the ECC decoding signal DEC, the ECC engine unit 260A may perform error bit detection and correction by using the plurality of pieces of read data output from the BL0 through BL15 cell blocks and the parity bits output from the ECCP cell block. Accordingly, the ECC engine unit 260A may have a plurality of pieces of error-corrected data read from the BL0 through BL15 cell blocks.

The internal write command INT_WR may be generated in synchronization with a rising edge of the clock CLK, after last data of the plurality of pieces of write data corresponding to the burst length BL=16 is input via the DQ pad and then a given (or alternatively desired or predetermined) time tdelay elapses.

In response to the internal write command INT_WR, an ECC encoding signal ENC may be generated. Also, in response to the internal write command INT_WR, the column selection signal WR_CSL that corresponds to the address signal CAS2 and that is connected to memory cells may be activated.

In response to the ECC encoding signal ENC, the ECC engine unit 260A may generate parity bits with respect to the plurality of pieces of write data in which the data corresponding to the second burst length BL=1 is masked, and read data of the BL1 cell block from among the plurality of pieces of read data of the BL0 through BL15 cell blocks which are error-corrected in response to the ECC decoding signal DEC.

After an elapse of a time period tDelayLastDataIn2CSL from the rising edge of the clock CLK after the input of the last write data and until activation of the column selection signal WR_CSL, the column selection signal WR_CSL may be activated.

In response to the column selection signal WR_CSL, the plurality of pieces of write data in which the data corresponding to the second burst length BL=1 is masked, and the parity bits may be stored in the BL0 cell block, the BL2 through BL15 cell blocks, and the ECCP cell block which are selected in response to the column selection signal WR_CSL.

Figure 12:
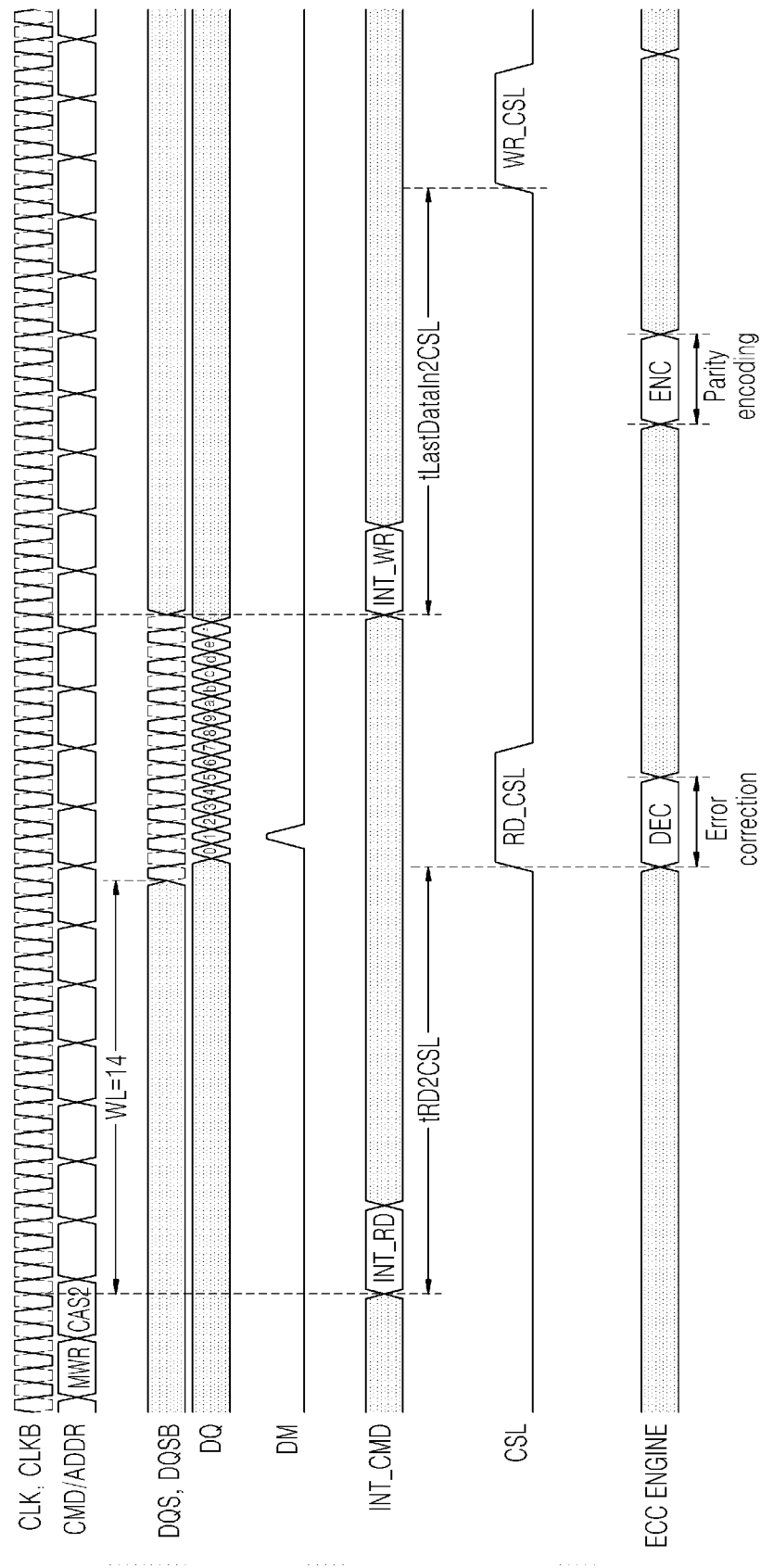
FIG. 12 is a timing diagram of a masked write operation performed by the memory device according to another example embodiment of inventive concepts.

FIG. 12 is a timing diagram of a masked write operation performed by the memory device 200 according to another example embodiment of inventive concepts.

Referring to FIG. 12, the masked write operation is performed at a high frequency by the memory device 200. The masked write operation may start by receiving a masked write command MWR that is issued by the memory controller 100. The memory device 200 may receive the masked write command MWR and then an address signal CAS2, in synchronization with a rising or falling edge of a clock CLK. In the present embodiment, a write latency WL is set as 14, and a burst length BL is set as 16.

After the write latency WL=14 from a last rising edge of the clock CLK that is input with the address signal CAS2, a plurality of pieces of write data -1-2-3-4-5-6-7-8-9-a-b-c-d-e-f that correspond to the burst length BL=16 may be input via a DQ pad. After the write latency WL=14, the plurality of pieces of write data 0-1-2-3-4-5-6-7-8-9-a-b-c-d-e-f that correspond to the burst length BL=16 may be input via the DQ pad in synchronization with rising and falling edges of a data strobe signal DQS.

A data mask signal DM having a logic high level (i.e., '1') may be input so as to mask data that corresponds to a second burst length BL=1 from among the plurality of pieces of write data. Accordingly, the plurality of pieces of write data in which the data corresponding to the second burst length BL=1 is masked may be input.

In response to the masked write command MWR, the memory device 200 may generate an internal read command INT_RD and an internal write command INT_WR.

The internal read command INT_RD may be generated in synchronization with the rising edge of the clock CLK that is input with the address signal CAS2.

In response to the internal read command INT_RD, a column selection signal RD_CSL that corresponds to the address signal CAS2 and that is connected to memory cells may be activated and an ECC decoding signal DEC may be generated. After an elapse of a time period tRD2CSL from the last rising edge of the clock CLK that is input with the address signal CAS2 and until activation of the column selection signal RD_CSL, the column selection signal RD_CSL may be activated. In response to the activation of the column selection signal RD_CSL, a plurality of pieces of data that are stored in BL0 through BL15 cell blocks and parity bits that are stored in an ECCP cell block may be read.

In response to the ECC decoding signal DEC, the ECC engine unit 260A may perform error bit detection and correction by using the plurality of pieces of read data output from the BL0 through BL15 cell blocks and the parity bits output from the ECCP cell block. Accordingly, the ECC engine unit 260A may have a plurality of pieces of error-corrected data read from the BL0 through BL15 cell blocks.

The internal write command INT_WR may be generated in synchronization with a rising edge of the clock CLK, after last data of the plurality of pieces of write data corresponding to the burst length BL=16 is input via the DQ pad.

In response to the internal write command INT_WR, an ECC encoding signal ENC may be generated. Also, in response to the internal write command INT_WR, the column selection signal WR_CSL that corresponds to the address signal CAS2 and that is connected to memory cells may be activated.

In response to the ECC encoding signal ENC, the ECC engine unit 260A may generate parity bits with respect to the plurality of pieces of write data in which the data corresponding to the second burst length BL=1 is masked, and read data of the BL1 cell block from among the plurality of pieces of read data of the BL0 through BL15 cell blocks which are error-corrected in response to the ECC decoding signal DEC.

After an elapse of a time period tLastDataIn2CSL from the rising edge of the clock CLK after the input of the last write data and until activation of the column selection signal WR_CSL, the column selection signal WR_CSL may be activated.

In response to the column selection signal WR_CSL, the plurality of pieces of write data in which the data corresponding to the second burst length BL=1 is masked, and the parity bits may be stored in the BL0 cell block, the BL2 through BL15 cell blocks, and the ECCP cell block which are selected in response to the column selection signal WR_CSL.

Figure 13:
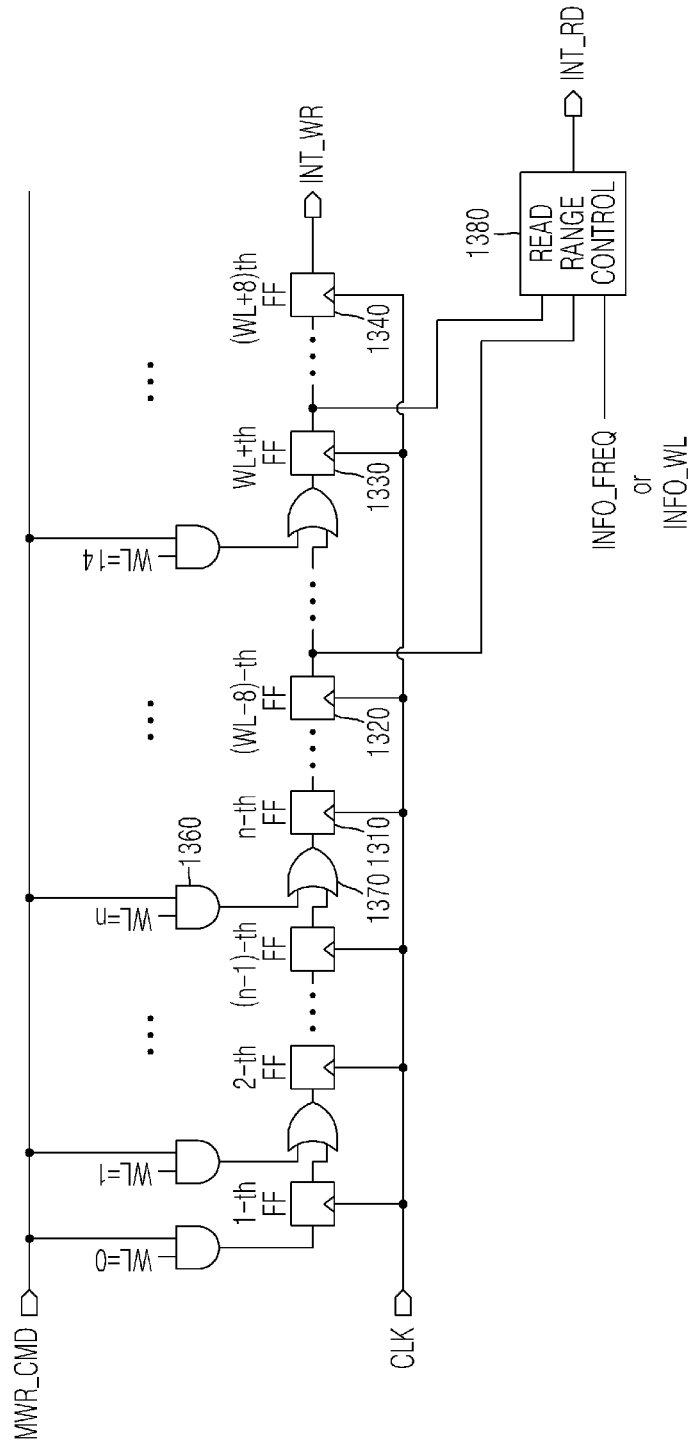
FIG. 13 illustrates a command control logic unit according to an example embodiment of inventive concepts.

FIG. 13 illustrates a command control logic unit according to an example embodiment of inventive concepts. The command control logic unit (refer to the command control logic unit 220 of FIG. 1) may generate an internal command INT_CMD according to a command CMD received from the memory controller 100. In the present embodiment, the command control logic unit generates an internal read command INT_RD and an internal write command INT_WR, in response to a masked write command MWR. An operation by the command control logic unit may be described with reference to the masked write operations described in relation to FIGS. 7, 10, 11, and 12.

Referring to FIG. 13, the command control logic unit may include flip-flops 1310, 1320, 1330, and 1340, NAND gates 1360, OR gates 1370, and a read range control unit 1380. Each of the flip-flops 1310, 1320, 1330, and 1340 may generate a control signal of a corresponding write latency WL, in response to a clock CLK. The NAND gates 1360 may perform an AND operation on the masked write command MWR and the corresponding write latency WL. Output signals from the NAND gates 1360 which are generated according to the corresponding write latencies WL=0, 1, . . . , n may be provided to the OR gates 1370. For example, an output signal from the NAND gate 1360 which is generated according to the write latency WL=n may be input to the OR gate 1370, and then the OR gate 1370 may perform an OR operation on the output signal from the NAND gate 1360 and a control signal of the write latency WL=n−1. An output from the OR gate 1370 may be provided to the flip-flop 1310, and in response to the clock CLK, the flip-flop 1310 may generate a control signal of the write latency WL=n by performing a gating operation on the output from the OR gate 1370.

In the masked write operations described in relation to FIGS. 7, 10, 11, and 12, the write latency WL is set as 14. With respect to the write latency WL=14, the flip-flop 1330 may generate a control signal of the write latency WL=14, the flip-flop 1320 may generate a control signal of the write latency WL=(14-8), and the flip-flop 1340 may generate a control signal of the write latency WL=(14+8).

The control signal of the write latency WL=(14-8) is ahead of the control signal of the write latency WL=14 by 8 clock cycles, and is ahead of the write latency WL=14 by a tCCD timing. The control signal of the write latency WL=(14+8) is behind the control signal of the write latency WL=14 by 8 clock cycles, and is behind the write latency WL=14 by a tCCD timing.

The control signal of the write latency WL=(14-8) and the control signal of the write latency WL=14 output from the flip-flops 1320 and 1330 may be provided to the read range control unit 1380. The read range control unit 1380 may perform a logic operation on the control signals of the write latencies WL=(14-8) and WL=14 from the flip-flops 1320 and 1330 and a frequency information signal INFO_FREQ and therefore may generate the internal read command INT_RD. The frequency information signal INFO_FREQ may be provided based on a high frequency operation or a low frequency operation according to a data rate of the memory device 200.

The read range control unit 1380 may be controlled in response to a latency information signal INFO_WL, instead of the frequency information signal INFO_FREQ, and therefore may generate the internal read command INT_RD. The latency information signal INFO_WL may be provided based on a write latency, and the internal read command INT_RD may be generated in relation to the write latency.

The control signal of the write latency WL=(14+8) output from the flip-flop 1340 may be generated as the internal write command INT_WR.

Figure 14:
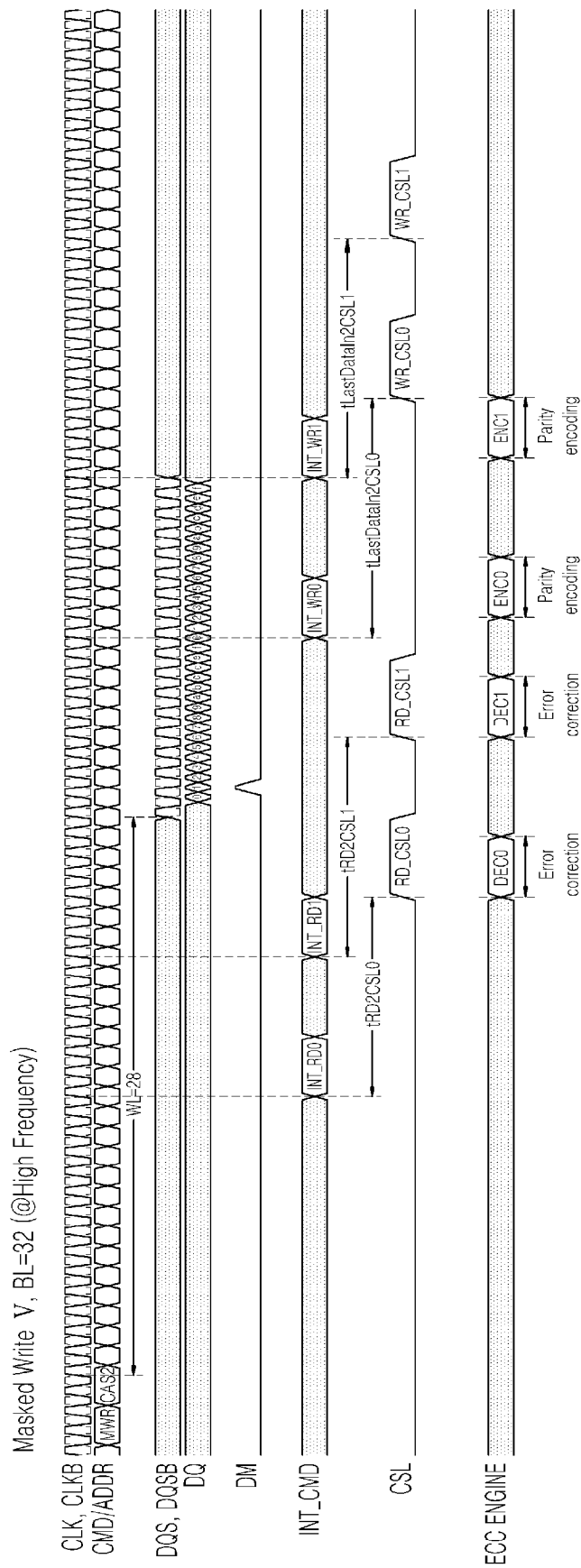
FIG. 14 is a timing diagram of a masked write operation performed by the memory device according to another example embodiment of inventive concepts.

FIG. 14 is a timing diagram of a masked write operation performed by the memory device 200 according to another example embodiment of inventive concepts.

Referring to FIG. 14, the masked write operation is performed on a burst length BL=32 with a high frequency by the memory device 200. The masked write operation may start by receiving a masked write command MWR that is issued by the memory controller 100.

The memory device 200 may receive the masked write command MWR and then an address signal CAS2, in synchronization with a rising or falling edge of a clock CLK.

After a write latency WL from a last rising edge of the clock CLK that is input with the address signal CAS2, a plurality of pieces of write data 0-1-2-3-4-5-6-7-8-9-a-b-c-d-e-f that correspond to the burst length BL=32 may be input via a DQ pad. For example, after the write latency WL=28, two groups of the plurality of pieces of write data 0-1-2-3-4-5-6-7-8-9-a-b-c-d-e-f that correspond to the burst length BL=32 may be input via the DQ pad in synchronization with rising and falling edges of a data strobe signal DQS. For convenience of description, the plurality of pieces of write data 0-1-2-3-4-5-6-7-8-9-a-b-c-d-e-f of the first group are referred as upper BL write data, and the plurality of pieces of write data 0-1-2-3-4-5-6-7-8-9-a-b-c-d-e-f of the second group are referred as lower BL write data.

A data mask signal DM having a logic high level (i.e., '1') may be input so as to mask data that corresponds to a second burst length BL=1 from among the upper BL write data 0-1-2-3-4-5-6-7-8-9-a-b-c-d-e-f. Accordingly, the upper BL write data in which the data corresponding to the second burst length BL=1 is masked may be input.

In response to the masked write command MWR, the memory device 200 may generate first and second internal read commands INT_RD0 and INT_RD1, and first and second internal write commands INT_WR0 and INT_WR1. The first internal read command INT_RD0 and the first internal write command INT_WR0 may be related to read and write operations with respect to the upper BL write data, and the second internal read command INT_RD1 and the second internal write command INT_WR1 may be related to read and write operations with respect to the lower BL write data.

The first and second internal read commands INT_RD0 and INT_RD1 may be generated before an elapse of a write latency WL=28, by a given (or alternatively desired or predetermined) rising or falling edge of the clock CLK. The second internal read command INT_RD1 may be generated after generation of the first internal read command INT_RD0. For example, the first internal read command INT_RD0 may be generated before the elapse of the write latency WL=28, by a 2*tCCD timing, and the second internal read command INT_RD1 may be generated before the elapse of the write latency WL=28, by a tCCD timing.

In response to the first internal read command INT_RD0, a first column selection signal RD_CSL0 that corresponds to the address signal CAS2 and that is connected to memory cells configured to store the masked upper BL write data may be activated and a first ECC decoding signal DEC0 may be generated. After an elapse of a time period tRD2CSL0 from the first internal read command INT_RD0 and until activation of the first column selection signal RD_CSL0, the first column selection signal RD_CSL0 may be activated. In response to the activation of the first column selection signal RD_CSL0, a plurality of pieces of data that are stored in BL0 through BL15 cell blocks and parity bits that are stored in an ECCP cell block may be read.

In response to the first ECC decoding signal DEC0, the ECC engine unit 260A may perform error bit detection and correction by using the plurality of pieces of read data output from the BL0 through BL15 cell blocks and the parity bits output from the ECCP cell block. Accordingly, the ECC engine unit 260A may have upper BL read data of the BL0 through BL15 cell blocks, wherein the upper BL read data has been error-corrected by using a latch.

In response to the second internal read command INT_RD1, a second column selection signal RD_CSL1 that corresponds to the address signal CAS2 and that is connected to memory cells configured to store the masked lower BL write data may be activated and a second ECC decoding signal DEC1 may be generated. After an elapse of a time period tRD2CSL1 from the second internal read command INT_RD1 and until activation of the second column selection signal RD_CSL1, the second column selection signal RD_CSL1 may be activated. In response to the activation of the second column selection signal RD_CSL1, a plurality of pieces of data that are stored in the BL0 through BL15 cell blocks and parity bits that are stored in the ECCP cell block may be read.

In response to the second ECC decoding signal DEC1, the ECC engine unit 260A may perform error bit detection and correction by using the plurality of pieces of read data output from the BL0 through BL15 cell blocks and the parity bits output from the ECCP cell block. Accordingly, the ECC engine unit 260A may have lower BL read data of the BL0 through BL15 cell blocks, wherein the lower BL read data has been error-corrected by using the latch.

The first internal write command INT_WR0 may be generated in synchronization with a rising edge of the clock CLK, after last data of the upper BL write data is input via the DQ pad, and the second internal write command INT_WR1 may be generated in synchronization with a rising edge of the clock CLK, after last data of the lower BL write data is input via the DQ pad.

In response to the first internal write command INT_WR0, a first ECC encoding signal ENC0 may be generated. Also, in response to the first internal write command INT_WR0, the first column selection signal WR_CSL0 that corresponds to the address signal CAS2 and that is connected to the memory cells configured to store the masked upper BL write data may be activated.

In response to the first ECC encoding signal ENC0, the ECC engine unit 260A may generate parity bits with respect to the upper BL write data in which the data corresponding to the second burst length BL=1 is masked, and read data of the BL1 cell block from among the upper BL read data of the BL0 through BL15 cell blocks which are error-corrected in response to the first ECC decoding signal DEC0.

In response to the second internal write command INT_WR1, a second ECC encoding signal ENC1 may be generated. Also, in response to the second internal write command INT_WR1, the second column selection signal WR_CSL1 that corresponds to the address signal CAS2 and that is connected to the memory cells configured to store the lower BL write data may be activated.

In response to the second ECC encoding signal ENC1, the ECC engine unit 260A may generate parity bits with respect to the lower BL write data.

After an elapse of a time period tLastDataIn2CSL0 from the rising edge of the clock CLK after the input of the last write data of the upper BL write data and until activation of the first column selection signal WR_CSL0, the first column selection signal WR_CSL0 may be activated.

In response to the first column selection signal WR_CSL0, the upper BL write data in which the data corresponding to the second burst length BL=1 is masked, and the parity bits may be stored in the BL0 cell block, the BL2 through BL15 cell blocks, and the ECCP cell block which are selected in response to the first column selection signal WR_CSL0.

After an elapse of a time period tLastDataIn2CSL1 from the rising edge of the clock CLK after the input of the last write data of the lower BL write data and until activation of the second column selection signal WR_CSL1, the second column selection signal WR_CSL1 may be activated.

In response to the second column selection signal WR_CSL1, the lower BL write data and the parity bits may be stored in the BL0 through BL15 cell blocks and the ECCP cell block which are selected in response to the second column selection signal WR_CSL1.

Figure 15:
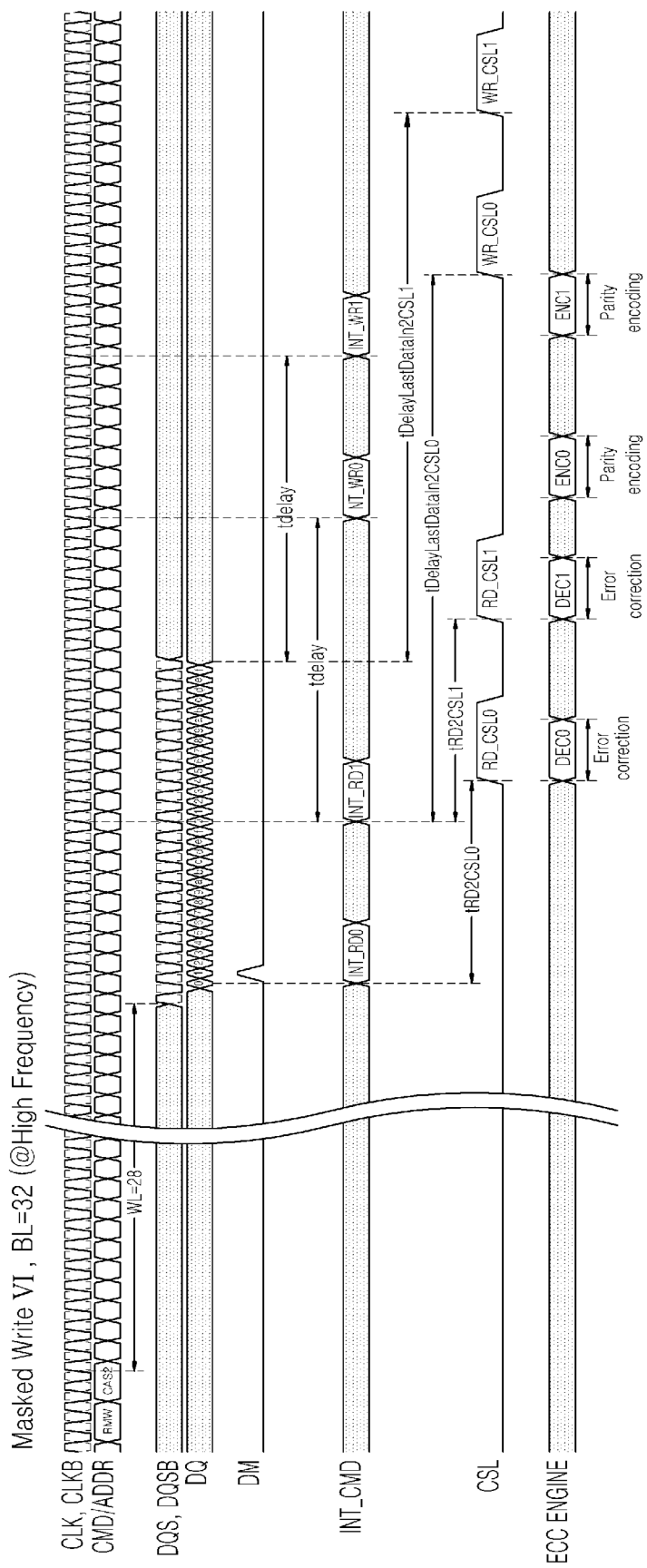
FIG. 15 is a timing diagram of a masked write operation performed by the memory device according to another example embodiment of inventive concept.

FIG. 15 is a timing diagram of a masked write operation performed by the memory device 200 according to another example embodiment of inventive concepts.

Referring to FIG. 15, the masked write operation is performed on a burst length BL=32 with a high frequency by the memory device 200. The masked write operation may start by receiving a masked write command MWR that is issued by the memory controller 100.

The memory device 200 may receive the masked write command MWR and then an address signal CAS2, in synchronization with a rising or falling edge of a clock CLK.

After a write latency WL from a last rising edge of the clock CLK that is input with the address signal CAS2, a plurality of pieces of write data 0-1-2-3-4-5-6-7-8-9-a-b-c-d-e-f that correspond to the burst length BL=32 may be input via a DQ pad. For example, after the write latency WL=28, upper BL write data 0-1-2-3-4-5-6-7-8-9-a-b-c-d-e-f that correspond to the burst length BL=32 and lower BL write data 0-1-2-3-4-5-6-7-8-9-a-b-c-d-e-f that correspond to the burst length BL=32 may be input via the DQ pad in synchronization with rising and falling edges of a data strobe signal DQS.

A data mask signal DM having a logic high level (i.e., '1') may be input so as to mask data that corresponds to a second burst length BL=1 from among the upper BL write data 0-1-2-3-4-5-6-7-8-9-a-b-c-d-e-f. Accordingly, the upper BL write data in which the data corresponding to the second burst length BL=1 is masked may be input.

In response to the masked write command MWR, the memory device 200 may generate first and second internal read commands INT_RD0 and INT_RD1, and first and second internal write commands INT_WR0 and INT_WR1.

The first internal read command INT_RD0 may be generated in synchronization with the rising edge of the clock CLK, after first data of the upper BL write data is input via the DQ pad. The second internal read command INT_RD1 may be generated in synchronization with the rising edge of the clock CLK, after first data of the lower BL write data is input via the DQ pad.

In response to the first internal read command INT_RD0, a first column selection signal RD_CSL0 that corresponds to the address signal CAS2 and that is connected to memory cells configured to store the masked upper BL write data may be activated and a first ECC decoding signal DEC0 may be generated. After an elapse of a time period tRD2CSL0 from the first internal read command INT_RD0 and until activation of the first column selection signal RD_CSL0, the first column selection signal RD_CSL0 may be activated. In response to the activation of the first column selection signal RD_CSL0, a plurality of pieces of data that are stored in BL0 through BL15 cell blocks and parity bits that are stored in an ECCP cell block may be read.

In response to the first ECC decoding signal DEC0, the ECC engine unit 260A may perform error bit detection and correction by using the plurality of pieces of read data output from the BL0 through BL15 cell blocks and the parity bits output from the ECCP cell block. Accordingly, the ECC engine unit 260A may have upper BL read data of the BL0 through BL15 cell blocks, wherein the upper BL read data has been error-corrected by using a latch.

In response to the second internal read command INT_RD1, a second column selection signal RD_CSL1 that corresponds to the address signal CAS2 and that is connected to memory cells configured to store the masked lower BL write data may be activated and a second ECC decoding signal DEC1 may be generated. After an elapse of a time period tRD2CSL1 from the second internal read command INT_RD1 and until activation of the second column selection signal RD_CSL1, the second column selection signal RD_CSL1 may be activated. In response to the activation of the second column selection signal RD_CSL1, a plurality of pieces of data that are stored in the BL0 through BL15 cell blocks and parity bits that are stored in the ECCP cell block may be read.

In response to the second ECC decoding signal DEC1, the ECC engine unit 260A may perform error bit detection and correction by using the plurality of pieces of read data output from the BL0 through BL15 cell blocks and the parity bits output from the ECCP cell block. Accordingly, the ECC engine unit 260A may have lower BL read data of the BL0 through BL15 cell blocks, wherein the lower BL read data has been error-corrected by using the latch.

The first internal write command INT_WR0 may be generated in synchronization with a rising edge of the clock CLK, after last data of the upper BL write data is input via the DQ pad and then a given (or alternatively desired or predetermined) time tdelay elapses, and the second internal write command INT_WR1 may be generated in synchronization with a rising edge of the clock CLK, after last data of the lower BL write data is input via the DQ pad and then a given (or alternatively desired or predetermined) time tdelay elapses.

In response to the first internal write command INT_WR0, a first ECC encoding signal ENC0 may be generated. Also, in response to the first internal write command INT_WR0, the first column selection signal WR_CSL0 that corresponds to the address signal CAS2 and that is connected to the memory cells configured to store the masked upper BL write data may be activated.

In response to the first ECC encoding signal ENC0, the ECC engine unit 260A may generate parity bits with respect to the upper BL write data in which the data corresponding to the second burst length BL=1 is masked, and read data of the BL1 cell block from among the upper BL read data of the BL0 through BL15 cell blocks which are error-corrected in response to the first ECC decoding signal DEC0.

In response to the second internal write command INT_WR1, a second ECC encoding signal ENC1 may be generated. Also, in response to the second internal write command INT_WR1, the second column selection signal WR_CSL1 that corresponds to the address signal CAS2 and that is connected to the memory cells configured to store the lower BL write data may be activated.

In response to the second ECC encoding signal ENC1, the ECC engine unit 260A may generate parity bits with respect to the lower BL write data.

After an elapse of a time period tDelayLastDataIn2CSL0 from the rising edge of the clock CLK after the input of the last write data of the upper BL write data and until activation of the first column selection signal WR_CSL0, the first column selection signal WR_CSL0 may be activated.

In response to the first column selection signal WR_CSL0, the upper BL write data in which the data corresponding to the second burst length BL=1 is masked, and the parity bits may be stored in the BL0 cell block, the BL2 through BL15 cell blocks, and the ECCP cell block which are selected in response to the first column selection signal WR_CSL0.

After an elapse of a time period tDelayLastDataIn2CSL1 from the rising edge of the clock CLK after the input of the last write data of the lower BL write data and until activation of the second column selection signal WR_CSL1, the second column selection signal WR_CSL1 may be activated.

In response to the second column selection signal WR_CSL1, the lower BL write data and the parity bits may be stored in the BL0 through BL15 cell blocks and the ECCP cell block which are selected in response to the second column selection signal WR_CSL1.

Figure 16:
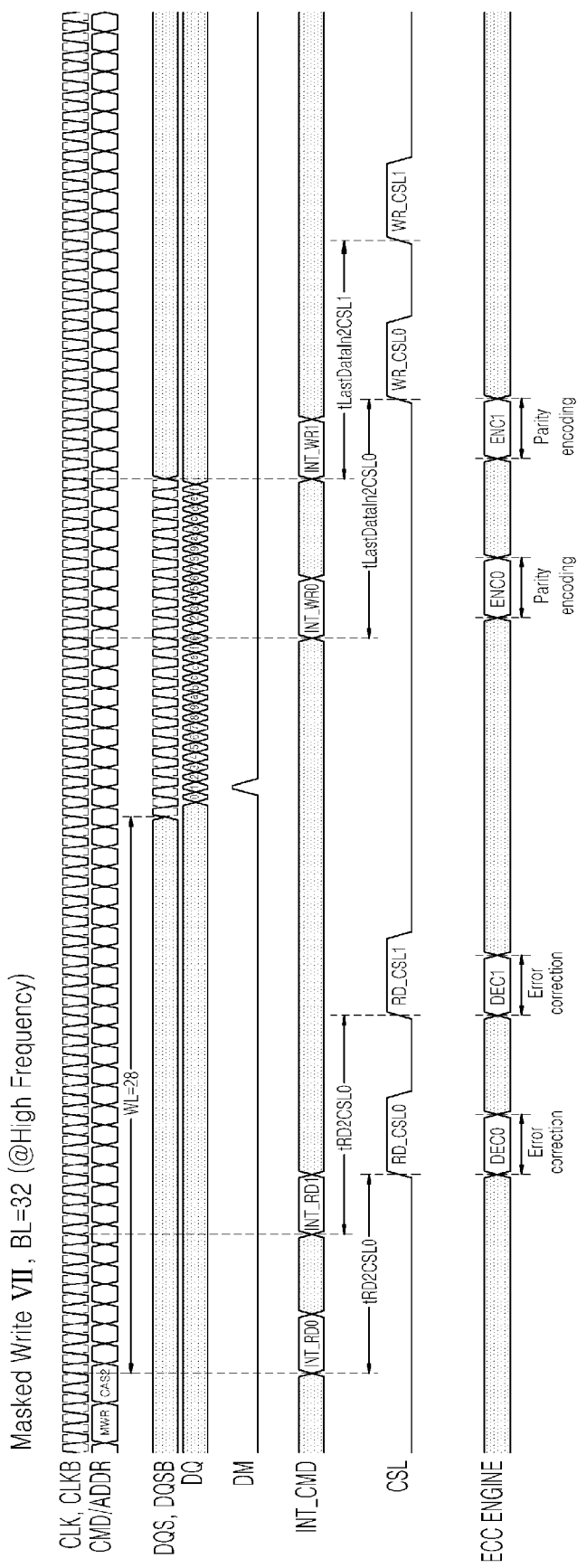
FIG. 16 is a timing diagram of a masked write operation performed by the memory device according to another example embodiment of inventive concepts.

FIG. 16 is a timing diagram of a masked write operation performed by the memory device 200 according to another example embodiment of inventive concepts.

Referring to FIG. 16, the masked write operation is performed on a burst length BL=32 with a high frequency by the memory device 200. The masked write operation may start by receiving a masked write command MWR that is issued by the memory controller 100.

The memory device 200 may receive the masked write command MWR and then an address signal CAS2, in synchronization with a rising or falling edge of a clock CLK.

After a write latency WL from a last rising edge of the clock CLK that is input with the address signal CAS2, a plurality of pieces of write data 0-1-2-3-4-5-6-7-8-9-a-b-c-d-e-f that correspond to the burst length BL=32 may be input via a DQ pad. For example, after the write latency WL=28, upper BL write data 0-1-2-3-4-5-6-7-8-9-a-b-c-d-e-f that correspond to the burst length BL=32 and lower BL write data 0-1-2-3-4-5-6-7-8-9-a-b-c-d-e-f that correspond to the burst length BL=32 may be input via the DQ pad in synchronization with rising and falling edges of a data strobe signal DQS.

A data mask signal DM having a logic high level (i.e., '1') may be input so as to mask data that corresponds to a second burst length BL=1 from among the upper BL write data 0-1-2-3-4-5-6-7-8-9-a-b-c-d-e-f. Accordingly, the upper BL write data in which the data corresponding to the second burst length BL=1 is masked may be input.

In response to the masked write command MWR, the memory device 200 may generate first and second internal read commands INT_RD0 and INT_RD1, and first and second internal write commands INT_WR0 and INT_WR1.

The first internal read command INT_RD0 may be generated in synchronization with the last rising edge of the clock CLK that is input with the address signal CAS2. The second internal read command INT_RD1 may be generated in synchronization with the rising edge of the clock CLK after the first internal read command INT_RD0 is generated and then a given (or alternatively desired or predetermined) delay time elapses. For example, after the first internal read command INT_RD0 is generated and after an elapse of a tCCD timing, the second internal read command INT_RD1 may be generated in synchronization with the rising edge of the clock CLK.

In response to the first internal read command INT_RD0, a first column selection signal RD_CSL0 that corresponds to the address signal CAS2 and that is connected to memory cells configured to store the masked upper BL write data may be activated and a first ECC decoding signal DEC0 may be generated. After an elapse of a time period tRD2CSL0 from the first internal read command INT_RD0 and until activation of the first column selection signal RD_CSL0, the first column selection signal RD_CSL0 may be activated. In response to the activation of the first column selection signal RD_CSL0, a plurality of pieces of data that are stored in BL0 through BL15 cell blocks and parity bits that are stored in an ECCP cell block may be read.

In response to the first ECC decoding signal DEC0, the ECC engine unit 260A may perform error bit detection and correction by using the plurality of pieces of read data output from the BL0 through BL15 cell blocks and the parity bits output from the ECCP cell block. Accordingly, the ECC engine unit 260A may have upper BL read data of the BL0 through BL15 cell blocks, wherein the upper BL read data has been error-corrected by using a latch.

In response to the second internal read command INT_RD1, a second column selection signal RD_CSL1 that corresponds to the address signal CAS2 and that is connected to memory cells configured to store the masked lower BL write data may be activated and a second ECC decoding signal DEC1 may be generated. After an elapse of a time period tRD2CSL1 from the second internal read command INT_RD1 and until activation of the second column selection signal RD_CSL1, the second column selection signal RD_CSL1 may be activated. In response to the activation of the second column selection signal RD_CSL1, a plurality of pieces of data that are stored in the BL0 through BL15 cell blocks and parity bits that are stored in the ECCP cell block may be read.

In response to the second ECC decoding signal DEC1, the ECC engine unit 260A may perform error bit detection and correction by using the plurality of pieces of read data output from the BL0 through BL15 cell blocks and the parity bits output from the ECCP cell block. Accordingly, the ECC engine unit 260A may have lower BL read data of the BL0 through BL15 cell blocks, wherein the lower BL read data has been error-corrected by using the latch.

The first internal write command INT_WR0 may be generated in synchronization with a rising edge of the clock CLK, after last data of the upper BL write data is input via the DQ pad, and the second internal write command INT_WR1 may be generated in synchronization with a rising edge of the clock CLK, after last data of the lower BL write data is input via the DQ pad.

In response to the first internal write command INT_WR0, a first ECC encoding signal ENC0 may be generated. Also, in response to the first internal write command INT_WR0, the first column selection signal WR_CSL0 that corresponds to the address signal CAS2 and that is connected to the memory cells configured to store the masked upper BL write data may be activated.

In response to the first ECC encoding signal ENC0, the ECC engine unit 260A may generate parity bits with respect to the upper BL write data in which the data corresponding to the second burst length BL=1 is masked, and read data of the BL1 cell block from among the upper BL read data of the BL0 through BL15 cell blocks which are error-corrected in response to the first ECC decoding signal DEC0.

In response to the second internal write command INT_WR1, a second ECC encoding signal ENC1 may be generated. Also, in response to the second internal write command INT_WR1, the second column selection signal WR_CSL1 that corresponds to the address signal CAS2 and that is connected to the memory cells configured to store the lower BL write data may be activated.

In response to the second ECC encoding signal ENC1, the ECC engine unit 260A may generate parity bits with respect to the lower BL write data.

After an elapse of a time period tLastDataIn2CSL0 from the rising edge of the clock CLK after the input of the last write data of the upper BL write data and until activation of the first column selection signal WR_CSL0, the first column selection signal WR_CSL0 may be activated.

In response to the first column selection signal WR_CSL0, the upper BL write data in which the data corresponding to the second burst length BL=1 is masked, and the parity bits may be stored in the BL0 cell block, the BL2 through BL15 cell blocks, and the ECCP cell block which are selected in response to the first column selection signal WR_CSL0.

After an elapse of a time period tLastDataIn2CSL1 from the rising edge of the clock CLK after the input of the last write data of the lower BL write data and until activation of the second column selection signal WR_CSL1, the second column selection signal WR_CSL1 may be activated.

In response to the second column selection signal WR_CSL1, the lower BL write data and the parity bits may be stored in the BL0 through BL15 cell blocks and the ECCP cell block which are selected in response to the second column selection signal WR_CSL1.

Figure 17:
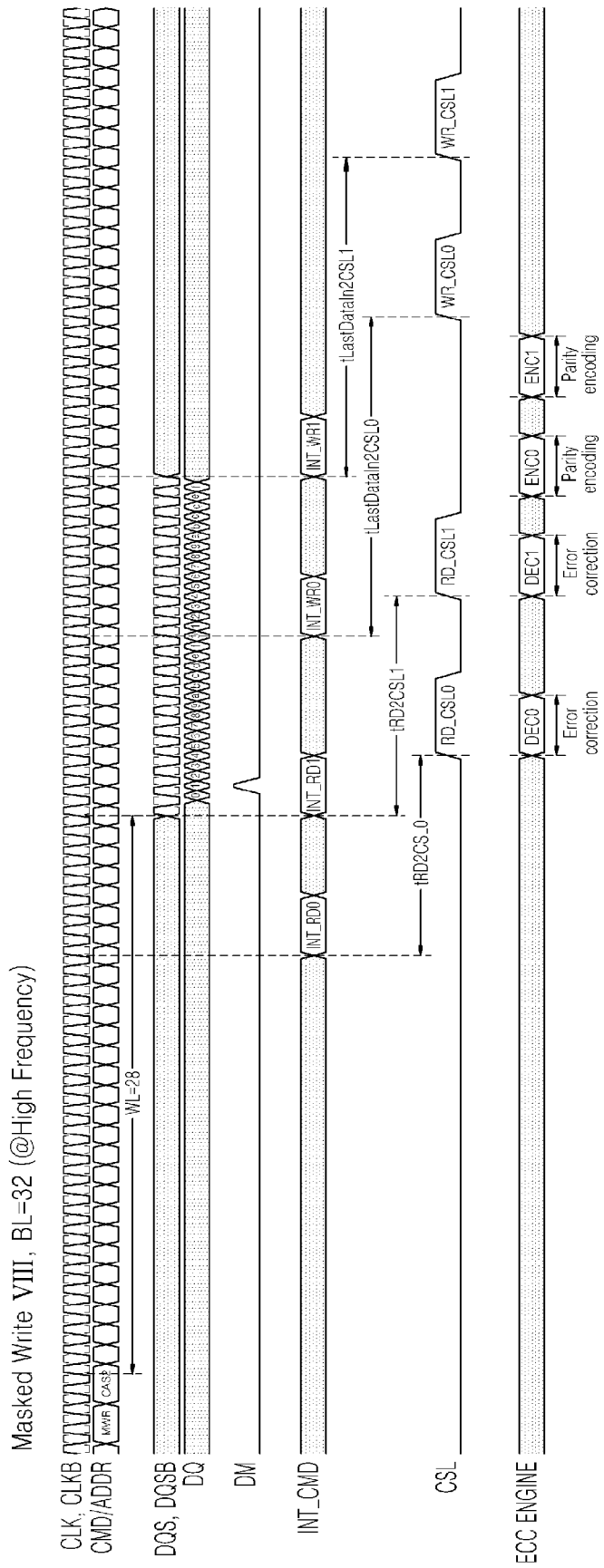
FIG. 17 is a timing diagram of a masked write operation performed by the memory device according to another example embodiment of inventive concepts.

FIG. 17 is a timing diagram of a masked write operation performed by the memory device 200 according to another example embodiment of inventive concepts.

Referring to FIG. 17, the masked write operation is performed on a burst length BL=32 with a high frequency by the memory device 200. The masked write operation may start by receiving a masked write command MWR that is issued by the memory controller 100.

The memory device 200 may receive the masked write command MWR and then an address signal CAS2, in synchronization with a rising or falling edge of a clock CLK.

After a write latency WL from a last rising edge of the clock CLK that is input with the address signal CAS2, a plurality of pieces of write data 0-1-2-3-4-5-6-7-8-9-a-b-c-d-e-f that correspond to the burst length BL=32 may be input via a DQ pad. For example, after the write latency WL=28, upper BL write data 0-1-2-3-4-5-6-7-8-9-a-b-c-d-e-f that correspond to the burst length BL=32 and lower BL write data 0-1-2-3-4-5-6-7-8-9-a-b-c-d-e-f that correspond to the burst length BL=32 may be input via the DQ pad in synchronization with rising and falling edges of a data strobe signal DQS.

A data mask signal DM a logic high level (i.e., '1') may be input so as to mask data that corresponds to a second burst length BL=1 from among the upper BL write data 0-1-2-3-4-5-6-7-8-9-a-b-c-d-e-f. Accordingly, the upper BL write data in which the data corresponding to the second burst length BL=1 is masked may be input.

In response to the masked write command MWR, the memory device 200 may generate first and second internal read commands INT_RD0 and INT_RD1, and first and second internal write commands INT_WR0 and INT_WR1.

The first internal read command INT_RD0 may be generated before an elapse of a write latency WL=28, by a given (or alternatively desired or predetermined) rising or falling edge of the clock CLK. The second internal read command INT_RD1 may be generated after the first internal read command INT_RD0 is generated. For example, the first internal read command INT_RD0 may be generated before the elapse of the write latency WL=28, by a tCCD timing, and in synchronization with the last rising edge of the clock CLK that is input with the address signal CAS2. The second internal read command INT_RD1 may be generated in synchronization with the last rising edge of the clock CLK, after the first internal read command INT_RD0 is generated and then the tCCD timing elapses.

In response to the first internal read command INT_RD0, a first column selection signal RD_CSL0 that corresponds to the address signal CAS2 and that is connected to memory cells configured to store the masked upper BL write data may be activated and a first ECC decoding signal DEC0 may be generated. After an elapse of a time period tRD2CSL0 from the first internal read command INT_RD0 and until activation of the first column selection signal RD_CSL0, the first column selection signal RD_CSL0 may be activated. In response to the activation of the first column selection signal RD_CSL0, a plurality of pieces of data that are stored in BL0 through BL15 cell blocks and parity bits that are stored in an ECCP cell block may be read.

In response to the first ECC decoding signal DEC0, the ECC engine unit 260A may perform error bit detection and correction by using the plurality of pieces of read data output from the BL0 through BL15 cell blocks and the parity bits output from the ECCP cell block. The ECC engine unit 260A may have upper BL read data of the BL0 through BL15 cell blocks, wherein the upper BL read data has been error-corrected by using a latch.

In response to the second internal read command INT_RD1, a second column selection signal RD_CSL1 that corresponds to the address signal CAS2 and that is connected to memory cells configured to store the masked lower BL write data may be activated and a second ECC decoding signal DEC1 may be generated. After an elapse of a time period tRD2CSL1 from the second internal read command INT_RD1 and until activation of the second column selection signal RD_CSL1, the second column selection signal RD_CSL1 may be activated. In response to the activation of the second column selection signal RD_CSL1, a plurality of pieces of data that are stored in the BL0 through BL15 cell blocks and parity bits that are stored in the ECCP cell block may be read.

In response to the second ECC decoding signal DEC1, the ECC engine unit 260A may perform error bit detection and correction by using the plurality of pieces of read data output from the BL0 through BL15 cell blocks and the parity bits output from the ECCP cell block. The ECC engine unit 260A may have lower BL read data of the BL0 through BL15 cell blocks, wherein the lower BL read data has been error-corrected by using the latch.

The first internal write command INT_WR0 may be generated in synchronization with a rising edge of the clock CLK, after last data of the upper BL write data is input via the DQ pad, and the second internal write command INT_WR1 may be generated in synchronization with a rising edge of the clock CLK, after last data of the lower BL write data is input via the DQ pad.

In response to the first internal write command INT_WR0, a first ECC encoding signal ENC0 may be generated. Also, in response to the first internal write command INT_WR0, the first column selection signal WR_CSL0 that corresponds to the address signal CAS2 and that is connected to the memory cells configured to store the masked upper BL write data may be activated.

In response to the first ECC encoding signal ENC0, the ECC engine unit 260A may generate parity bits with respect to the upper BL write data in which the data corresponding to the second burst length BL=1 is masked, and read data of the BL1 cell block from among the upper BL read data of the BL0 through BL15 cell blocks which are error-corrected in response to the first ECC decoding signal DEC0.

In response to the second internal write command INT_WR1, a second ECC encoding signal ENC1 may be generated. Also, in response to the second internal write command INT_WR1, the second column selection signal WR_CSL1 that corresponds to the address signal CAS2 and that is connected to the memory cells configured to store the lower BL write data may be activated.

In response to the second ECC encoding signal ENC1, the ECC engine unit 260A may generate parity bits with respect to the lower BL write data.

After an elapse of a time period tLastDataIn2CSL0 from the rising edge of the clock CLK after the input of the last write data of the upper BL write data and until activation of the first column selection signal WR_CSL0, the first column selection signal WR_CSL0 may be activated.

In response to the first column selection signal WR_CSL0, the upper BL write data in which the data corresponding to the second burst length BL=1 is masked, and the parity bits may be stored in the BL0 cell block, the BL2 through BL15 cell blocks, and the ECCP cell block which are selected in response to the first column selection signal WR_CSL0.

After an elapse of a time period tLastDataIn2CSL1 from the rising edge of the clock CLK after the input of the last write data of the lower BL write data and until activation of the second column selection signal WR_CSL1, the second column selection signal WR_CSL1 may be activated.

In response to the second column selection signal WR_CSL1, the lower BL write data and the parity bits may be stored in the BL0 through BL15 cell blocks and the ECCP cell block which are selected in response to the second column selection signal WR_CSL1.

Figure 18:
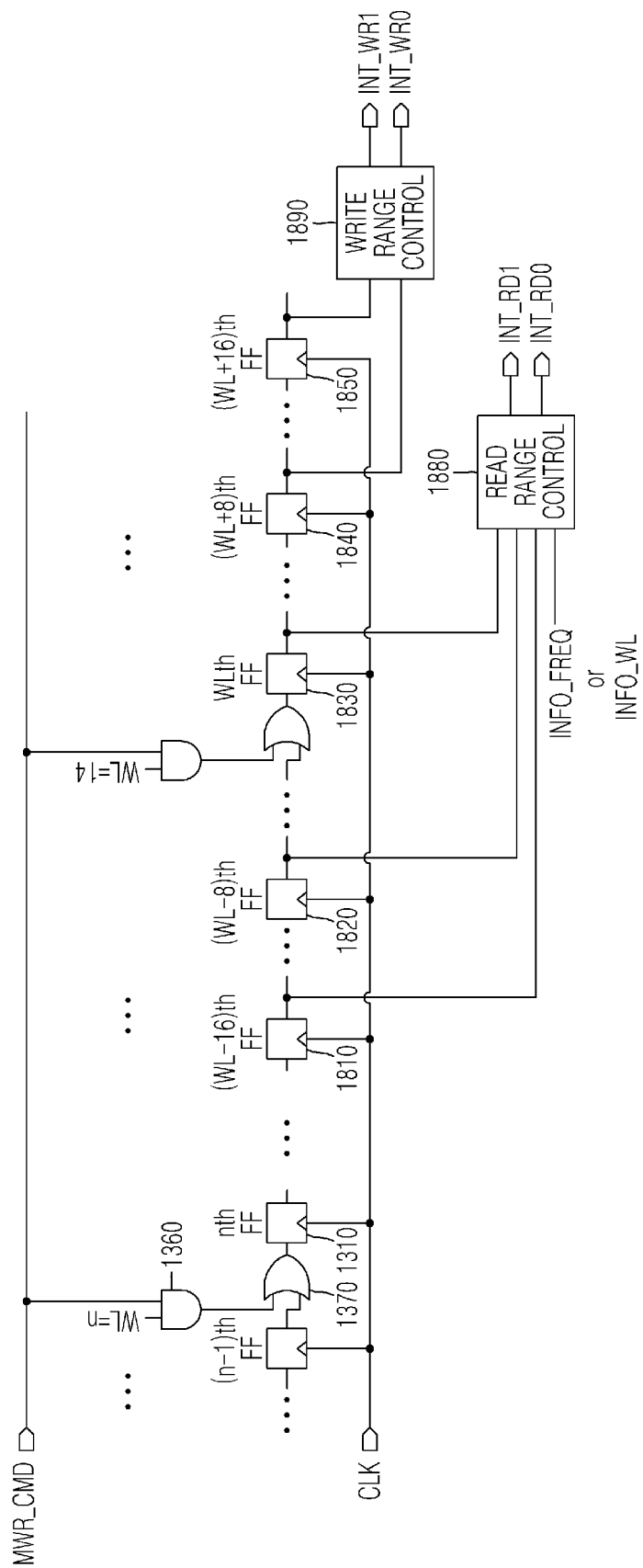
FIG. 18 illustrates a command control logic unit according to another example embodiment of inventive concepts.

FIG. 18 illustrates a command control logic unit according to another embodiment of the inventive concept.

Referring to FIG. 18, the command control logic unit (refer to the command control logic unit 220 of FIG. 1) may include flip-flops 1310, 1810 1820, 1830, 1840, and 1850, NAND gates 1360, OR gates 1370, a read range control unit 1880, and a write range control unit 1890. The flip-flop 1310, the NAND gates 1360, and the OR gates 1370 are the same as those described with reference to FIG. 13. That is, an output signal from the flip-flop 1310 which is generated according to a write latency WL=n may be input to the OR gate 1370, and then the OR gate 1370 may perform an OR operation on the output signal from the NAND gate 1360 and a control signal of the write latency WL=n−1. Then, in response to a clock CLK, the flip-flop 1310 may generate a control signal of the write latency WL=n by performing a gating operation on the output from the OR gate 1370.

In the masked write operations described in relation to FIGS. 14, 15, 16, and 17, the write latency WL is set as 28. With respect to the write latency WL=28, the flip-flop 1830 may generate a control signal of the write latency WL=28, the flip-flop 1810 may generate a control signal of the write latency WL=(28−16), the flip-flop 1820 may generate a control signal of the write latency WL=(28−8), the flip-flop 1840 may generate a control signal of the write latency WL=(28+8), and the flip-flop 1850 may generate a control signal of the write latency WL=(28+16).

The control signal of the write latency WL=(28−16) is ahead of the control signal of the write latency WL=28 by 16 clock cycles, and is ahead of the write latency WL=28 by a 2*tCCD timing. The control signal of the write latency WL=(28-8) is ahead of the control signal of the write latency WL=28 by 8 clock cycles, and is ahead of the write latency WL=28 by a tCCD timing. The control signal of the write latency WL=(28+8) is behind the control signal of the write latency WL=28 by 8 clock cycles, and is behind the write latency WL=28 by a tCCD timing. The control signal of the write latency WL=(28+16) is behind the control signal of the write latency WL=28 by 16 clock cycles, and is behind the write latency WL=28 by a 2*tCCD timing.

The control signals of the write latencies WL=(28−16), WL=(28-8), and WL=28 output from the flip-flops 1810, 1820, and 1830 may be provided to the read range control unit 1880. The read range control unit 1880 may perform a logic operation on the control signals of the write latencies WL=(28−16), WL=(28-8), and WL=28 output from the flip-flops 1810, 1820, and 1830 and a frequency information signal INFO_FREQ and therefore may generate the first and second internal read commands INT_RD0 and INT_RD1. The frequency information signal INFO_FREQ may be provided based on a high frequency operation or a low frequency operation according to a data rate of the memory device 200.

The read range control unit 1880 may be controlled in response to a latency information signal INFO_WL, instead of the frequency information signal INFO_FREQ, and therefore may generate the first and second internal read commands INT_RD0 and INT_RD1. The latency information signal INFO_WL may be provided based on a write latency, and the first and second internal read commands INT_RD0 and INT_RD1 may be generated in relation to the write latency.

The control signals of the write latencies WL=(28+8) and WL=(28+16) output from the flip-flops 1840 and 1850 may be provided to the write range control unit 1890. The write range control unit 1890 may generate the control signals of the write latencies WL=(28+8) and WL=(28+16) as the first and second internal write commands INT_WR0 and INT_WR1.

Figure 19:
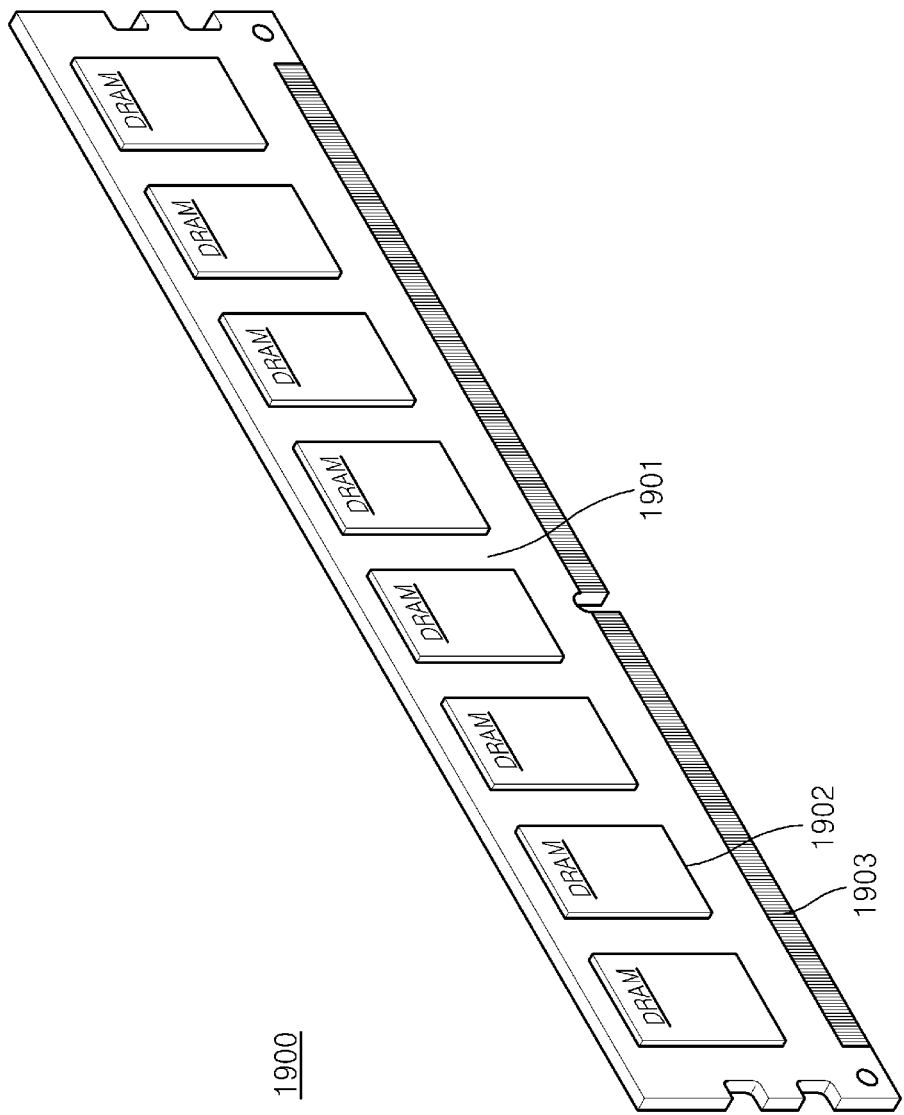
FIGS. 19 through 21 illustrate memory modules, each including dynamic random access memories (DRAMS) that perform a masked write operation according to example embodiments of inventive concepts.
Figure 20:
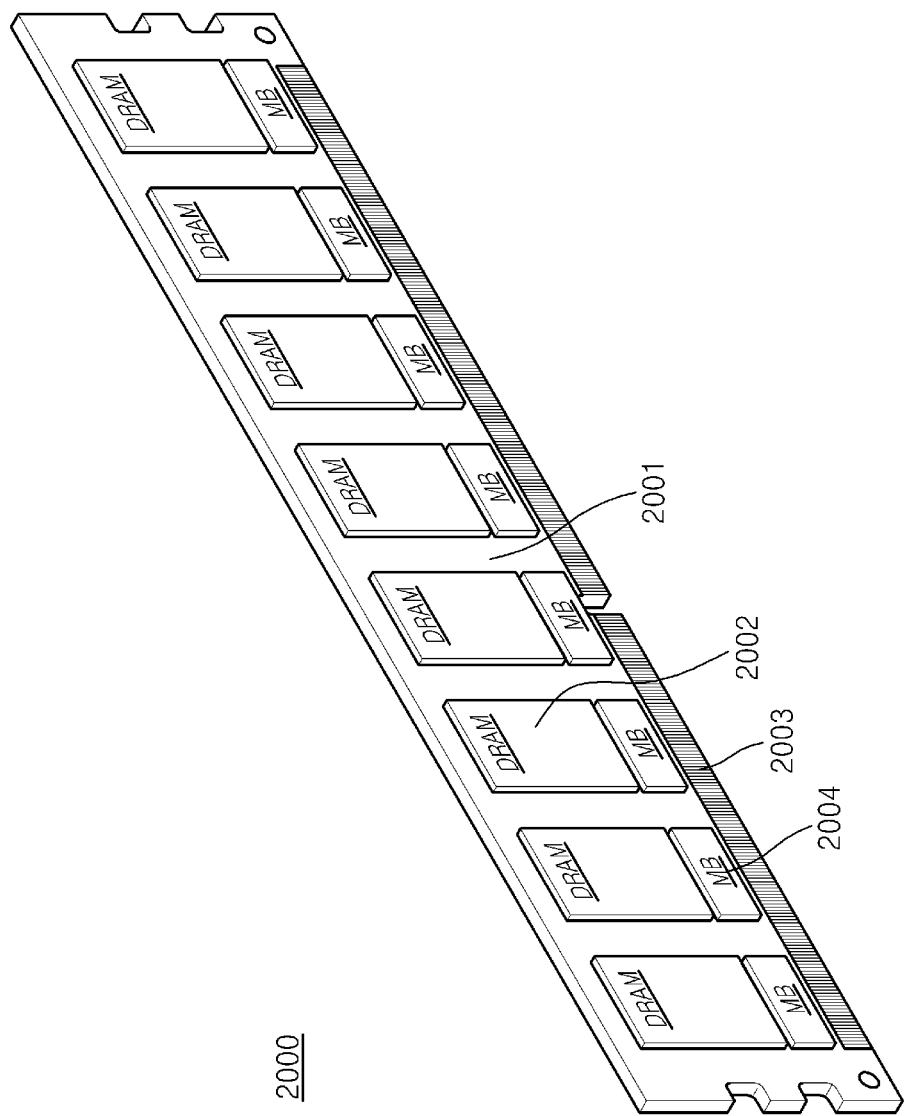
Figure 21:
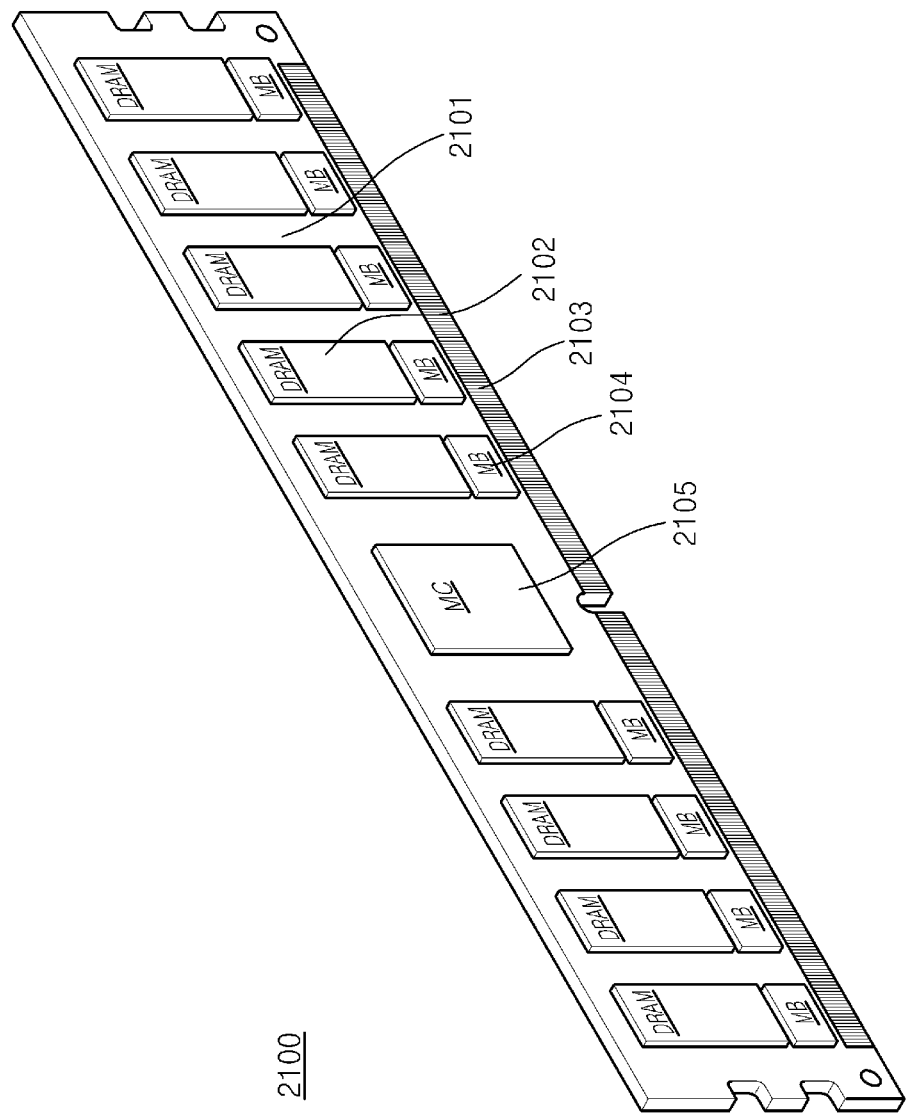

FIGS. 19 through 21 illustrate memory modules 1900, 2000, and 2100, each including DRAMS that perform a masked write operation according to example embodiments of inventive concepts.

Referring to FIG. 19, the memory module 1900 includes a printed circuit board (PCB) 1901, a plurality of DRAM chips 1902, and a connector 1903. The DRAM chips 1902 may be arranged on a top surface or a bottom surface of the PCB 1901. The connector 1903 is electrically connected to the DRAM chips 1902 via conductive lines (not shown). Also, the connector 1903 may be connected to a slot of an external host.

The masked write operation performed by each of the DRAM chips 1902 includes operations of receiving a masked write command and an address signal from a memory controller; after receiving the masked write command, receiving a plurality of pieces of masked write data after an elapse of a write latency; in response to the masked write command, generating an internal read command according to the elapse of the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by each of the DRAM chips 1902 includes operations of receiving a masked write command and an address signal; receiving a plurality of pieces of masked write data corresponding to a burst length after the masked write command is received and then a write latency elapses; in response to the masked write command, generating first and second internal read commands according to the elapse of the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before the elapse of the write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

Referring to FIG. 20, the memory module 2000 includes a PCB 2001, a plurality of DRAM chips 2002, a connector 2003, and a plurality of buffer chips 2004. Each of the buffer chips 2004 may be disposed between the connector 2003 and each of the DRAM chips 2002. The DRAM chips 2002 and the buffer chips 2004 that are formed on upper and lower portions of the PCB 2001 may be connected via a plurality of via holes.

The masked write operation performed by each of the DRAM chips 2002 includes operations of receiving a masked write command and an address signal from a memory controller; after receiving the masked write command, receiving a plurality of pieces of masked write data after an elapse of a write latency; in response to the masked write command, generating an internal read command according to the elapse of the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by each of the DRAM chips 2002 includes operations of receiving a masked write command and an address signal; receiving a plurality of pieces of masked write data corresponding to a burst length after the masked write command is received and then a write latency elapses; in response to the masked write command, generating first and second internal read commands according to the elapse of the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before the elapse of the write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

Referring to FIG. 21, the memory module 2100 includes a PCB 2101, a plurality of DRAM chips 2102, a connector 2103, a plurality of buffer chips 2104, and a controller 2105. The controller 2105 communicates with the DRAM chips 2102 and the buffer chips 2104, and controls operation modes of the DRAM chips 2102. The controller 2105 may control functions, characteristics, and modes of each of the DRAM chips 2102 by using a mode register of each of the DRAM chips 2102.

The masked write operation performed by each of the DRAM chips 2102 includes operations of receiving a masked write command and an address signal from a memory controller; after receiving the masked write command, receiving a plurality of pieces of masked write data after an elapse of a write latency; in response to the masked write command, generating an internal read command according to the elapse of the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by each of the DRAM chips 2102 includes operations of receiving a masked write command and an address signal; receiving a plurality of pieces of masked write data corresponding to a burst length after the masked write command is received and then a write latency elapses; in response to the masked write command, generating first and second internal read commands according to the elapse of the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before the elapse of the write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

Each of the memory modules 1900, 2000, and 2100 (i.e., the DRAM modules) may be applied to a single in-line memory module (SIMM), a dual in-line memory module (DIMM), a small-outline DIMM (SO-DIMM), an unbuffered DIMM (UDIMM), a fully-buffered DIMM (FB-DIMM), a rank-buffered DIMM (RBDIMM), a load-reduced DIMM (LRDIMM), a mini-DIMM, a micro-DIMM, or the like.

Figure 22:
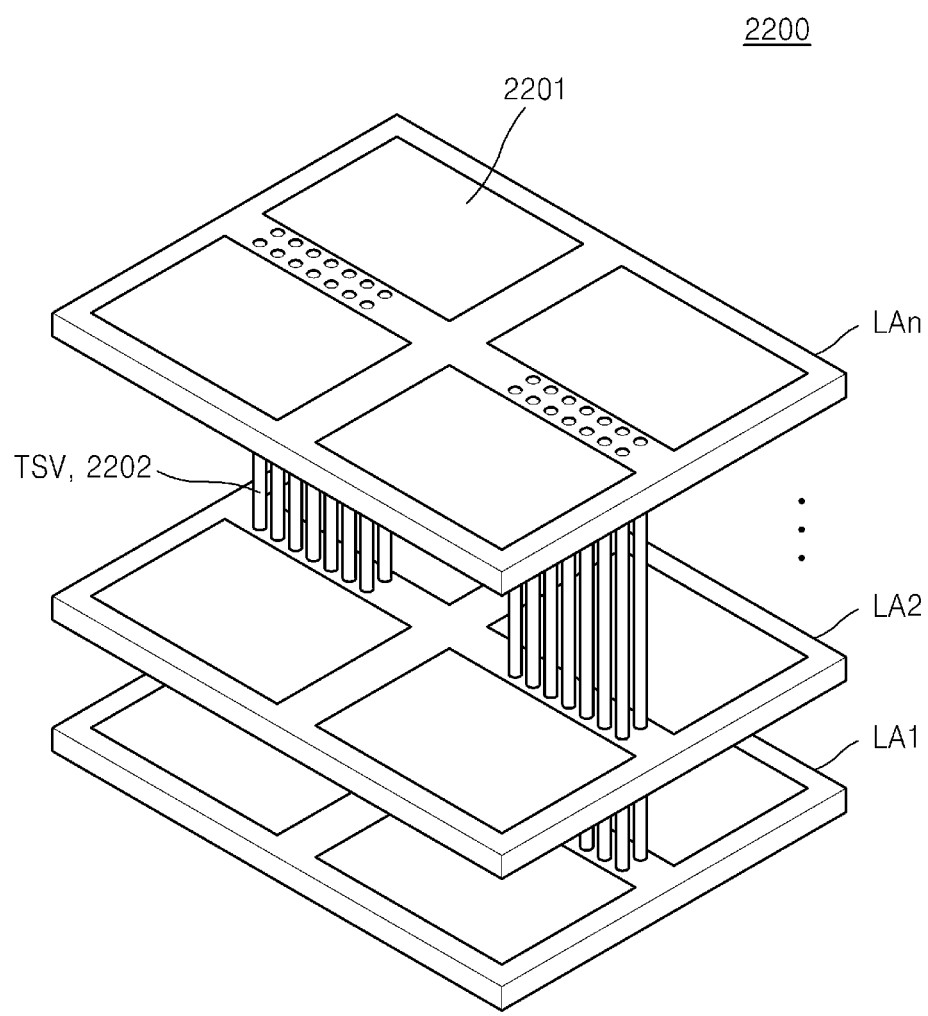
FIG. 22 is a diagram of a semiconductor device having a stack structure including a plurality of DRAM semiconductor layers that each perform a masked write operation according to an example embodiment of inventive concepts.

FIG. 22 is a diagram of a semiconductor device 2200 having a stack structure including a plurality of DRAM semiconductor layers LA1 through LAn that each perform a masked write operation according to an example embodiment of inventive concepts.

Referring to FIG. 22, the semiconductor device 2200 may include the plurality of DRAM semiconductor layers LA1 through LAn. Each of the semiconductor layers LA1 through LAn may be a memory chip including memory cell arrays 2201 each composed of DRAM cells. Some of the semiconductor layers LA1 through LAn may be master chips that perform interfacing with an external controller, and the rest of the semiconductor layers LA1 through LAn may be slave chips that store data. In FIG. 22, the semiconductor layer LA1 at a bottom may be the master chip, and the rest of the semiconductor layers LA2 through LAn may be the slave chips.

The semiconductor layers LA1 through LAn may exchange signals via through silicon vias (TSVs) 2202, and the master chip LA1 may communicate with an external memory controller (not shown) via a conductive means (not shown) formed on an external surface of the master chip LA1.

Also, transmission of the signals between the semiconductor layers LA1 through LAn may be performed via an optical I/O connection. For example, the semiconductor layers LA1 through LAn may be connected to each other by using a radiative method that uses a radio frequency wave or ultrasound, an inductive coupling method using magnetic induction, or a non-radiative method using a magnetic field resonance.

The radiative method wirelessly transmits a signal by using an antenna such as a monopole or a planar inverted-F antenna (PIFA). Radiation occurs while an electric field and a magnetic field that are changed according to time react with each other, and the antenna may receive a signal according to a characteristic of polarization of an incident wave from another antenna using a same frequency. According to the inductive coupling method, a strong magnetic field is generated in one direction by rolling a coil several times, and then coupling is generated by approaching another coil that resonates in a similar frequency. The non-radiative method uses evanescent wave coupling in which an electromagnetic wave is transmitted between two mediums that resonate in a same frequency, via a local electromagnetic field.

The masked write operation performed by each of the semiconductor layers LA1 through LAn includes operations of receiving a masked write command and an address signal from a memory controller; after receiving the masked write command, receiving a plurality of pieces of masked write data after an elapse of a write latency; in response to the masked write command, generating an internal read command according to the elapse of the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by each of the semiconductor layers LA1 through LAn includes operations of receiving a masked write command and an address signal; receiving a plurality of pieces of masked write data corresponding to a burst length after the masked write command is received and then a write latency elapses; in response to the masked write command, generating first and second internal read commands according to the elapse of the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before an elapse of a write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

In the module structures shown in FIGS. 19 through 21, each of the DRAM chips 1902, 2002, and 2102 may include the DRAM semiconductor layers LA1 through LAn.

Figure 23:
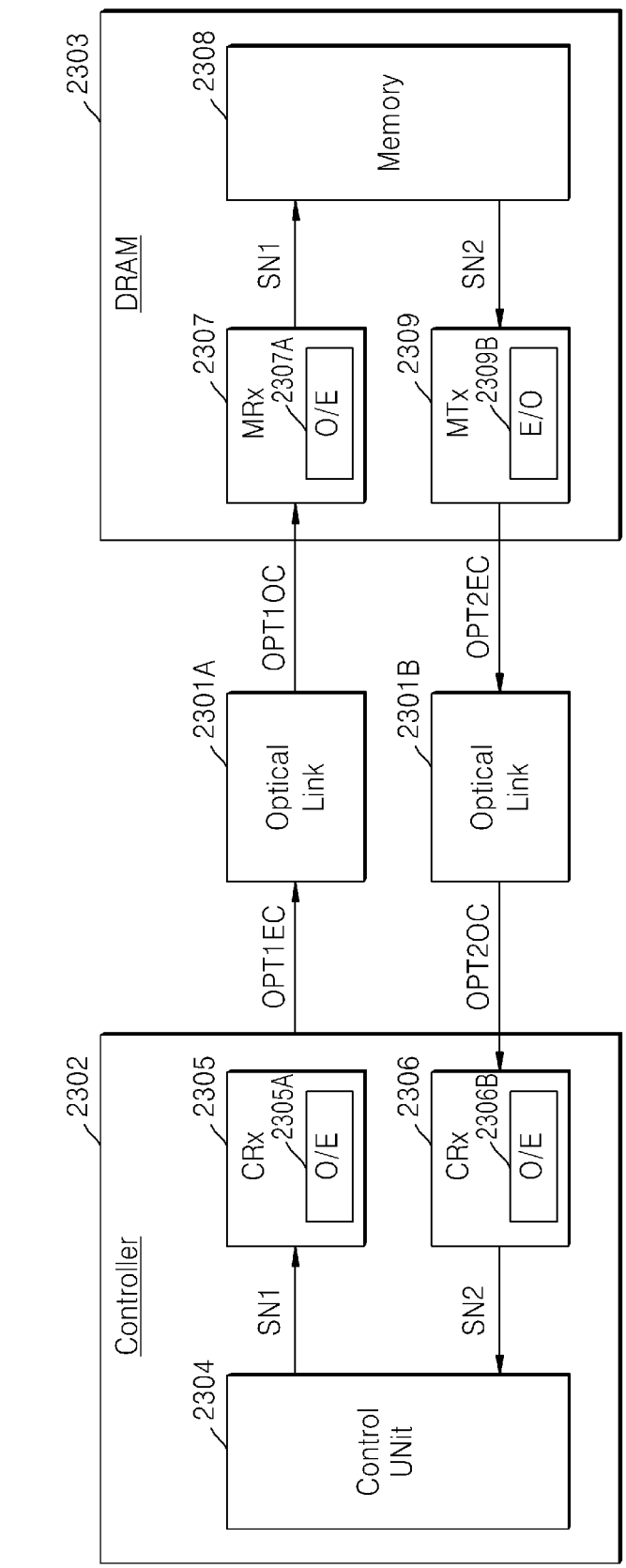
FIG. 23 illustrates a memory system including a DRAM that performs a masked write operation according to an example embodiment of inventive concepts.

FIG. 23 illustrates a memory system 2300 including a DRAM 2303 that performs a masked write operation according to an example embodiment of inventive concepts.

Referring to FIG. 23, the memory system 2300 includes optical links 2301A and 2301B, a controller 2302, and the DRAM 2303. The optical links 2301A and 2301B interconnect the controller 2302 and the DRAM 2303. The controller 2302 includes a control unit 2304, a first transmitting unit 2305, and a first receiving unit 2306. The control unit 2304 transmits a first electrical signal SN1 to the first transmitting unit 2305. The first electrical signal SN1 may include command signals, clocking signals, address signals, or write data The first transmitting unit 2305 includes a first optical modulator 2305A that converts the first electrical signal SN1 into a first optical transmission signal OPT and then transmits the first optical transmission signal OPT1EC to the optical link 2301A. The first optical transmission signal OPT1EC is transmitted in serial communication via the optical link 2301A. The first receiving unit 2306 includes a first optical demodulator 2306B that converts a second optical reception signal OPT2OC, which is received from the optical link 2301B, into a second electrical signal SN2 and then transmits the second electrical signal SN2 to the control unit 2304.

The DRAM 2303 includes a second receiving unit 2307, a memory 2308 including a memory cell array, and a second transmitting unit 2309. The masked write operation performed by the DRAM 2303 includes operations of receiving a masked write command and an address signal from a memory controller; after receiving the masked write command, receiving a plurality of pieces of masked write data after an elapse of a write latency; in response to the masked write command, generating an internal read command according to the elapse of the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by the DRAM 2303 includes operations of receiving a masked write command and an address signal; receiving a plurality of pieces of masked write data corresponding to a burst length after the masked write command is received and then a write latency elapses; in response to the masked write command, generating first and second internal read commands according to the elapse of the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before the elapse of the write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

The second receiving unit 2307 includes a second optical demodulator 2307A that converts a first optical reception signal OPT1OC from the optical link 2301A into the first electrical signal SN1 and transmits the first electrical signal SN1 to the memory 2308.

The memory 2308 writes the write data to a memory cell in response to the first electrical signal SN1, or transmits data as the second electrical signal SN2, which is read from the memory 2308, to the second transmitting unit 2309. The second electrical signal SN2 may include a clocking signal, the read data, or the like to be transmitted to the controller 2302. The second transmitting unit 2309 includes a second optical modulator 2309B that converts the second electrical signal SN2 into a second optical data signal OPT2EC and transmits the second optical data signal OPT2EC to the optical link 2301B. The second optical data signal OPT2EC is transmitted in serial communication via the optical link 2301B.

Figure 24:
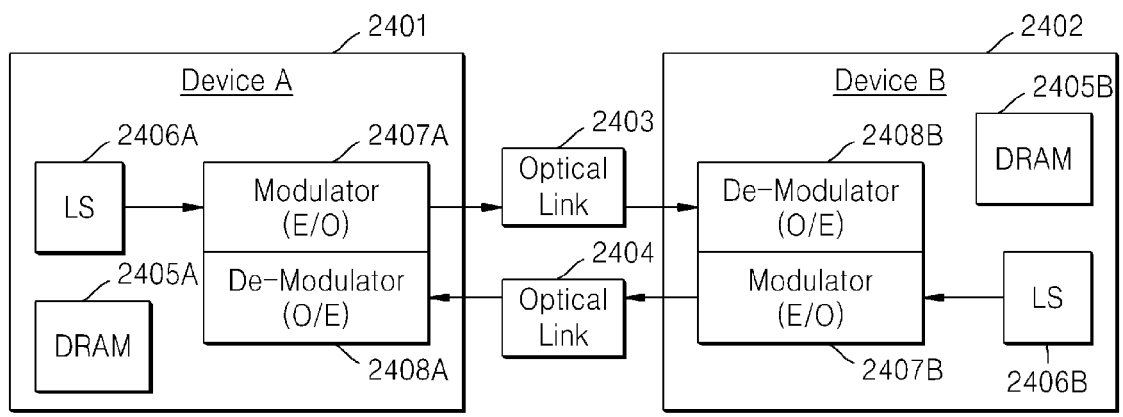
FIG. 24 illustrates a data processing system including DRAMs that each perform a masked write operation according to an example embodiment of inventive concepts.

FIG. 24 illustrates a data processing system 2400 including DRAMs 2405A and 2405B that each perform a masked write operation according to an example embodiment of inventive concepts.

Referring to FIG. 24, the data processing system 2400 includes a first device A 2401, a second device B 2402, and a plurality of optical links 2403 and 2404. The first device A 2401 and the second device B 2402 may exchange an optical signal via serial communication.

The first device A 2401 may include the DRAM 2405A, a first light source 2406A, a first optical modulator 2407A capable of performing electric-to-optical conversion, and a first optical demodulator 2408A capable of performing optical-to-electric conversion. The second device B 2402 includes the DRAM 2405B, a second light source 2406B, a second optical modulator 2407B, and a second optical demodulator 2408B.

The masked write operation performed by each of the DRAMs 2405A and 2405B includes operations of receiving a masked write command and an address signal from a memory controller; after receiving the masked write command, receiving a plurality of pieces of masked write data after an elapse of a write latency; in response to the masked write command, generating an internal read command according to the elapse of the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by each of the DRAMs 2405A and 2405B includes operations of receiving a masked write command and an address signal; receiving a plurality of pieces of masked write data corresponding to a burst length after the masked write command is received and then a write latency elapses; in response to the masked write command, generating first and second internal read commands according to the elapse of the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before the elapse of the write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

Each of the first and second light sources 2406A and 2406B outputs an optical signal having a continuous waveform. The first and second light sources 2406A and 2406B may employ a distributed feed-back laser diode (DFB-LD) that is a multi-wavelength light source as a light source or may employ a Fabry-Perot laser diode (FP-LD) as a light source.

The first optical modulator 2407A converts transmission data into an optical transmission signal and then transmits the optical transmission signal to the optical link 2403. The first optical modulator 2407A may modulate a wavelength of the optical signal received from the first light source 2406A, according to the transmission data. The first optical demodulator 2408A receives the optical signal, which is output from the second optical modulator 2407B of the second device B 2402, via the optical link 2404, demodulates the optical signal into an electrical signal, and outputs the demodulated electrical signal.

The second optical modulator 2407B converts transmission data of the second device B 2402 into an optical transmission signal and transmits the optical transmission signal to the optical link 2404. The second optical modulator 2407B may modulate a wavelength of the optical signal received from the second light source 2406B, according to the transmission data. The second optical demodulator 2408B may receive the optical signal, which is output from the first optical modulator 2407A of the first device A 2401, via the optical link 2403, demodulate the optical signal into an electrical signal, and output the electrical signal.

Figure 25:
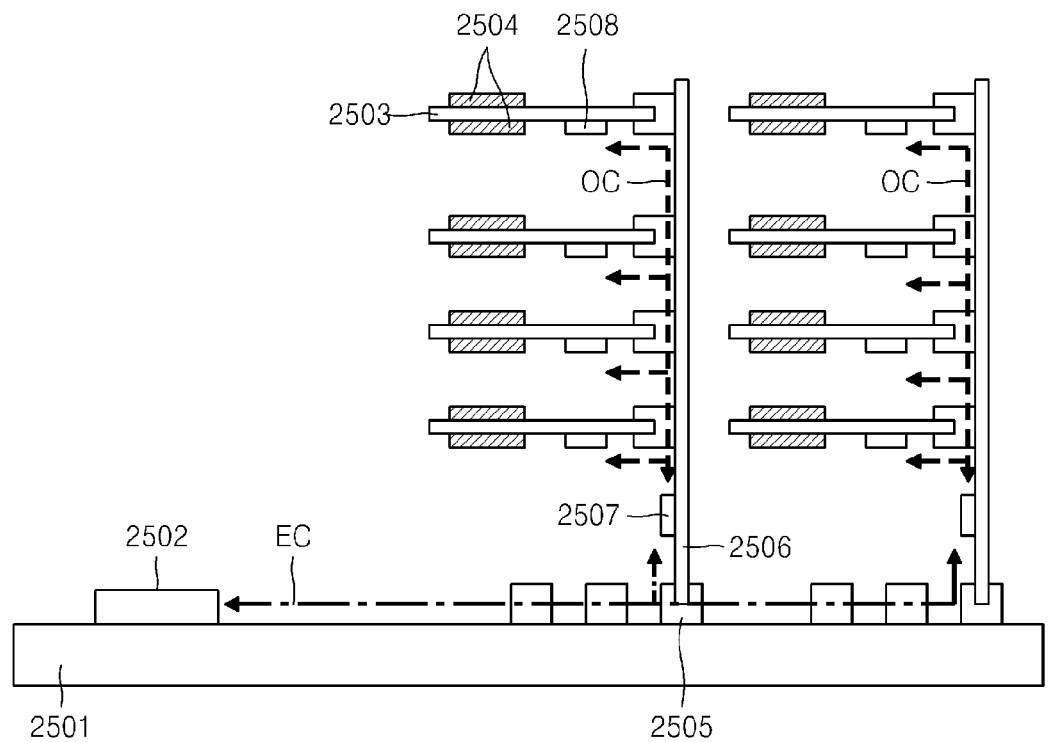
FIG. 25 illustrates a server system including DRAM chips that each perform a masked write operation according to an example embodiment of inventive concepts.

FIG. 25 illustrates a server system 2500 including DRAM chips 2504 that each perform a masked write operation according to an example embodiment of inventive concepts.

Referring to FIG. 25, the server system 2500 includes a memory controller 2502 and a plurality of memory modules 2503. Each of the memory modules 2503 may include the DRAM chips 2504.

The masked write operation performed by each of the DRAM chips 2504 includes operations of receiving a masked write command and an address signal from a memory controller; after receiving the masked write command, receiving a plurality of pieces of masked write data after an elapse of a write latency; in response to the masked write command, generating an internal read command according to the elapse of the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by each of the DRAM chips 2504 includes operations of receiving a masked write command and an address signal; receiving a plurality of pieces of masked write data corresponding to a burst length after the masked write command is received and then a write latency elapses; in response to the masked write command, generating first and second internal read commands according to the elapse of the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before the elapse of the write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

The server system 2500 may have a structure in which each of second circuit boards 2506 is combined with sockets 2505 of each of first circuit boards 2501. The server system 2500 may allow a channel structure in which the respective second circuit boards 2506 are connected to the first circuit boards 2501 according to respective signal channels. However, the structure of the server system 2500 is not limited thereto and thus may vary.

Transmission of signals between the memory modules 2503 may be performed via optical I/O connection. For the optical I/O connection, the server system 2500 may further include an electro-to-optical conversion unit 2507, and each of the memory modules 2503 may further include an optical-to-electro conversion unit 2508.

The memory controller 2502 is connected to the electro-to-optical conversion unit 2507 via an electrical channel EC. The electro-to-optical conversion unit 2507 converts an electrical signal from the memory controller 2502 into an optical signal and transmits the optical signal to an optical channel OC via the electrical channel EC. Also, the electro-to-optical conversion unit 2507 performs signal processing by converting an optical signal received via the optical channel OC into an electrical signal and transmitting the electrical signal via the electrical channel EC.

The memory modules 2503 are connected to the electro-to-optical conversion unit 2507 via the optical channel OC. An optical signal applied to each of the memory modules 2503 may be converted into an electrical signal via the optical-to-electro conversion unit 2508 and then may be transmitted to each of the DRAM chips 2504. The server system 2500 composed of the memory modules 2503 that are connected in the optical I/O connection may support a high storage capacity and a rapid processing speed.

Figure 26:
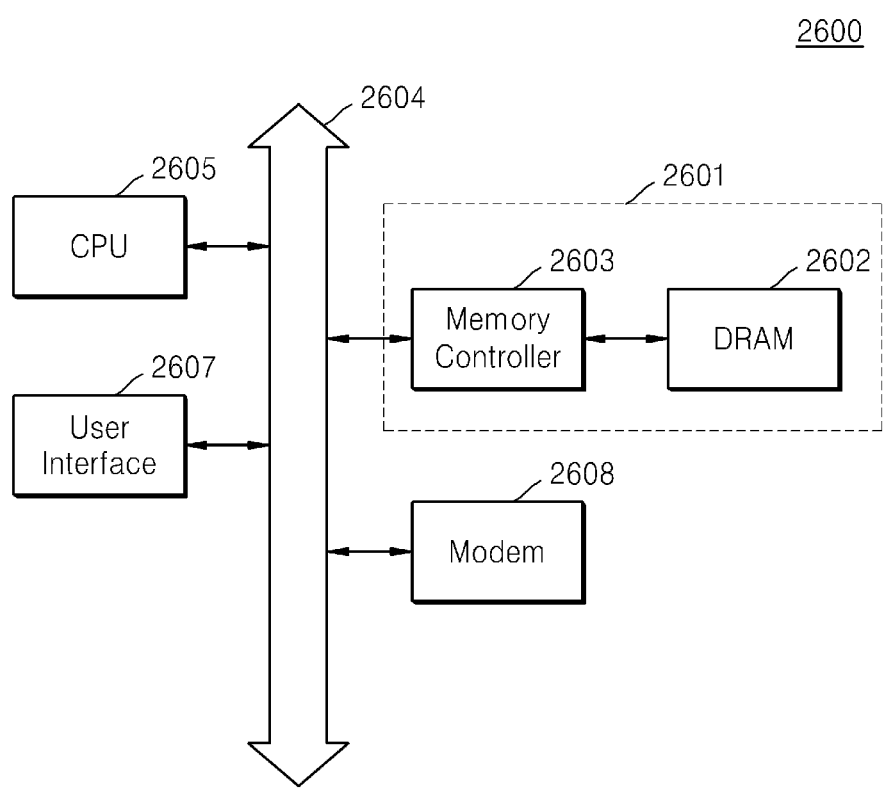
FIG. 26 illustrates a computer system in which a DRAM that performs a masked write operation is mounted according to an example embodiment of inventive concepts.

FIG. 26 illustrates a computer system 2600 in which a DRAM 2602 that performs a masked write operation is mounted according to an example embodiment of inventive concepts.

Referring to FIG. 26, the computer system 2600 may be mounted in a mobile device, a desktop computer, or the like. The computer system 2600 may include a DRAM memory system 2601 that is electrically connected to a system bus 2604, a central processing unit (CPU) 2605, a user interface 2607, and a modem 2608 such as a baseband chipset. The computer system 2600 may further include an application chipset, a camera image processor (CIP), I/O devices, or the like.

The user interface 2607 may transmit data to or may receive data from a communication network. The user interface 2607 may operate wirelessly or wired, and may include an antenna, a wired/wireless transceiver, or the like. Data that is provided via the user interface 2607 or the modem 2608 or that is processed by the CPU 2605 may be stored in the DRAM memory system 2601.

The DRAM memory system 2601 may include the DRAM 2602 and a memory controller 2603. The DRAM 2602 may store data that is processed by the CPU 2605 or data that is input from an external source. The masked write operation performed by the DRAM 2602 includes operations of receiving a masked write command and an address signal from the memory controller 2603; receiving the masked write command, and receiving a plurality of pieces of masked write data after an elapse of a write latency; in response to the masked write command, generating an internal read command according to the write latency; in response to the internal read command, reading a plurality of pieces of data stored in memory cells configured to store the plurality of pieces of masked write data, and performing error detection and correction on the plurality of pieces of data; in response to the masked write command, generating an internal write command according to the plurality of pieces of masked write data; and in response to the internal write command, storing the plurality of pieces of masked write data in the memory cells.

The internal read command may be generated before the elapse of the write latency by a rising or falling edge of a given (or alternatively desired or predetermined) clock, may be generated before the elapse of the write latency by a tCCD timing, may be generated after first data of the masked write data is input, or may be generated in synchronization with a clock that is input with the address signal.

The internal write command may be generated after last data of the masked write data is input, or may be generated after the last data of the masked write data is input and then a given (or alternatively desired or predetermined) delay time elapses.

Another masked write operation performed by the DRAM 2602 includes operations of receiving a masked write command and an address signal; receiving a plurality of pieces of masked write data corresponding to a burst length after the masked write command is received and then a write latency elapses; in response to the elapse of the masked write command, generating first and second internal read commands according to the write latency; in response to the first internal read command, reading a plurality of pieces of first data stored in first memory cells that correspond to the address signal and that are configured to store data of the plurality of pieces of masked write data which corresponds to an upper burst length, and performing error detection and correction on the plurality of pieces of first data; in response to the second internal read command, reading a plurality of pieces of second data stored in second memory cells that correspond to the address signal and that are configured to store data of the plurality of pieces of masked write data which corresponds to a lower burst length, and performing error detection and correction on the plurality of pieces of second data; in response to the masked write command, generating first and second internal write commands according to the plurality of pieces of masked write data; in response to the first internal write command, storing the plurality of pieces of masked write data corresponding to the upper burst length in the first memory cells; and in response to the second internal write command, storing the plurality of pieces of masked write data corresponding to the lower burst length in the second memory cells.

The first and second internal read commands may be generated before the elapse of the write latency by a rising or falling edge of a given (or alternatively desired or predetermined) clock. The first internal read command may be generated before the elapse of the write latency by a 2*tCCD timing, and the second internal read command may be generated before the elapse of the write latency by another tCCD timing. Alternatively, the first internal read command may be generated after first data of the data corresponding to the upper burst length is input, and the second internal read command may be generated after first data of the data corresponding to the lower burst length is input. Alternatively, the first internal read command may be generated in synchronization with a clock signal that is received with the address signal, and the second internal read command may be generated after the first internal read command is generated and then a tCCD timing elapses. Alternatively, the first internal read command may be generated before the elapse of the write latency by a tCCD timing, and the second internal read command may be generated after the first internal read command is generated and then a tCCD timing elapses.

The first internal write command may be generated after last data of the data corresponding to the upper burst length is input, and the second internal write command may be generated after last data of the data corresponding to the lower burst length is input. Alternatively, the first internal write command may be generated after last data of the data corresponding to the upper burst length is input and then a given (or alternatively desired or predetermined) delay time elapses, and the second internal write command may be generated after last data of the data corresponding to the lower burst length is input and then a given (or alternatively desired or predetermined) delay time elapses.

In a case where the computer system 2600 performs wireless communication, the computer system 2600 may be used in a communication system such as a code division multiple access (CDMA) communication system, a global system for mobile communication (GSM) communication system, a North American multiple access (NADC) communication system, a CDMA2000 communication system, or the like. The computer system 2600 may be mounted in an information processing apparatus such as a personal digital assistant (PDA), a portable computer, a web tablet, a digital camera, a portable media player (PMP), a mobile phone, a wireless phone, a lap-top computer, or the like.

In general, a computer system separately includes a cache memory or a RAM which has a high processing speed, and a storage for storing high-capacity data. However, the DRAM system according to the one or more embodiments may replace all of the aforementioned memories.

While example embodiments of inventive concepts have been particularly shown and described, it will be understood that various changes in form and details may be made therein without departing from the spirit and scope of the following claims.

What is claimed is:

1. A method of operating a memory device, the method comprising:
   receiving a masked write command and an address signal;
   generating, in response to the masked write command, an internal read command during a write latency associated with the masked write command;
   receiving a plurality of pieces of masked write data after expiration of the write latency;
   reading, in response to the internal read command, a plurality of pieces of data stored in a plurality of memory cells, the plurality of memory cells corresponding to the address signal and the plurality of memory cells being configured to store the plurality of pieces of masked write data;
   performing error detection and correction on the plurality of pieces of data;
   generating an internal write command after input of a last piece of masked write data among the plurality of pieces of masked write data; and
   storing, in response to the internal write command, the plurality of pieces of masked write data in the plurality of memory cells.

2. The method of claim 1, wherein the generating the internal read command comprises:
   generating the internal read command during the write latency and in synchronization with a rising or falling edge of a clock.

3. The method of claim 1, wherein the generating the internal read command comprises:
   generating the internal read command during the write latency and after a CAS-to-CAS command delay.

4. The method of claim 1, wherein the generating the internal read command comprises:
   generating the internal read command according to operation frequency information with respect to a data rate of the memory device.

5. The method of claim 1, wherein:
   the reading the plurality of pieces of data stored in the plurality of memory cells includes,
      activating, in response to the internal read command, a column selection signal and an error correction code (ECC) decoding signal, the column selection signal corresponding to the plurality of memory cells, and
      reading, in response to the column selection signal, the plurality of pieces of data and parity bits from the plurality of memory cells; and
   the performing error detection and correction includes, performing, in response to the ECC decoding signal, error detection and correction on the plurality of pieces of data using the plurality of pieces of data and the parity bits.

6. The method of claim 1, wherein the storing the plurality of pieces of masked write data comprises:
activating, in response to the internal write command, a column selection signal and an error correction code (ECC) encoding signal, the column selection signal corresponding to the plurality of memory cells;
generating, in response to the ECC encoding signal, parity bits with respect to the plurality of pieces of masked write data and error-corrected data among the plurality of pieces of data, the error-corrected data corresponding to masked data among the plurality of pieces of masked write data;
selecting memory cells among the plurality of memory cells based on the column selection signal; and
storing the plurality of pieces of masked write data and the parity bits in the selected memory cells.

7. The method of claim 1, further comprising:
generating the plurality of pieces of masked write data in response to a data mask signal associated with a plurality of pieces of write data input via a data input/output (I/O) pad.

8. A method of operating a memory device, the method comprising:
receiving a masked write command and an address signal;
receiving a plurality of pieces of masked write data after expiration of a write latency associated with the masked write command;
generating, in response to the masked write command, an internal read command after receipt of a first piece, and prior to receipt of a last piece, of masked write data among the plurality of pieces of masked write data;
reading, in response to the internal read command, a plurality of pieces of data stored in a plurality of memory cells, the plurality of memory cells corresponding to the address signal and the plurality of memory cells being configured to store the plurality of pieces of masked write data;
performing error detection and correction on the plurality of pieces of data;
generating an internal write command after receipt of a last piece of masked write data among the plurality of pieces of masked write data; and
storing, in response to the internal write command, the plurality of pieces of masked write data in the plurality of memory cells.

9. The method of claim 8, wherein:
the reading the plurality of pieces of data stored in the plurality of memory cells includes,
activating, in response to the internal read command, a column selection signal and an error correction code (ECC) decoding signal, the column selection signal corresponding to the plurality of memory cells, and
reading, in response to the column selection signal, the plurality of pieces of data and parity bits from the plurality of memory cells; and
the performing error detection and correction on the plurality of pieces of data includes,
performing, in response to the ECC decoding signal, error detection and correction on the plurality of pieces of data using the plurality of pieces of data and the parity bits.

10. The method of claim 8, wherein the storing the plurality of pieces of masked write data comprises:
activating, in response to the internal write command, a column selection signal and an error correction code (ECC) encoding signal, the column selection signal corresponding to the plurality of memory cells;
generating, in response to the ECC encoding signal, parity bits with respect to the plurality of pieces of masked write data and error-corrected data among the plurality of pieces of data, the error-corrected data corresponding to masked data among the plurality of pieces of masked write data;
selecting memory cells among the plurality of memory cells based on the column selection signal; and
storing the plurality of pieces of masked write data and the parity bits in the selected memory cells.

11. A method of operating a memory device, the method comprising:
receiving a masked write command and an address signal;
generating, in response to the masked write command, an internal read command during a write latency associated with the masked write command, and in synchronization with a clock signal received with the address signal;
receiving a plurality of pieces of masked write data after expiration of the write latency associated with the masked write command;
reading, in response to the internal read command, a plurality of pieces of data stored in a plurality of memory cells, the plurality of memory cells corresponding to the address signal and the plurality of memory cells being configured to store the plurality of pieces of masked write data;
performing error detection and correction on the plurality of pieces of data;
generating an internal write command after receipt of a last piece of masked write data among the plurality of pieces of masked write data; and
storing, in response to the internal write command, the plurality of pieces of masked write data in the plurality of memory cells.

12. The method of claim 11, wherein:
the reading the plurality of pieces of data stored in the plurality of memory cells includes,
activating, in response to the internal read command, a column selection signal and an error correction code (ECC) decoding signal, the column selection signal corresponding to the plurality of memory cells, and
reading, in response to the column selection signal, the plurality of pieces of data and parity bits stored in the plurality of memory cells; and
the performing error detection and correction on the plurality of pieces of data includes,
performing, in response to the ECC decoding signal, error detection and correction on the plurality of pieces of data using the plurality of pieces of data and the parity bits.

13. The method of claim 11, wherein the storing the plurality of pieces of masked write data comprises:
activating, in response to the internal write command, a column selection signal and an error correction code (ECC) encoding signal, the column selection signal corresponding to the plurality of memory cells;
generating, in response to the ECC encoding signal, parity bits with respect to the plurality of pieces of masked write data and error-corrected data among the plurality of pieces of data, the error-corrected data corresponding to masked data among the plurality of pieces of masked write data;

selecting memory cells among the plurality of memory cells based on the column selection signal; and storing the plurality of pieces of masked write data and the parity bits in the selected memory cells.

14. A method of operating a memory device, the method comprising:

receiving a masked write command and an address signal;

generating, in response to the masked write command, first and second internal read commands during a write latency corresponding to the masked write command;

receiving a plurality of pieces of masked write data corresponding to a burst length after expiration of the write latency, the burst length having an upper burst length portion and a lower burst length portion;

reading, in response to the first internal read command, a plurality of pieces of first data stored in a first plurality of memory cells, the first plurality of memory cells corresponding to the address signal, and the first plurality of memory cells being configured to store pieces of masked write data corresponding to the upper burst length portion;

performing error detection and correction on the plurality of pieces of first data;

reading, in response to the second internal read command, a plurality of pieces of second data stored in a second plurality of memory cells, the second plurality of memory cells corresponding to the address signal, and the second plurality of memory cells being configured to store pieces of masked write data corresponding to the lower burst length portion;

performing error detection and correction on the plurality of pieces of second data;

generating first and second internal write commands according to the plurality of pieces of masked write data;

storing, in the first plurality of memory cells and in response to the first internal write command, the pieces of masked write data corresponding to the upper burst length portion; and storing, in the second plurality of memory cells and in response to the second internal write command, the pieces of masked write data corresponding to the lower burst length portion.

15. The method of claim 14, wherein the generating the first and second internal read commands comprises:

generating the first internal read command during the write latency and in synchronization with a rising or falling edge of a first clock; and generating the second internal read command during the write latency and in synchronization with a rising or falling edge of a second clock.

16. The method of claim 14, wherein the generating the first and second internal read commands comprises:

generating the first internal read command during the write latency and after a first CAS-to-CAS command delay; and generating the second internal read command during the write latency and after a second CAS-to-CAS command delay.

17. The method of claim 14, wherein the generating the first and second internal read commands comprises:

generating the first internal read command after receipt of a first piece of masked write data among pieces of masked write data corresponding to the upper burst length portion; and generating the second internal read command after receipt of a first piece of masked write data among the pieces of masked write data corresponding to the lower burst length portion.

18. The method of claim 14, wherein the generating the first and second internal read commands comprises:

generating the first internal read command in synchronization with a clock signal received with the address signal; and generating the second internal read command after the first internal read command and after a CAS-to-CAS command delay.

19. The method of claim 14, wherein the generating the first and second internal read commands comprises:

generating the first internal read command during the write latency and after a first CAS-to-CAS command delay; and generating the second internal read command after the first internal read command and a second CAS-to-CAS command delay.

20. The method of claim 14, wherein the generating the first and second internal write commands comprises:

generating the first internal write command after receipt of a last piece of masked write data among the pieces of masked write data corresponding to the upper burst length portion; and generating the second internal write command after receipt of a last piece of masked write data among the pieces of masked write data corresponding to the lower burst length portion.

21. The method of claim 14, wherein the generating the first and second internal write commands comprises:

generating the first internal write command after receipt of a last piece of masked write data among the pieces of masked write data corresponding to the upper burst length portion and after expiration of a first delay period; and generating the second internal write command after receipt of a last piece of masked write data among the pieces of masked write data corresponding to the lower burst length portion and after expiration of a second delay period.

22. The method of claim 14, wherein:

the reading the plurality of pieces of first data includes,
activating, in response to the first internal read command, a first column selection signal and a first error correction code (ECC) decoding signal, the first column selection signal corresponding to the first plurality of memory cells, and
reading, in response to the first column selection signal, the plurality of pieces of first data and first parity bits stored in the first plurality of memory cells; and the performing error detection and correction on the plurality of pieces of first data includes,
performing, in response to the first ECC decoding signal, error detection and correction on the plurality of pieces of first data using the plurality of pieces of first data and the first parity bits.

23. The method of claim 22, wherein:

the reading the plurality of pieces of second data includes,
activating, in response to the second internal read command, a second column selection signal and a second error correction code (ECC) decoding signal, the second column selection signal corresponding to the second plurality of memory cells, and reading, in response to the second column selection signal, the plurality of pieces of second data and second parity bits stored in the second plurality of memory cells; and the performing error detection and correction on the plurality of pieces of second data includes, performing, in response to the second ECC decoding signal, error detection and correction on the plurality of pieces of second data using the plurality of pieces of second data and the second parity bits.

24. The method of claim 14, wherein the storing the pieces of masked write data corresponding to the upper burst length portion comprises:

activating, in response to the first internal write command, a column selection signal and an error correction code (ECC) encoding signal, the column selection signal corresponding to the first plurality of memory cells;

generating, in response to the ECC encoding signal, parity bits with respect to the pieces of masked write data corresponding to the upper burst length portion and error-corrected data among the plurality of pieces of first data, the error-corrected data corresponding to masked data among the pieces of masked write data corresponding to the upper burst length portion;

selecting first memory cells among the first plurality of memory cells based on the column selection signal; and storing the pieces of masked write data corresponding to the upper burst length portion and the parity bits in the selected first memory cells.

25. The method of claim 14, wherein the storing the pieces of masked write data corresponding to the lower burst length portion comprises:

activating, in response to the second internal write command, a column selection signal and an error correction code (ECC) encoding signal, the column selection signal corresponding to the second plurality of memory cells;

generating, in response to the ECC encoding signal, parity bits with respect to the pieces of masked write data corresponding to the lower burst length portion and error-corrected data among the plurality of pieces of second data, the error-corrected data corresponding to masked data among the pieces of masked write data corresponding to the lower burst length portion;

selecting second memory cells among the plurality of second memory cells based on the column selection signal; and storing the pieces of masked write data corresponding to the lower burst length portion and the parity bits in the selected second memory cells.

26. A method of operating a memory device, the method comprising:

receiving a masked write command, an address signal and a plurality of bits of masked write data, the address signal corresponding to the masked write command;

generating an internal read command in response to the received masked write command, the internal read command being generated one of
(i) during a write latency associated with the received masked write command,
(ii) after receipt of a first bit of masked write data among the plurality of bits of masked write data, and
(iii) during a write latency associated with the masked write command, and in synchronization with a rising or falling edge of a clock signal received with the address signal;

reading, in response to the internal read command, a plurality of bits of data stored in a plurality of memory cells, the plurality of memory cells corresponding to the address signal; and storing, in response to an internal write command, the plurality of bits of masked write data in the plurality of memory cells.

27. The method of claim 26, further comprising:
generating the internal write command after receipt of a last bit of masked write data among the plurality of bits of masked write data.

28. The method of claim 26, further comprising:
performing error detection and correction on the plurality of bits of data; and wherein the storing the plurality of bits of masked write data includes, activating, in response to the internal write command, a column selection signal and an error correction code (ECC) encoding signal, the column selection signal corresponding to the plurality of memory cells, generating, in response to the ECC encoding signal, parity bits based on the plurality of bits of masked write data and error-corrected data bits among the plurality of bits of data, the error-corrected data bits corresponding to masked data bits among the plurality of bits of masked write data, selecting memory cells among the plurality of memory cells based on the column selection signal, and storing the parity bits and the plurality of bits of masked write data in the selected memory cells.

29. The method of claim 28, further comprising:
reading, from the plurality of memory cells, parity bits associated with the plurality of bits of data; and wherein the error detection and correction is based on the plurality of bits of data and the parity bits.

30. The method of claim 26, wherein the internal read command is generated after a CAS-to-CAS command delay.

* * * * *